Oct. 21, 1969　　　G. C. BECK ET AL　　　3,473,212
CHIP PLACEMENT HEAD

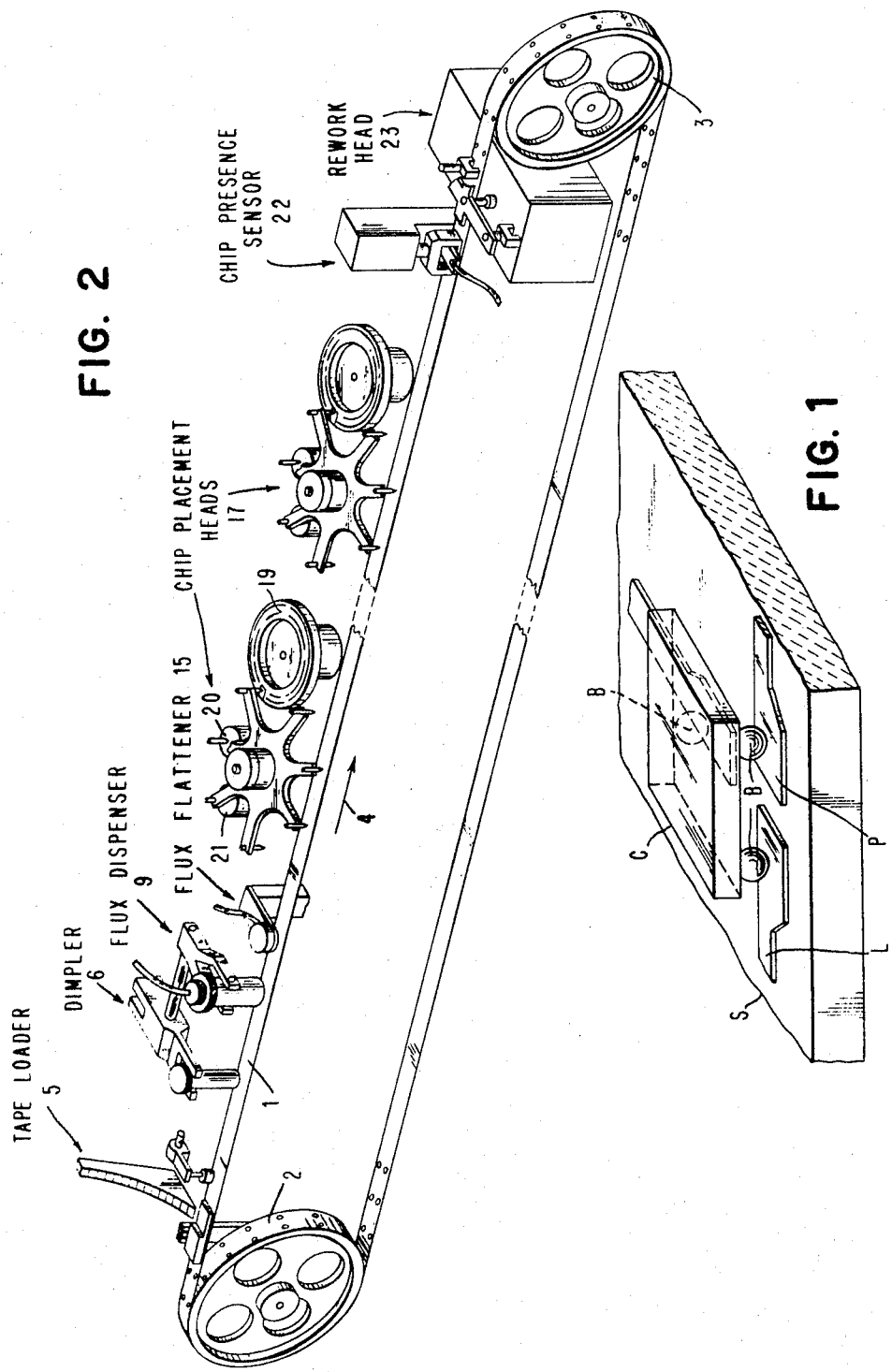

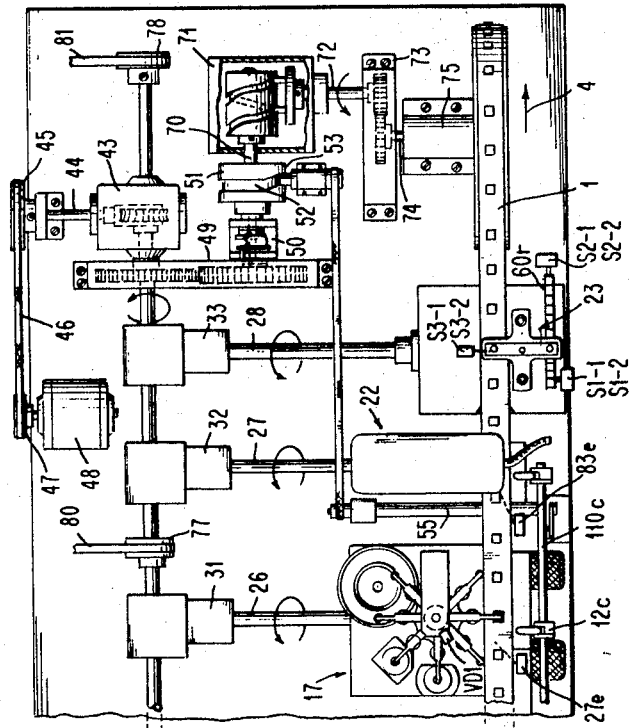

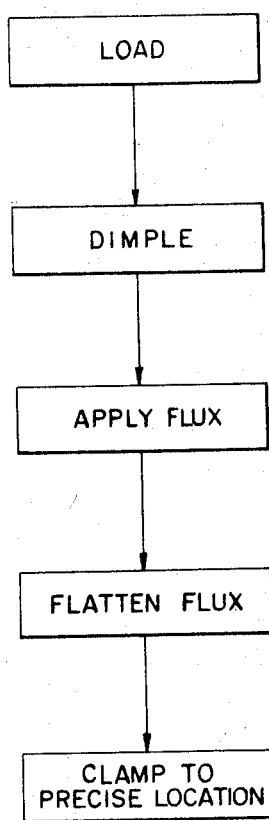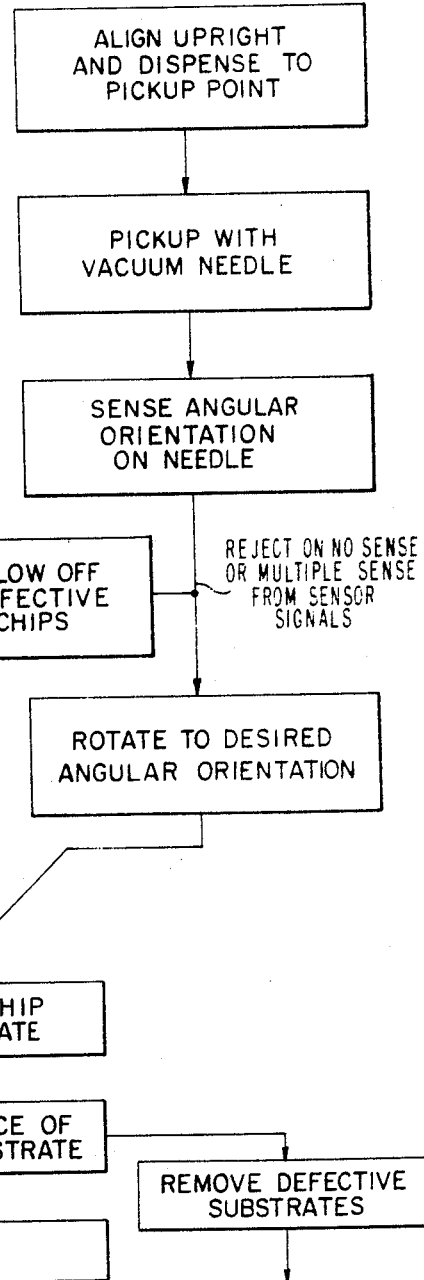
FIG. 5

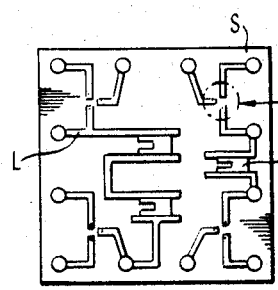
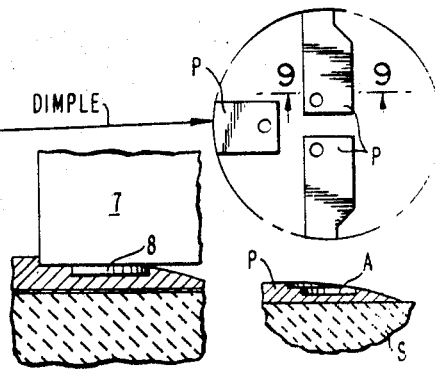
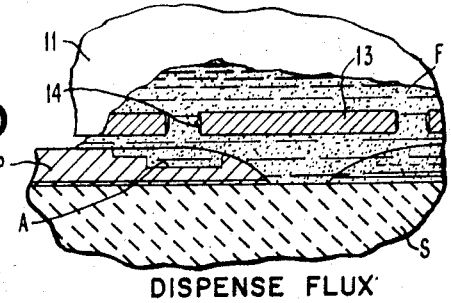
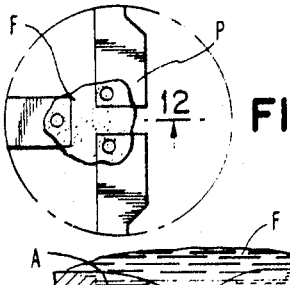
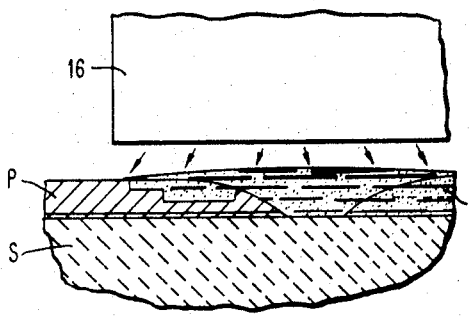
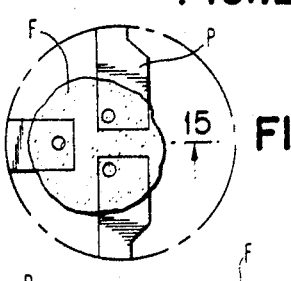
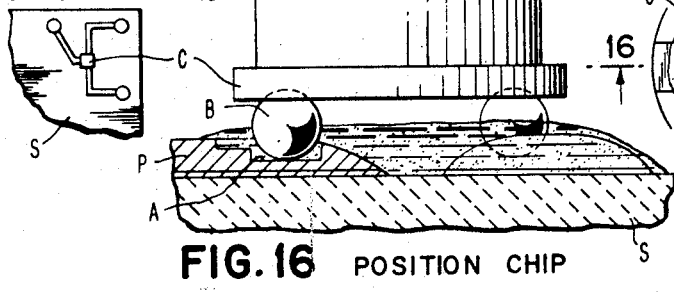
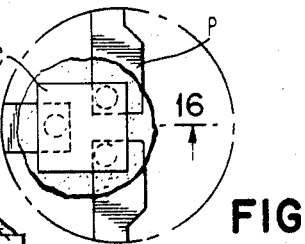

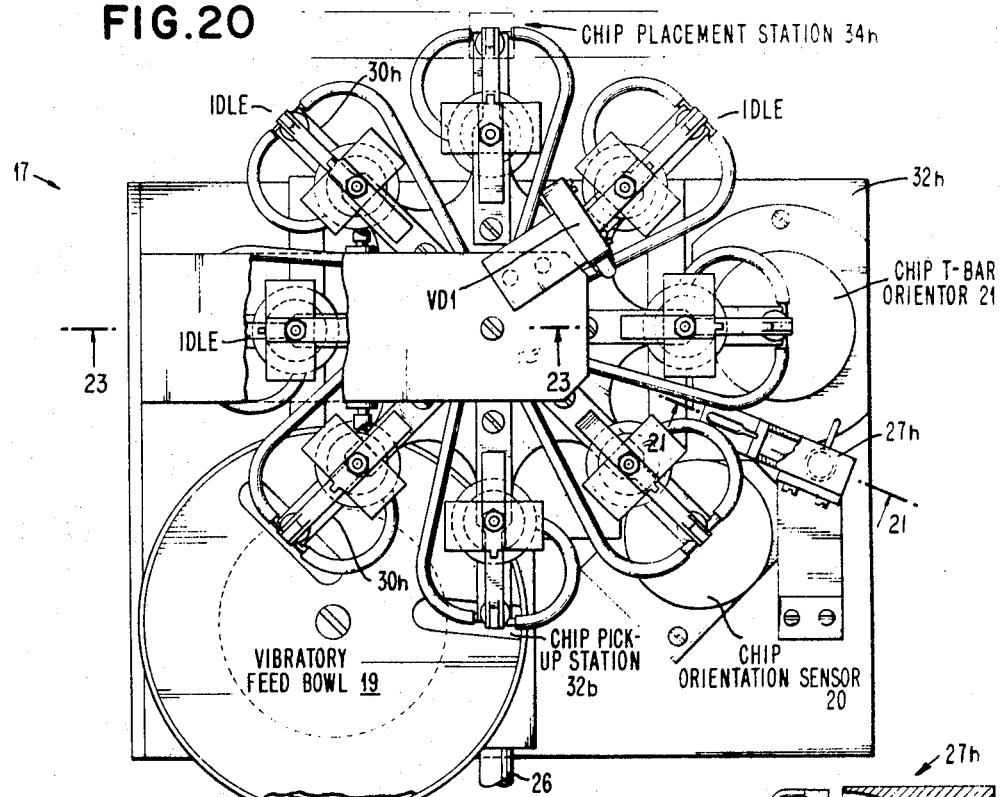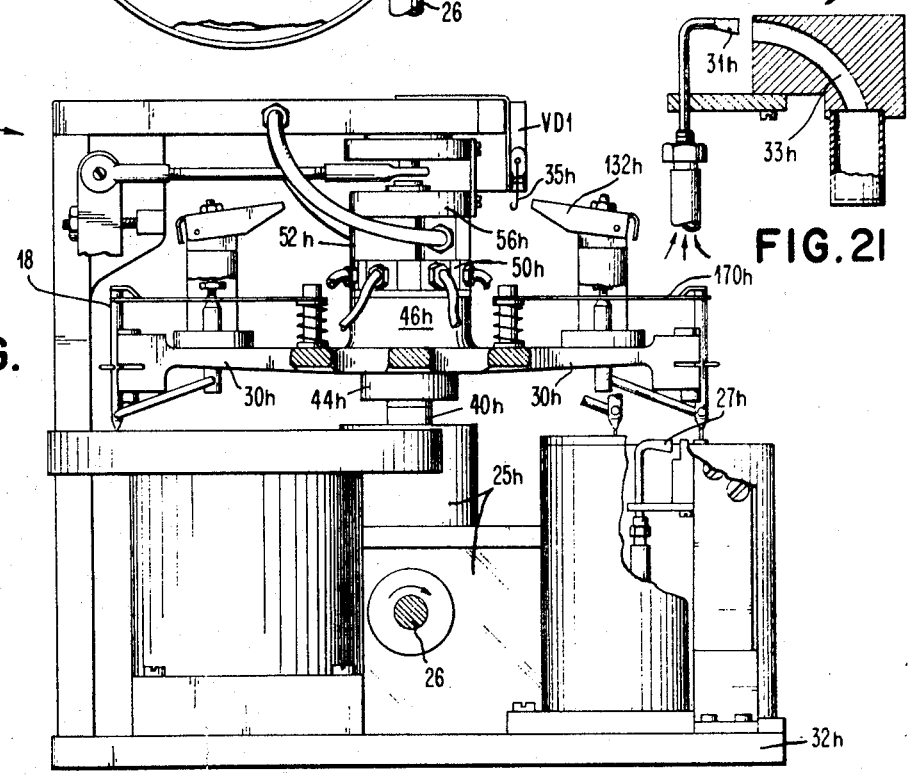

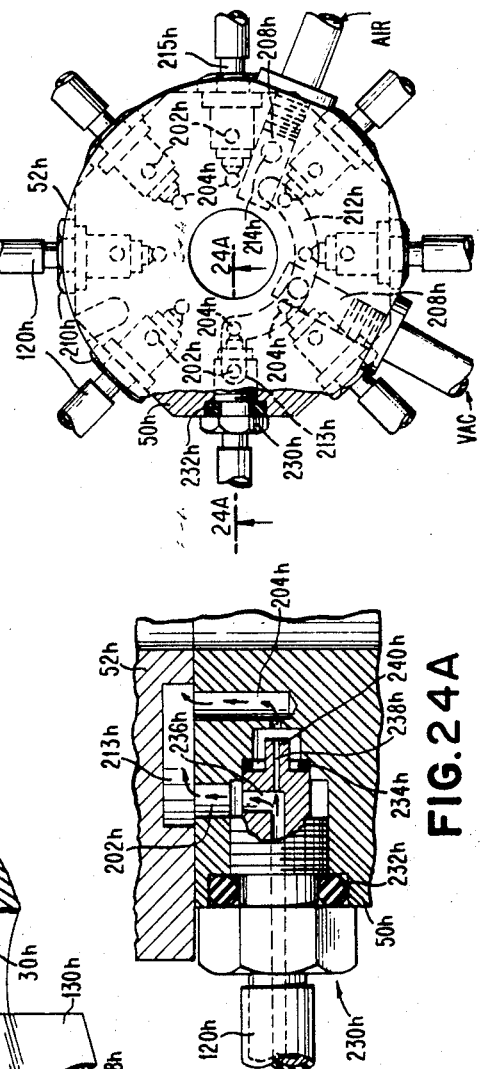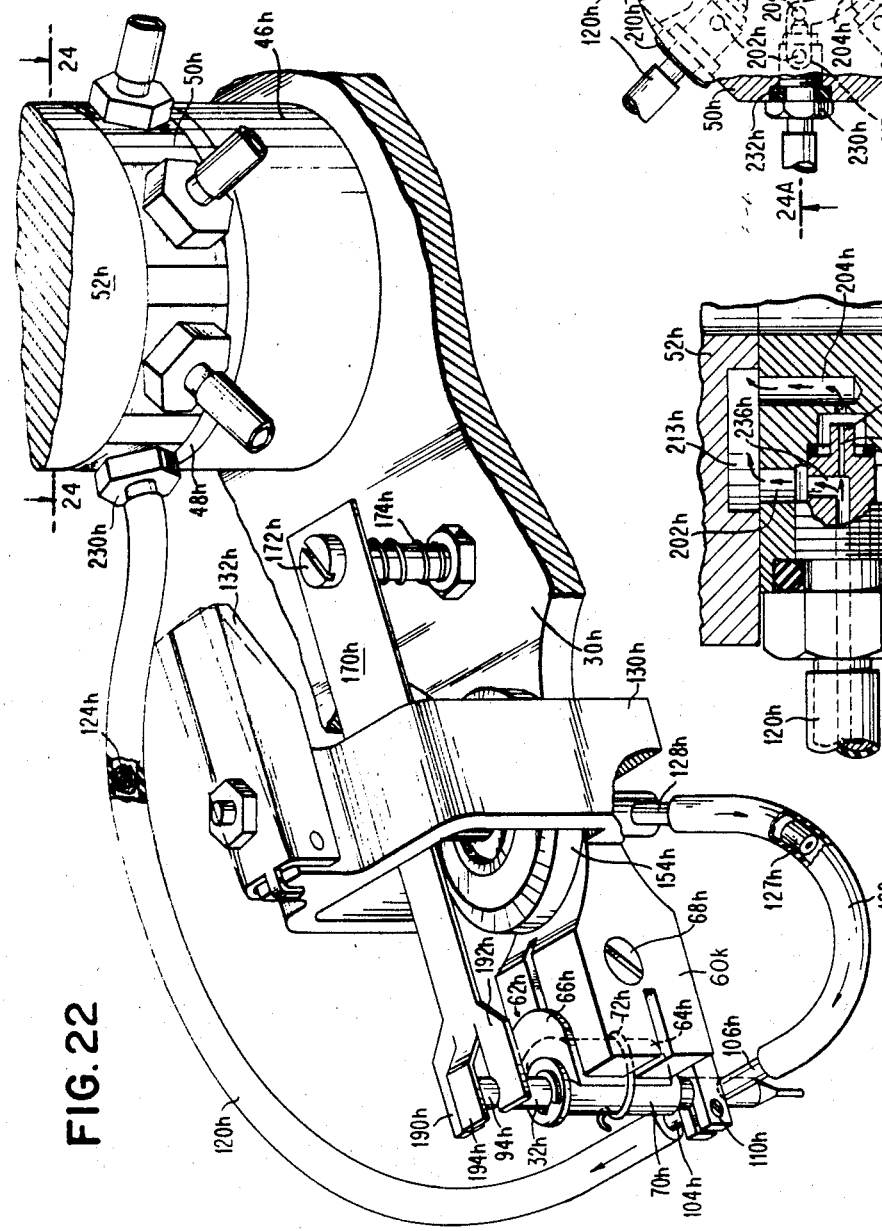

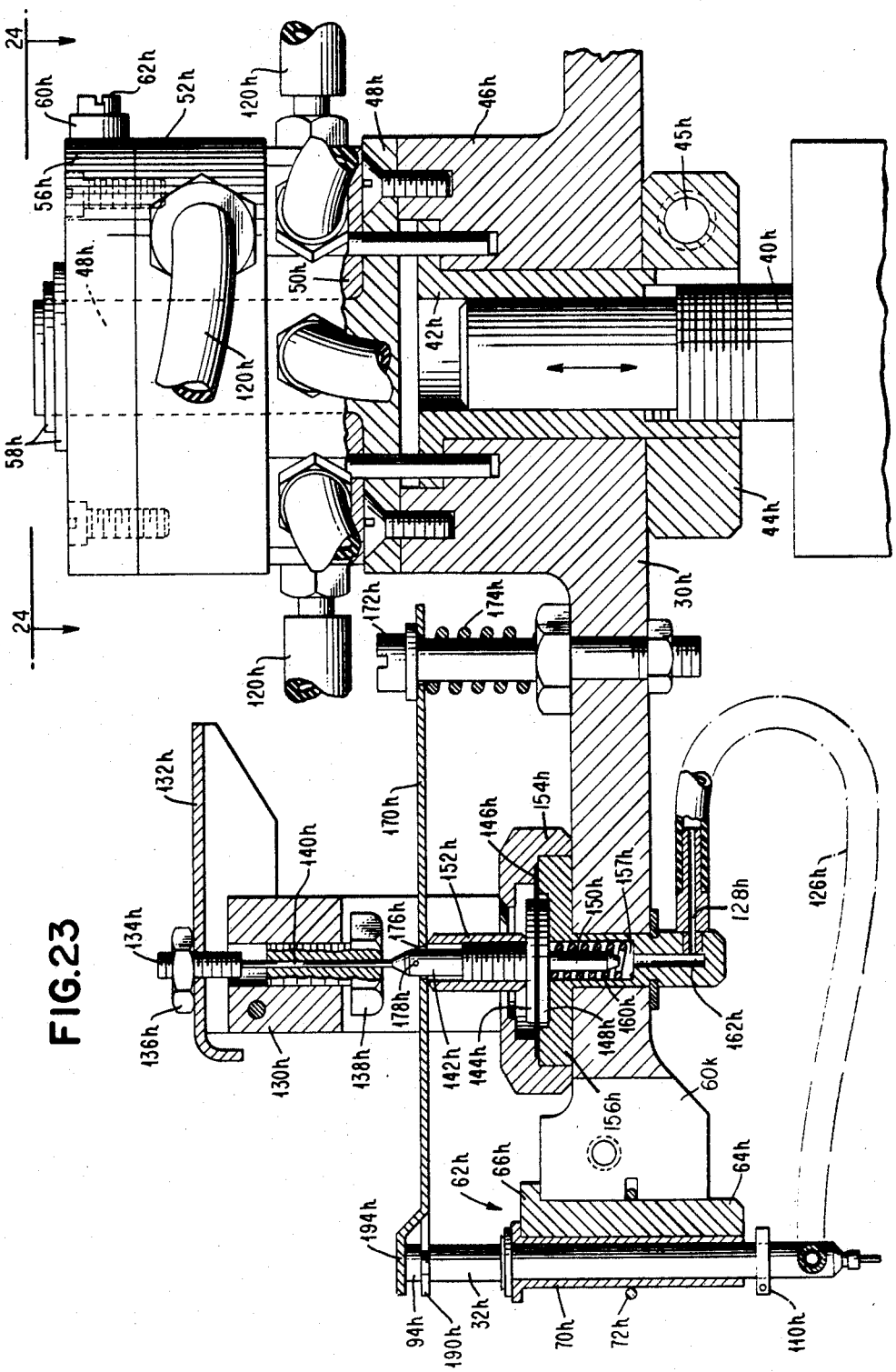

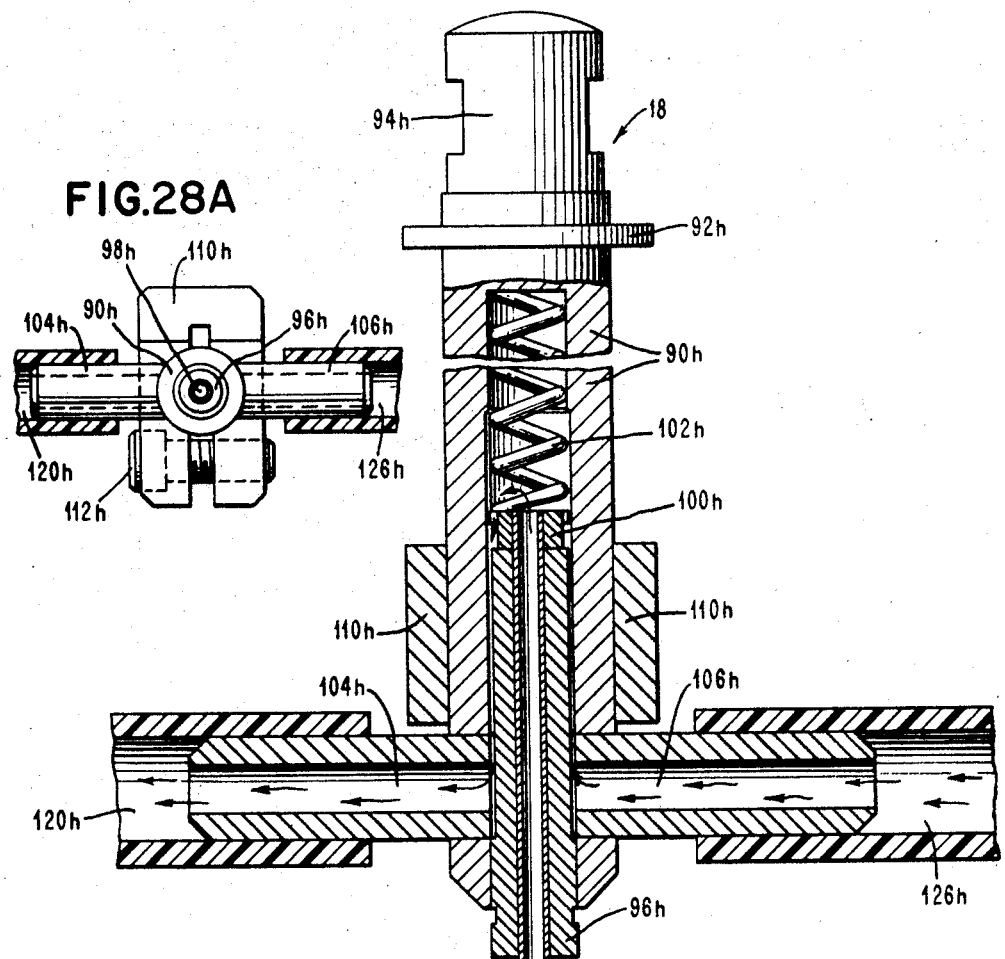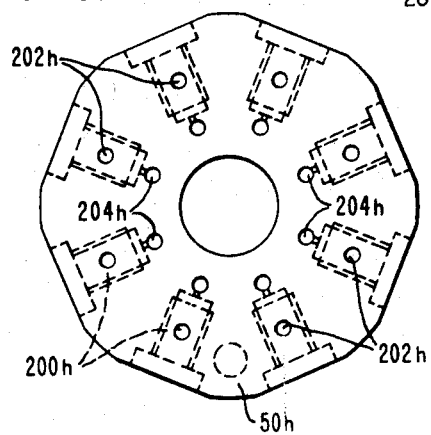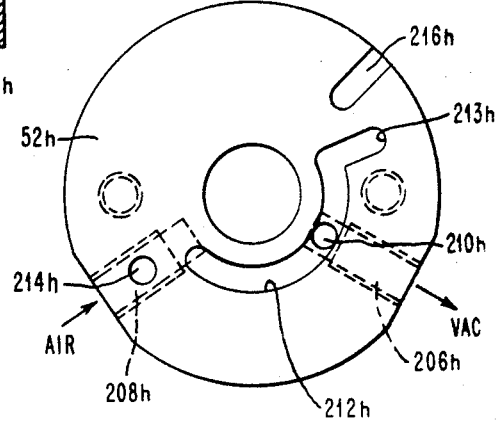

Original Filed May 27, 1965　　　　　　　　　31 Sheets-Sheet

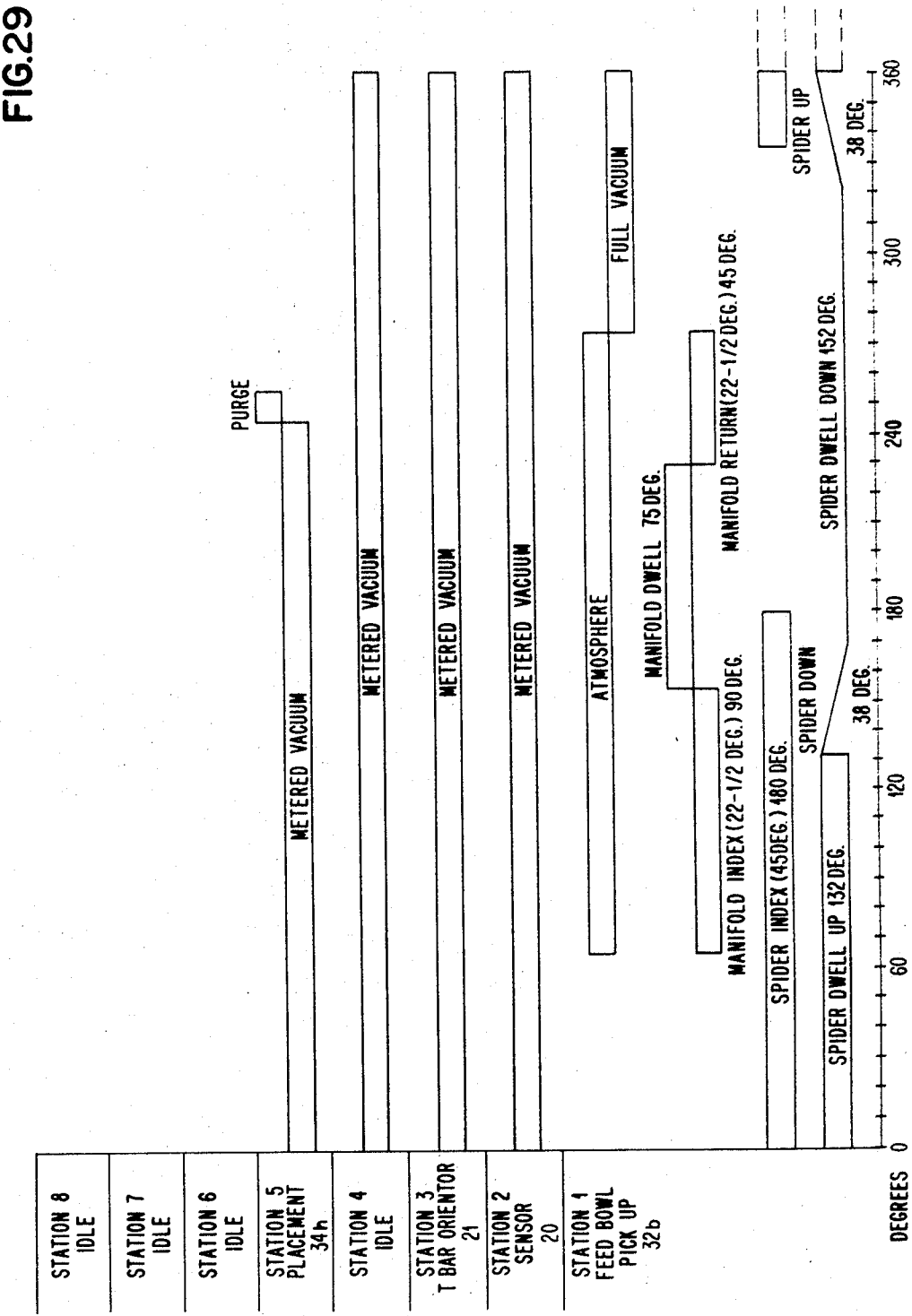

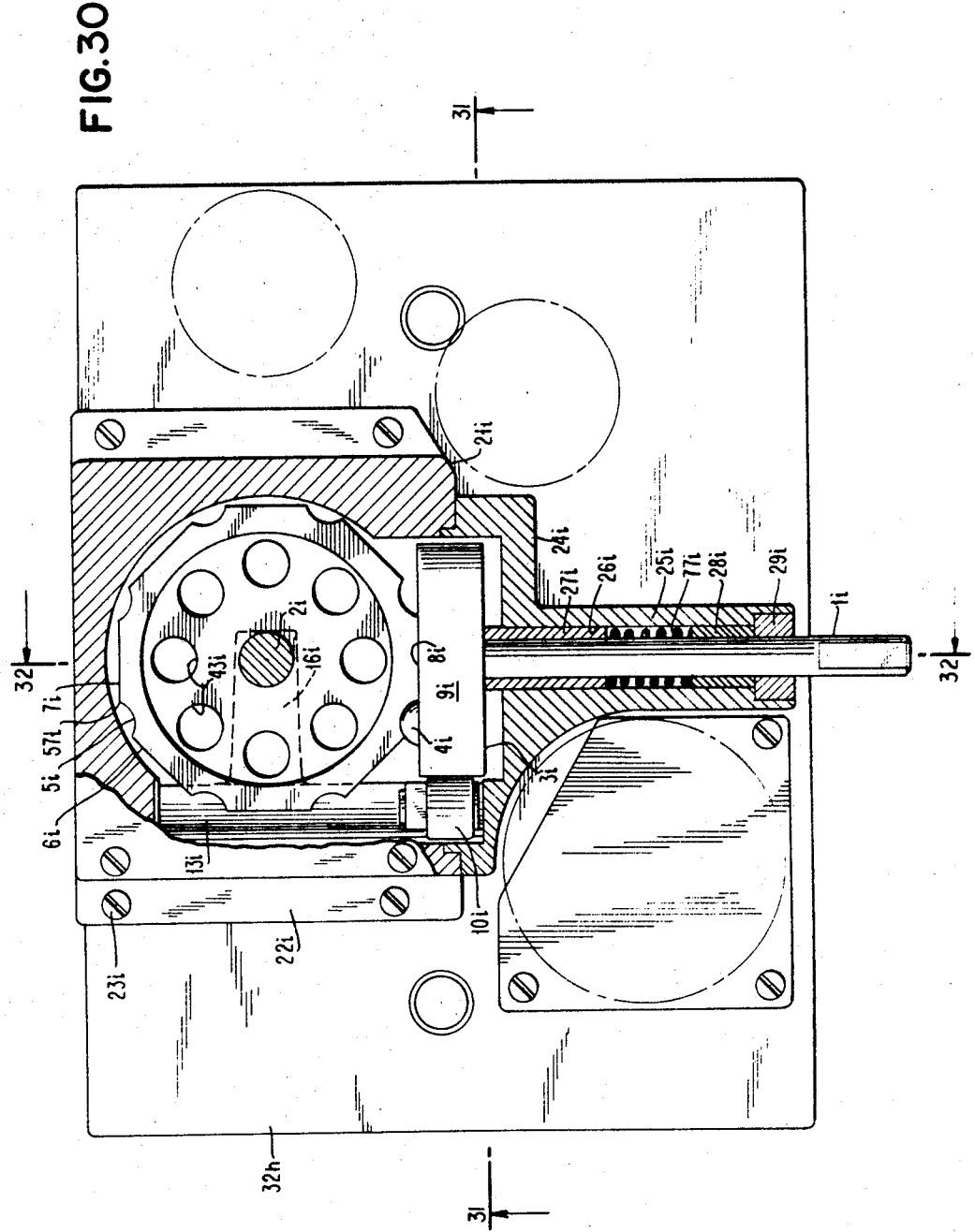

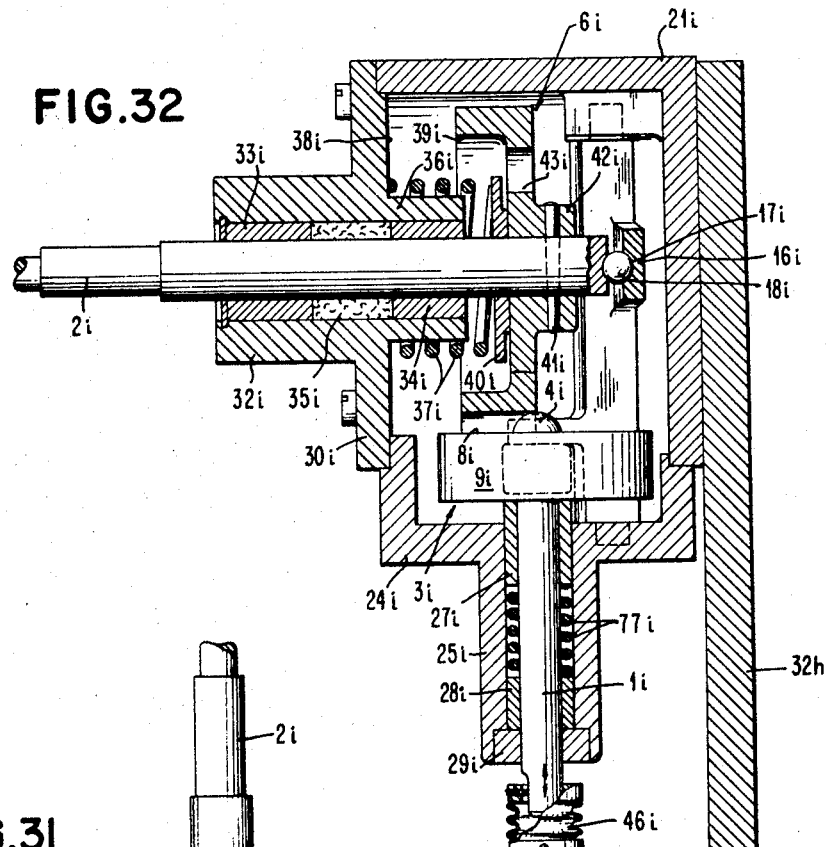
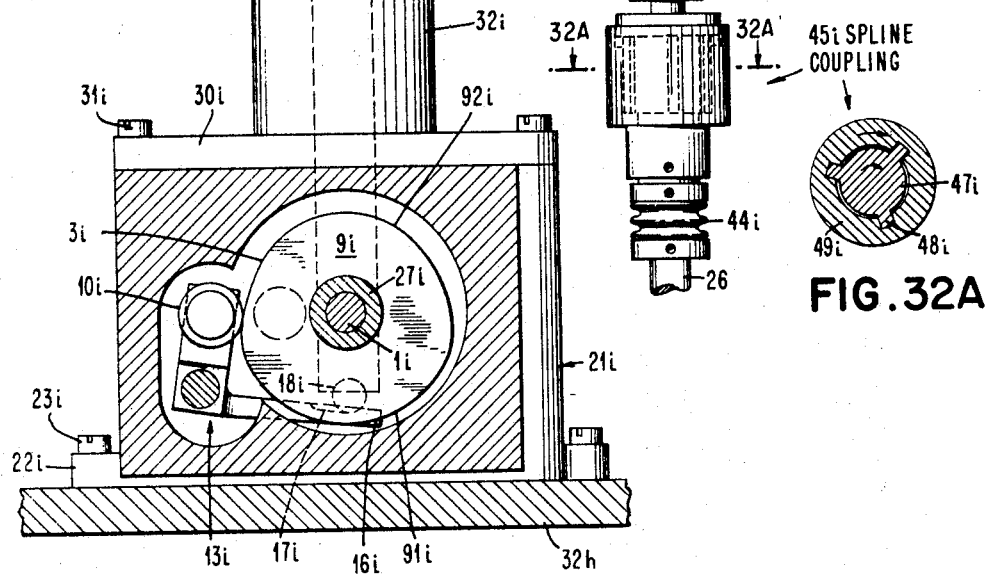

Oct. 21, 1969  G. C. BECK ET AL  3,473,212
CHIP PLACEMENT HEAD
Original Filed May 27, 1965  31 Sheets-Sheet 16
FIG. 41
FIG. 42
FIG. 43
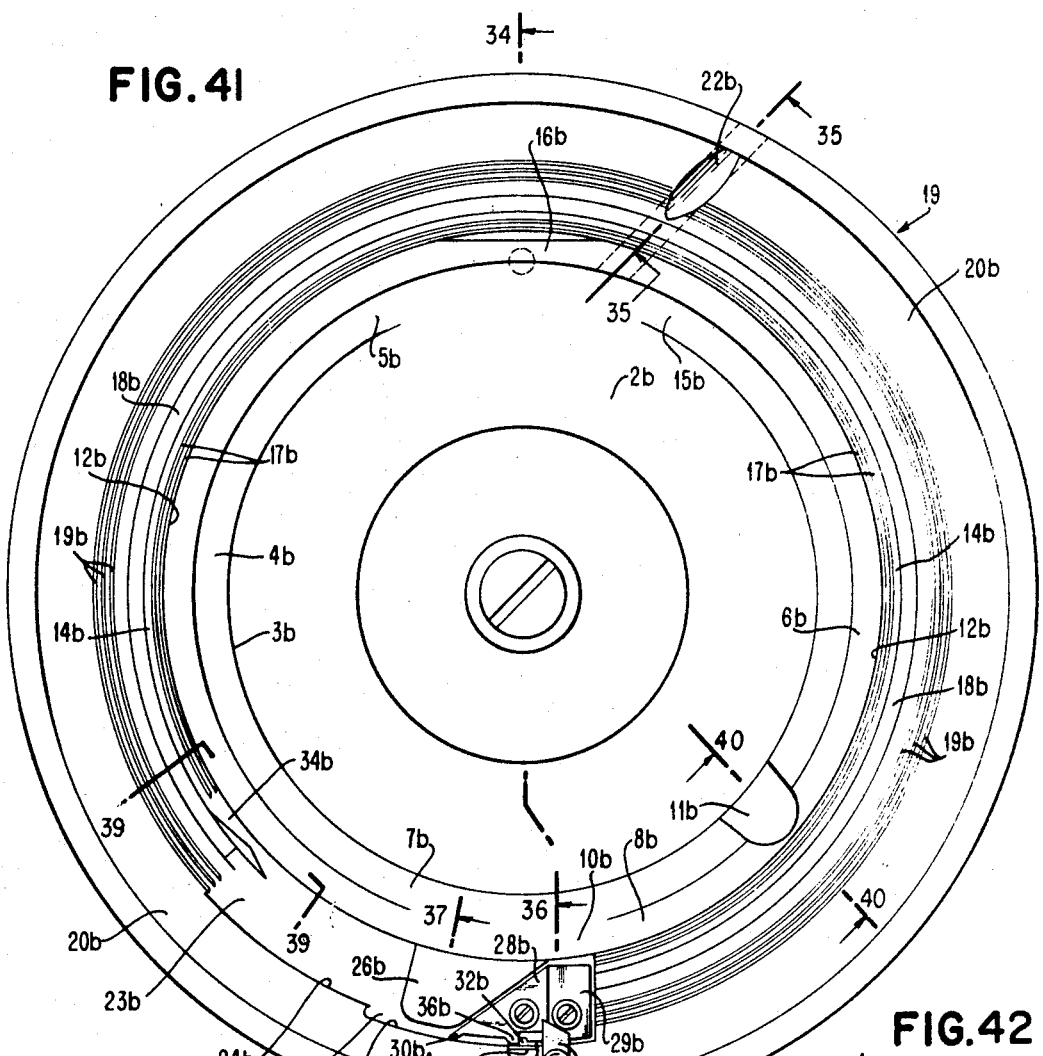
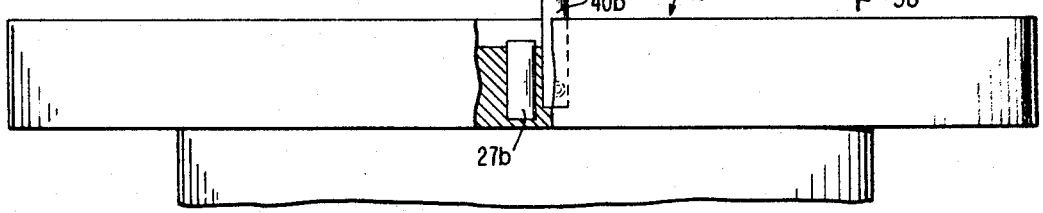

Oct. 21, 1969    G. C. BECK ET AL    3,473,212
CHIP PLACEMENT HEAD
Original Filed May 27, 1965    31 Sheets-Sheet 17

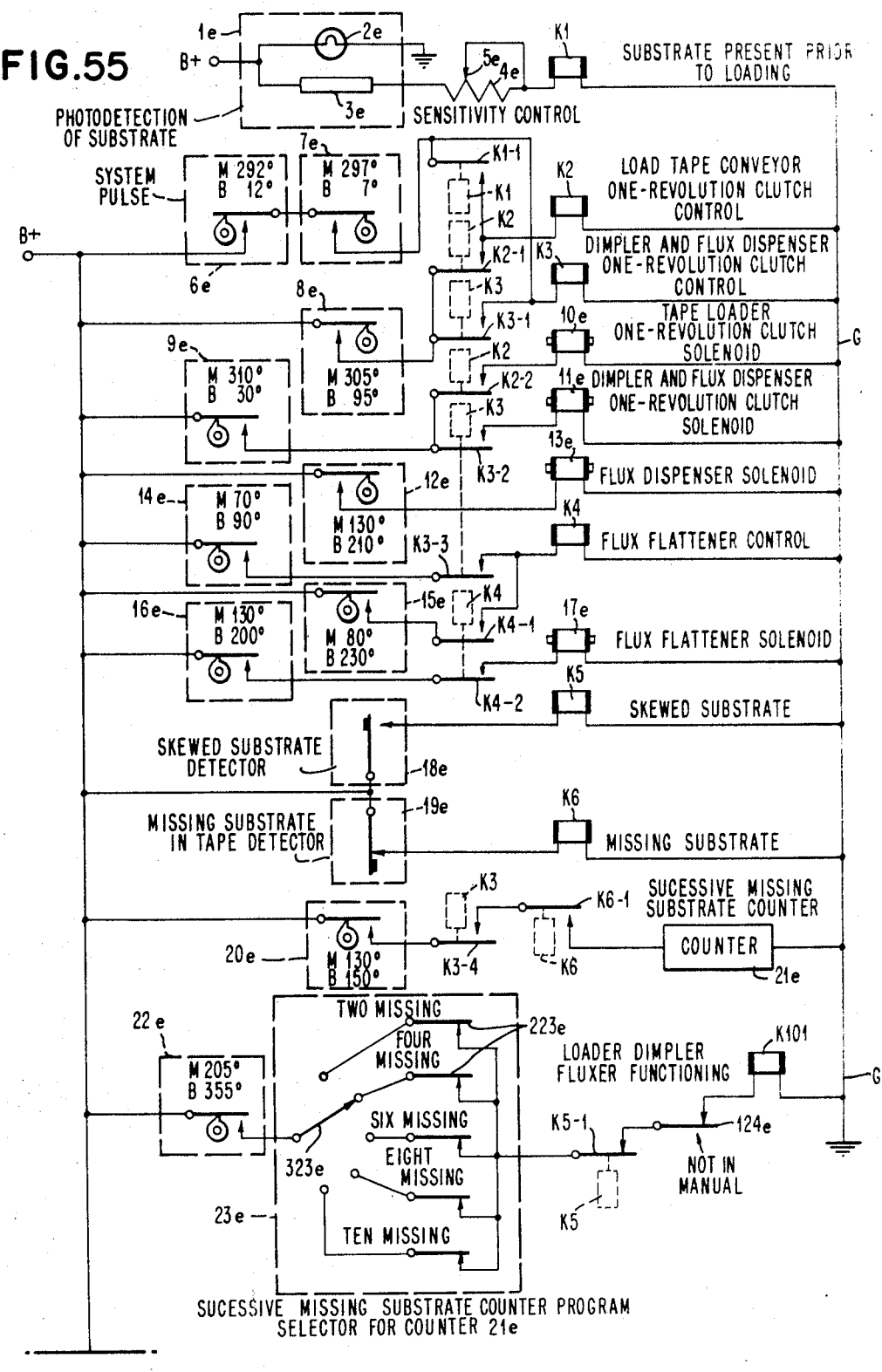

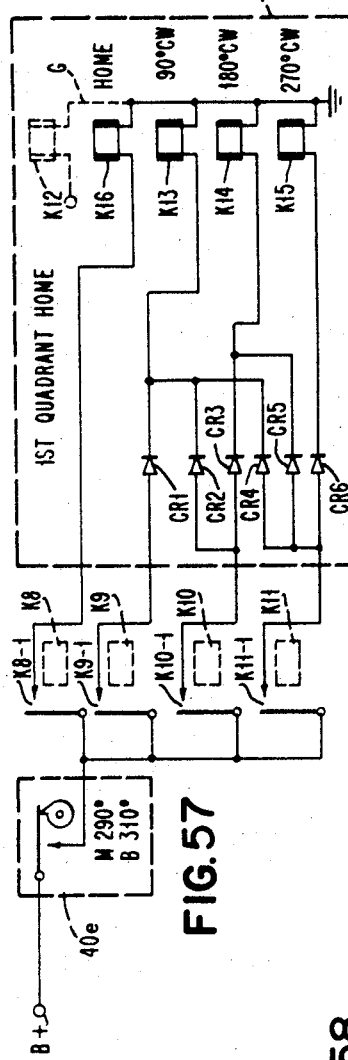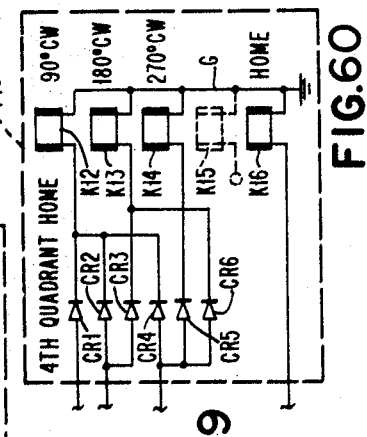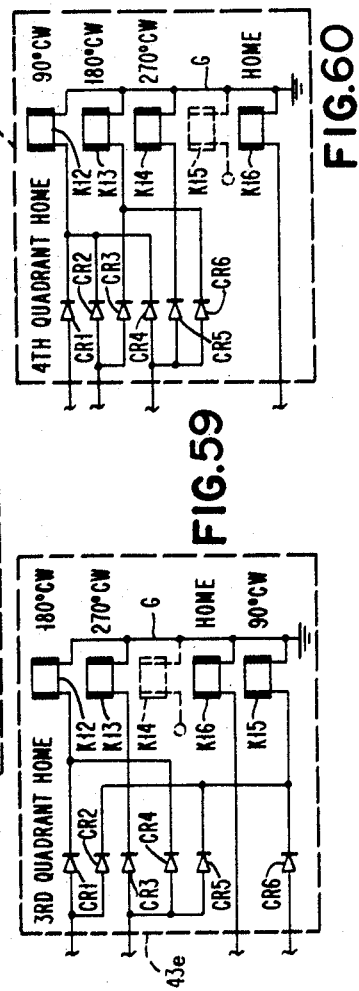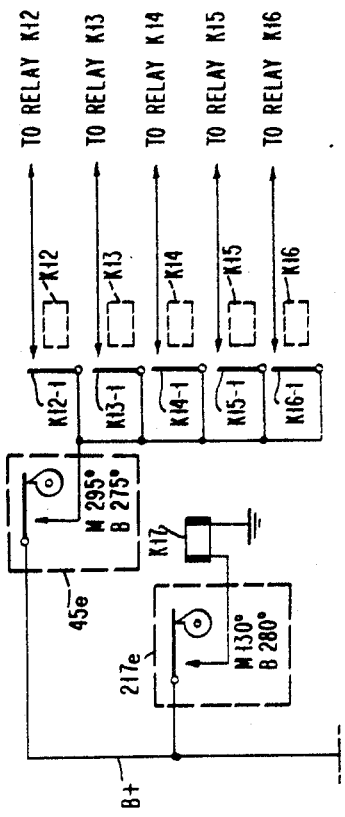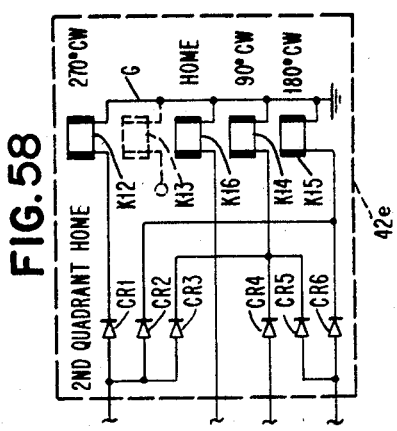

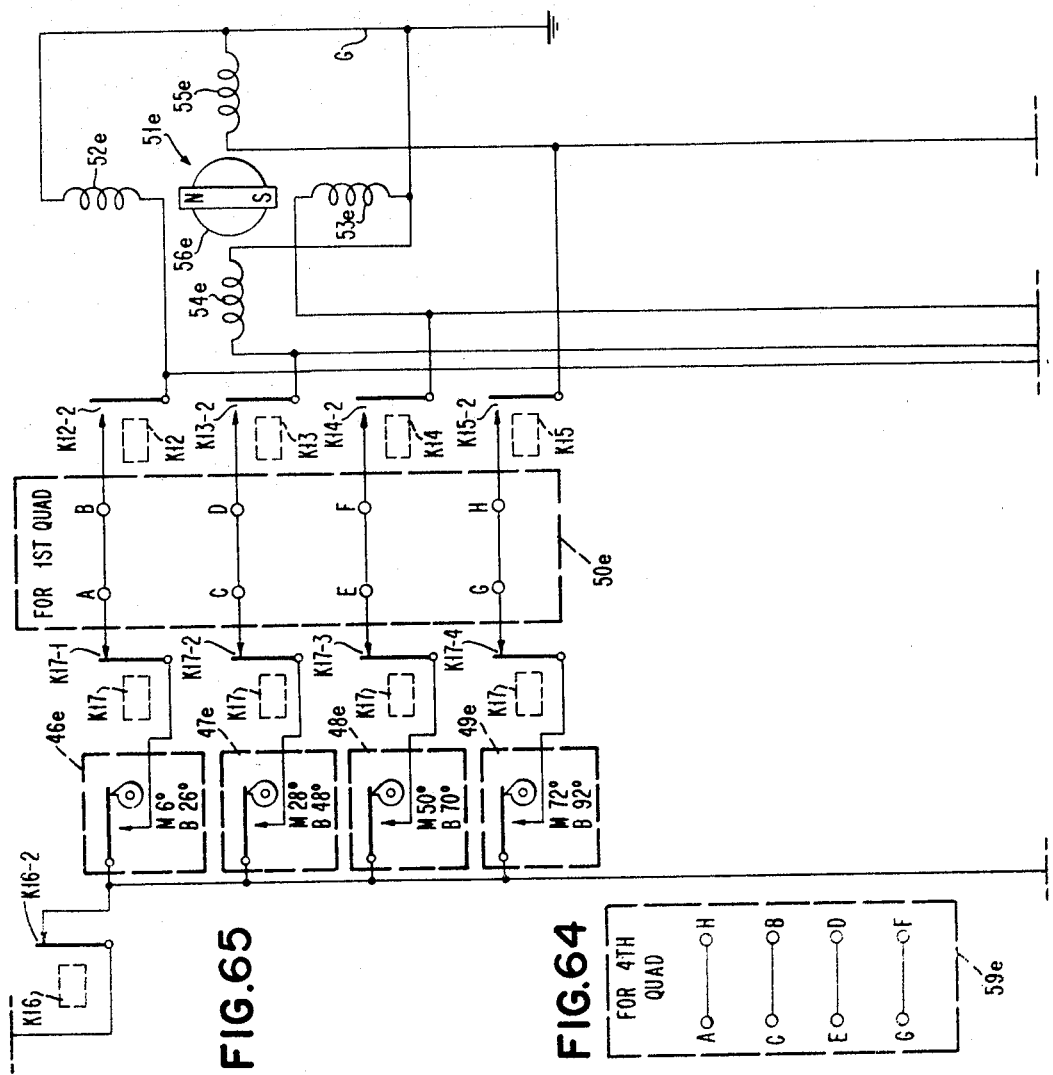

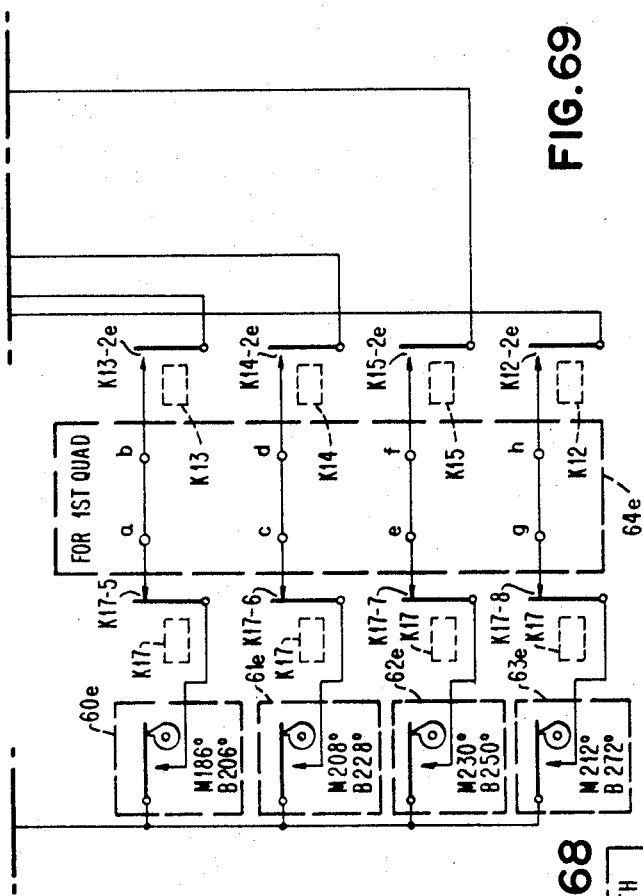
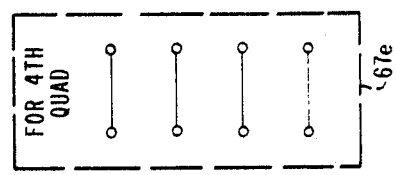
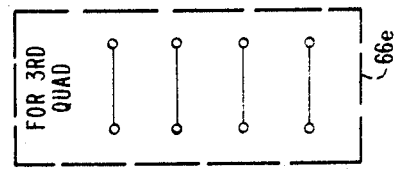
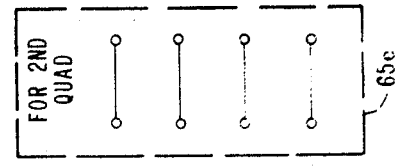

United States Patent Office 3,473,212
Patented Oct. 21, 1969

3,473,212
CHIP PLACEMENT HEAD
George C. Beck, Fishkill, Kendall Clark, Joseph G. Drop, and Jean J. L. Godat, Poughkeepsie, Arne H. Larsen, Wappingers Falls, and Thomas J. Rajac and George R. Santillo, Jr., Poughkeepsie, N.Y., assignors to International Business Machines Corporation, Armonk, N.Y., a corporation of New York
Continuation of application Ser. No. 459,379, May 27, 1965. This application Jan. 20, 1967, Ser. No. 611,220
Int. Cl. B23p *19/04*
U.S. Cl. 29—203           16 Claims

ABSTRACT OF THE DISCLOSURE

A multi-headed handling apparatus employed for orientating and placing semiconductor chips in precise locations on substrates, with each head of the handling apparatus adapted to transport a chip from a pick-up point to a placement station and deposit it upon a conductive land pattern of a prepositioned substrate where precise alignment is required between the contacts of the chip and the conductive land pattern on the substrate. Each head includes a pick-up means together with a means for indexing the pick-up means through a plurality of stations wherein: semiconductor chips are fed to and picked up by the pick-up means in a contacts-down configuration; a second station receives a contacts-down semiconductor chip carried by the pick-up means and includes means for engaging the exterior dimensions of the chip to further accurately align the outer dimensions of the chip with respect to the pick-up means, together with additional provision for determining the orientation of the contents associated with the chip so as to produce a signal indicative thereof; a third station adapted to receive the chips, which is provided with means which interact with the semiconductor chip contacts to rotate the chips to a position where its contacts are precisely orientated with respect to the pick-up means; and a final placement station wherein the pick-up means is precisely located in respect to the conductive land bearing substrate with the pick-up means being actuated, upon arrival at the placement station, to place its orientated semiconductor chip upon the conductive lands of the substrate.

---

This application is a continuation of prior copending application, Ser. No. 459,379, filed May 27, 1965, entitled "Chip Placement Head," George C. Beck et al., now abandoned.

This invention relates to semiconductor chip positioning machines and more particularly to a chip placement head usable therewith.

With the advent of hybrid transistor circuit technology, there arose more stringent requirements for precision, speed and uniformity than had theretofore been achieved in the art of automated circuit manufacture. This hybrid technique involves first the screen printing of resistors and conductive lands on an alumina substrate. A layer of solder flux is then applied to the substrate and then transistors or diodes in the form of thin, square or rectangular semiconductor chips are positioned on to the lands, with the flux providing the necessary adhesive qualities to keep the chips in place. Because the chips are almost microscopic in size, each measuring 0.28 inch square, and are joined to the lands by contact elements in the form of copper balls which are only .005 inch in diameter, they cannot be handled by conventional automated assembly techniques. The problem was further complicated by the need for extreme accuracy and precision in positioning the chips on the relatively small and closely spaced conductive lands which are only .005 to .015 inch wide and .005 inch apart, as well as by the extreme delicacy of the structure involved. Furthermore, the vast number of circuit substrates required in the manufacture of each digital computer, which is at present the primary use for this hybrid circuit technology, demands that the chip positioning and placement operation be performed at relatively high speeds and with a high yield in order to maintain the high volume required in production.

In copending U.S. patent application 459,179, filed on even date herewith, May 27, 1965, entitled "Chip Positioning Machine" by Clark et al. (IBM Docket 14,415) a machine capable of automatically preparing a substrate to receive semiconductor chips, placing the chips in place on the substrate, and testing for their proper placement is disclosed.

In copending U.S. patent application 420,594 filed Dec. 23, 1964, entitled "Orienting and Contacting Device" by Aronstein et al., which has been abandoned and refiled on May 19, 1966 as a continuation application, Ser. No. 572,615, now Patent No. 3,367,476, a semiconductor chip handling mechanism is described which sequentially picks up a semiconductor chip from a vibratory feedbowl, senses the orientation of the chip ball contacts, and reorients the chip to a desired configuration so that it may be placed upon a test fixture. The mechanism disclosed in the Aronstein et al. application is sufficiently precise for its intended purposes. However, when it is required that the semiconductor chips be placed upon substrates with much greater precision, the structure shown therein has not proven altogether satisfactory. In brief, chip alignment mechanisms in the Aronstein et al. invention only interact with the exterior dimensions of the semiconductor chip. While the accuracy of such apparatus is sufficient for testing considerations, the required repeatability of precise positioning is not always obtained in the placement environment.

Accordingly, it is an object of this invention to provide an improved chip placement head.

It is a further object of this invention to provide an improved semiconductor chip placement head which allows a semiconductor chip to be aligned by its most accurate dimensions.

It is still another object of this invention to provide an improved chip placement head which provides a semiconductor chip with succeedingly more precise alignments in preparation for placement.

And yet another object of this invention is to provide an improved chip placement head which aligns a semiconductor chip without damaging the contacts of the chip.

In accordance with the above stated objects, a chip placement head is provided with a plurality of vacuum pick-up means which are indexed through a plurality of stations. A first station provides the semiconductor chip to a pick-up point in a squared-off, contacts-down configuration. A second station receives the contacts-down semiconductor chip carried by a vacuum pick-up means and is provided with additional apparatus to engage the exterior dimensions of the chip to further accurately align the outer dimensions with respect to the vacuum pick-up means. The second station further includes means for determining the orientation of the contacts associated with the chip and producing a signal indicative of the sensed orientation. A third station is provided which receives the chip upon a rotatable means which interacts only with the semiconductor chip contacts (the dimension between these being the most critical on the chip) and rotates the chip to a position where its contacts are precisely oriented with respect to the vacuum pick-up means. A placement station is then provided wherein a substrate with a conductive land pattern has been prepositioned with respect to the vacuum pick-up means. Upon arrival of the vacuum pick-up means at the placement station, it is actuated and places the oriented semiconductor chip upon the conductive lands.

The foregoing and other objects, features and advantages of the invention will be apparent from the following more particular description of a preferred embodiment of the invention, as illustrated in the accompanying drawings.

In the drawings:

FIG. 1 is a schematic perspective view of a portion of a printed-circuit substrate with a semiconductor chip in position upon a set of land pads thereof;

FIG. 2 is a schematic perspective view showing the overall operation and sequence of stations of the subject machine and including the conveyor tape for carrying the substrates in succession to the various operating stations;

FIG. 3 is a front elevational view of the subject machine;

FIG. 4 is a top plan view thereof;

FIG. 5 is an operation flow diagram showing the sequence of operations performed successively upon each substrate and each chip;

FIG. 6 is a top plan view of a substrate showing an illustrative printed-circuit conductive land pattern thereon;

FIG. 7 is an enlarged view of a portion of FIG. 6 and shows a set of land pads with dimpled areas;

FIG. 8 is a schematic view showing a coining punch performing the dimpling operation.

FIG. 9 is a vertical sectional view through a land pad and shows a dimpled area formed on the pad surface;

FIG. 10 is a vertical sectional view showing the flux being dispensed onto the land pads;

FIG. 11 is an enlarged view similar to FIG. 7 but showing the dispensed flux;

FIG. 12 is a vertical sectional view taken substantially on line 12—12 of FIG. 11;

FIG. 13 is a vertical sectional view schematically showing the flux flattening operation;

FIG. 14 is an enlarged view similar to FIG. 7 but showing the flux spread over the land pads after the flattening operation;

FIG. 15 is a vertical sectional view taken substantially on line 15—15 of FIG. 14;

FIG. 16 is a vertical sectional view taken substantially on line 16—16 of FIG. 18 and shows a chip being placed upon the substrate by a vacuum needle;

FIG. 17 is a top plan view of a portion of the substrate and shows a chip in position upon one of the sets of land pads;

FIG. 18 is an enlarged view similar to FIG. 7 but showing a chip in position upon the land pads;

FIG. 19 is a side elevation of the chip placement head;

FIG. 20 is a plan view of the chip placement head in combination with each of the specific stations associated therewith;

FIG. 21 is a partial sectional view of the chip blowoff mechanism;

FIG. 22 is an isometric view of a representative arm of the chip placement head showing details of the vacuum pin arrangement;

FIG. 23 is a section view of a representative arm of the chip placement head taken along line 23—23 in FIG. 30;

FIG. 24 is a view taken along line 24—24 in FIGS. 22 and 23 to show the superimposed positions of the vacuum distributor and vacuum manifold;

FIG. 24A is a section view showing a representative vacuum nozzle and portion of the vacuum manifold taken along line 24A—24A in FIG. 24;

FIG. 25 is a plan view of the vacuum distributor with the vacuum manifold removed;

FIG. 26 is a view of the bottom portion of the vacuum manifold which normally mates with the upper portion of the vacuum distributor;

FIG. 28 is a complete section of a vacuum probe;

FIG. 28A is a view of a vacuum probe taken along line 28A—28A;

FIG. 29 is a timing chart helpful in understanding the operation of the chip placement head;

FIG. 30 is a horizontal sectional view of the indexing mechanism for the chip placement head;

FIG. 31 is a vertical sectional view taken substantially on line 31—31 of FIG. 30;

FIG. 32 is a vertical sectional view taken substantially on line 32—32 of FIG. 30;

FIG. 32A is a transverse sectional view taken on line 32A—32A of FIG. 32;

FIG. 41 is a top plan view of a preferred specific embodiment of the vibratory bowl feeder subcombination unit of our invention;

FIG. 42 is a detailed view in greatly enlarged scale of the structure of the chip pickup station;

FIG. 43 is a front elevational view in partial cross-section of the vibratory bowl shown in FIG. 41;

Figure 75:
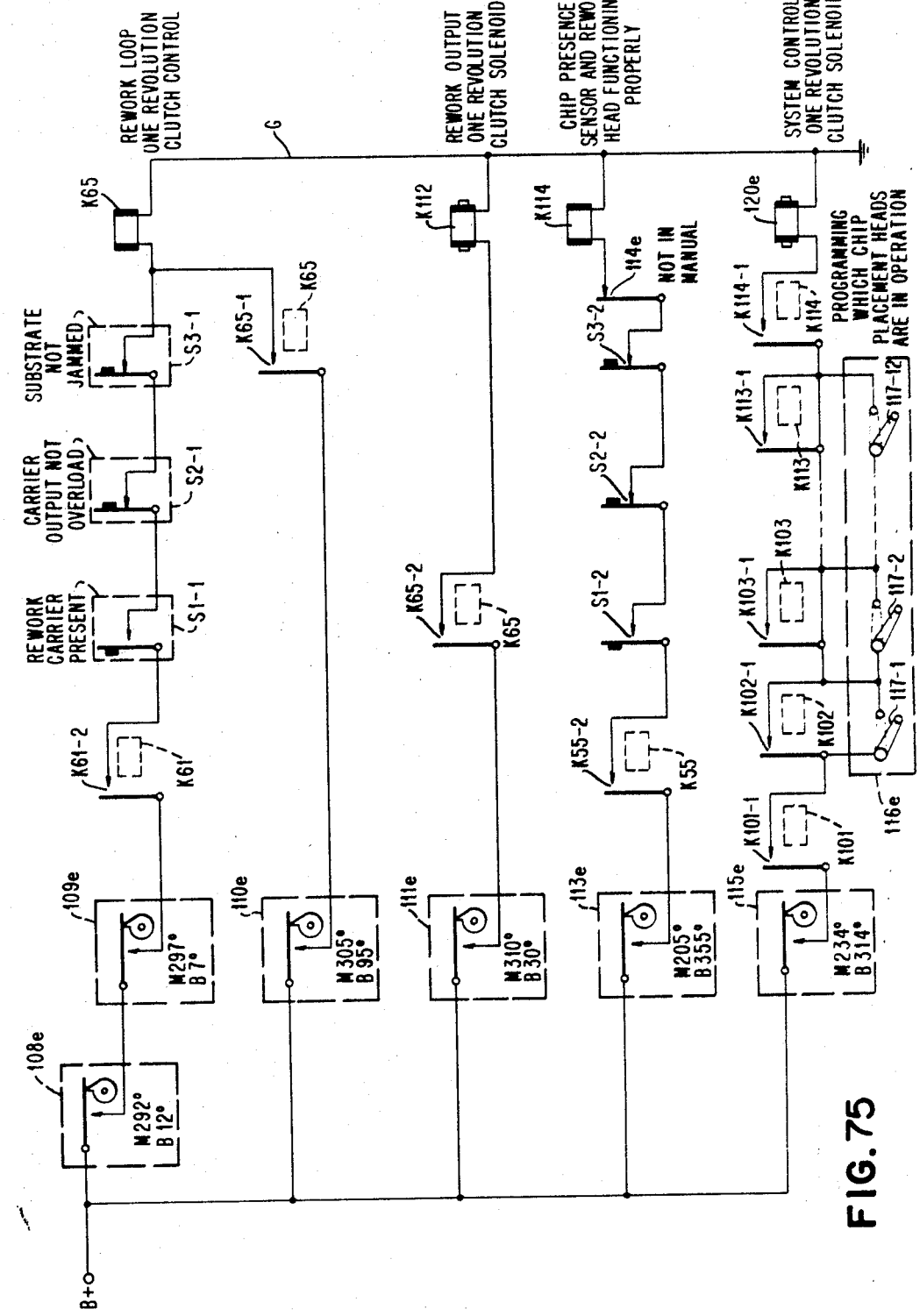
Figure 76:
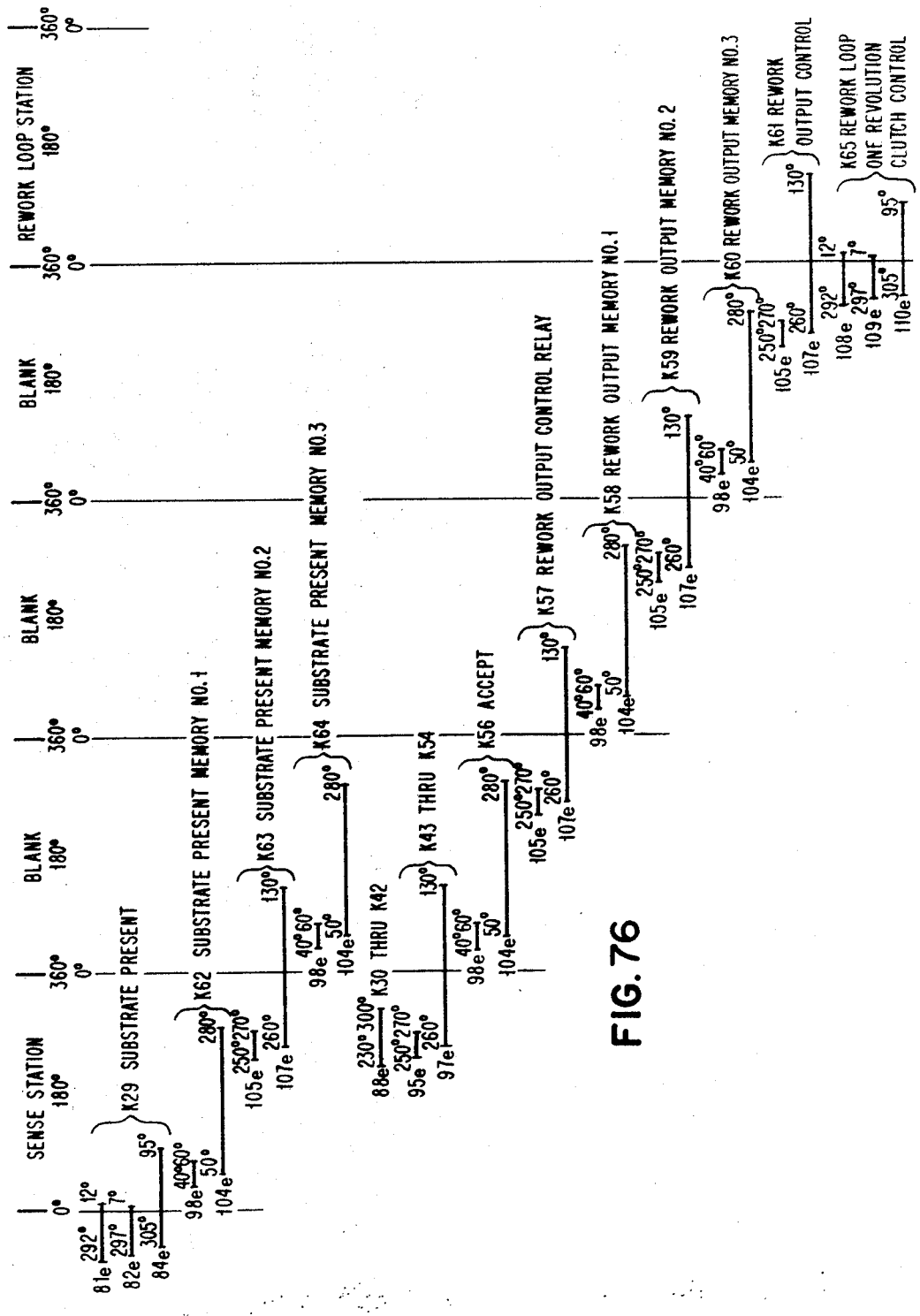

FIGS. 55 to 75 inclusive are electrical circuit diagrams showing the electrical control system for the subject machine; and FIG. 76 is a timing diagram showing the sequence of operations of several of the relays involved in the memory portion of the rework head control circuitry.

THE OVERALL OPERATION

The general nature of the structure and overall mode of operation of the subject chip positioning machine will first be described, after which the specific structure of each of the several devices will be explained in more detail. Referring first to FIG. 1 which shows the end product of the machine, a semiconductor chip C is assembled onto a substrate S with the three contact balls B of the chip resting upon the enlarged pads P of the conductive lands L formed on the upper surface of substrate S and constituting the printed circuit pattern.

Referring to FIG. 2, the successive operating stations are shown schematically and the series of substrates are carried in sequence from one station to the next by a metal conveyor tape 1 entrained around a pair of pulleys 2, 3 so that the upper run of tape 1 moves in the direction of the arrow 4 from left to right as viewed in the drawing. Tape loader 5 constitutes the first station and loads the substrates onto tape 1.

At the next station a dimpler 6 is provided with an array of coining punches to dimple a circular flat area 0.007 inch in diameter on each of the pads of the substrate. These flat areas are to receive copper balls of the chip when the latter is placed onto the substrate at the subsequent operating stations.

The dimpling operation is shown schematically in FIGS. 6 to 9 inclusive. FIG. 6 shows the upper surface of a substrate S with the pattern of the printed and tinned conductive lands L and screened resistors R thereon. FIG. 7 is a greatly enlarged view of a portion of FIG. 6 and shows the pad portions P of the lands and upon which the chip is to be positioned. In FIG. 8 there is shown a dimpling tool 7 having a coining punch 8 being pressed into the pad P to form therein the circular flat areas A shown in FIGS. 7 and 9.

The next station performs a flux dispensing operation whereby a droplet of flux is discharged onto the substrate area including land pads P. The flux dispenser is indicated generally by the reference numeral 9 in FIG. 2 and the fluxing operation is shown schematically in FIGS. 10 to 12 inclusive. Referring first to FIG. 10, the reference numeral 11 indicates generally a cartridge for containing liquid flux F and having a lower open end closed by a metal plate forming a mask 13 provided with an opening 14. The interior of cartridge 11 is maintained at a vacuum pressure to prevent liquid flux F from leaking through mask opening 14. At the proper timed instant a solenoid provides a pulse of air that overcomes the vacuum momentarily to force a droplet of flux F through opening 14 in mask 13. If no substrate S is present at the flux dispensing position at this time, the droplet of flux will adhere to the mask 13 and main body of flux within cartridge 11 due to surface tension and will eventually be withdrawn upwardly back through opening 14. Thus no dispensing operation will occur to contaminate the tape and other parts in the absence of a substrate.

However, if substrate S is present the flux droplet will contact the substrate surface and adhere thereto so as to be deposited thereupon in the form shown at FIG. 12. The flux droplet F as thus deposited is too high to permit accurate placing of the chips, and also will contaminate the vacuum needles.

To reduce the flux droplet height, the next operating station comprises a flux flattener indicated generally at 15 in FIG. 2 and functioning to emit a jet of compressed air against each of the flux droplets F to flatten and spread the latter. The flux flattening operation is shown schematically in FIGS. 13 to 15 inclusive. The nozzle for emitting a jet of air against the flux droplet F is indicated at 16 in FIG. 13 and the resulting flattened flux F is shown in FIG. 15.

Now that each of the pad configurations has been dimpled and fluxed to receive a chip C, the next operation is to position the latter thereon. For this purpose there are provided a series of chip placement heads indicated generally at 17 in FIG. 2 and constituting the next stations in the sequence to which substrate S is carried by conveyor tape 4. The number of chip placement heads 17 will correspond to the number of chips C to be positioned upon each of substrates S since each head 17 positions a chip at a particular location of the printed circuit pattern.

Before chip C is positioned upon substrate S it must first be oriented upon vaccum needle 18 so that its copper balls B are in proper alignment with the respective dimpled areas, A. The first step in this orientation procedure is to dispense chips C by means of a vibratory feeder bowl 19 shown associated with each of chip placement heads 17 in FIG. 2. As will be described in detail below, each bowl 19 feeds chip C in sequence to a pick-up location where each chip is picked up by the lower end of a respective one of vacuum needles 18. In the process of dispensing chip C each feeder bowl 19 orients each chip in two respects. First, chips C are aligned in an upright position with contact balls B extending downwardly as shown in FIG. 16. Second, when each chip C is dispensed to the pick-up point it is angularly oriented about a vertical axis to one of the four possible orientation quadrants described above.

After chip C is picked up on the lower end of vacuum needle 18, it must then be angularly rotated about a vertical axis from the original pick-up orientation to the required orientation for proper alignment with the particular land pattern configuration of the substrate at the location thereon at which the chip is to be positioned. For this purpose there is provided a chip orientation sensor indicated generally at 20 in FIG. 2 and which contacts the collector ball to determine the quadrant in which the latter is located. Chip placement head 17 is rotatably indexed to bring said needle with chip C thereon to chip orientation sensor 20. Thereafter chip placement head 17 is again angularly indexed to bring vacuum needle 18 with chip C thereon to the chip T-bar oriontor indicated generally at 21 which rotates the chip on vacuum needle 18 to the desired quadrant orientation corresponding to the land pattern configuration.

The chip positioning operation per se, usually referred to herein as "chip placement," is shown schematically in FIGS. 16 to 18 inclusive. This operation is performed after chip placement head 17 is twice angularly indexed after the chip orientation by T-bar 21. In FIG. 6 chip C is shown as being held upon the lower end of a vacuum needle 18 and being positioned onto substrate S so that the copper contact balls B of chip C are located on the dimpled flat areas A of substrate pads P. FIGS. 17 and 18 show chip C in assembled relation on the land pattern of substrate S. Chip C is temporaarily held in this assembled relation by the adhesive properties of flux F until the chip is permanently bonded to substrate pads P by a subsequent oven apparatus (not shown) which melts and reflows the solder previously deposited upon copper balls B and conductive land pads P. However, this bonding operation forms no part of the present invention and will not be further described.

After substrates S are carried by tape conveyor 1 from the last of the series of the chip placement heads 17, the next operating station in the sequence is a chip presence sensor indicated generally at 22 in FIG. 2. This device tests each substrate S to determine if the required number of chips C have been positioned thereon. Each substrate is thereby characterized as an "accept" or "reject" and this characterization is retained in the memory circuitry of the electrical control system to be described below until substrate S is carried by conveyor 1 to a rework head indicated generally at 23. This final station may be selectively programmed to remove from tape conveyor 1 either all of the accepted substrates or all of the rejected substrates. Generally it is programmed to remove all of the rejected substrates so that the latter may be reworked, usually by operators manually positioning chips at the missing locations. The accepted substrates continue on conveyor tape 1 toward its discharge end where they are removed by suitable interface apparatus (not shown) and loaded upon a subsequent conveyor for passage through said chip bonding oven (not shown).

The overall sequence of operative stations described generally above is shown in the operation flow chart of FIG. 5. The left flow column headed "SUBSTRATE" shows the sequence of operations on each substate S, and the right column headed "CHIP" shows the sequence of operations upon each chip C before the latter is positioned on a substrate S. The lower middle column shows the sequence of operations involving the assembled combination of the substrate S with chip C thereon.

As shown in FIG. 4, the several operating stations comprising tape loader 5, dimpler 6, flux dispenser 9, flux flattener 15, chip placement head 17, chip presence sensor 22, and rework head 23 are each drivingly actuated by a respective one of a series of transverse shafts 24 to 28 inclusive. The latter are in turn drivingly rotated through 360° at the proper time during each cycle of operation by a respective one of the solenoid-actuated one-revolution clutches 29 to 33 coupling said shafts 24 to 28 respectively to the bevel gear 34 of one of a series of right-angle drive transmissions 35 to 40 each having a bevel gear 41 drivingly engaging the respective gear 34 and fixedly mounted on a longitudinal main drive shaft 42. The latter is in turn driven by a right-angle drive transmission 43 having an input shaft 44 with a pulley 45 driven by a belt 46 from another pulley 47 mounted on the shaft of a variable speed electric motor 48. The speed of the latter may be selectably adjusted to operate the subject chip positioning machine at a rate varying from one substrate every two seconds to one substrate every half second.

Main drive shaft 42 is also drivingly connected through a transmission 49 and one-revolution clutch 50 to a cam 51 having a cam groove 52 within which rides a cam follower 53 rotatably mounted on one end of link 54. The other end of the latter is connected to one end of a transverse rod 55 having its opposite end connected to a lever 56. The lower end of the latter is pivotally mounted at 57 to a support 58 fixed to the machine frame member 59. The upper end of lever 56 is connected by link 60 to an intermediate portion of another lever 61 pivoted at its lower end 62 to support 58 and pivotally connected at its upper end 63 to a clamp actuating shaft 110c.

The latter extends longitudinally along the front of the machine adjacent the series of chip placement heads 17. Shaft 110c is provided therealong with a plurality of slotted members 12c which are moved by shaft 110c to open and close the substrate-locating clamps associated with chip placement heads 17, as will be explained in detail below. The left-hand end of shaft 110c is pivotally connected through link 64 to a clamp actuating shaft 10c also having slotted members 12c for actuating the three substrate-locating clamps associated with dimpler 6, flux dispenser 9 and flux flattener 15. The adjoining ends of shafts 10c, 110c are pivotally connected to the upper ends of links 65, 66 having their lower ends pivotally mounted to a support 67 mounted on frame member 59. The other end of shaft 10C is pivotally connected to the upper end of a link 68 having its lower end pivotally mounted to a support 69 mounted on frame member 59.

It will thus be seen that when one-revolution clutch 50 is actuated in a manner to be described below, cam 51 is rotated to move shafts 10C, 110c longitudinally through link 54 and rod 55, thereby actuating all of the clamps at the several stations.

Rotation of cam 51 through one cycle of revolution also causes conveyor tape 1 to be indexed one position in the following manner. Cam 51 is drivingly connected to the input shaft 70 of an index drive 71 having an output shaft 72. Each time that one-revolution clutch 50 is actuated cam 51 and input shaft 70 of index drive 71 rotate through a complete 360 degree revolution during the major portion of which index drive output shaft 72 will remain stationary. However, for a minor portion of the cycle of revolution of input shaft 70 the output shaft 72 indexes through an angular displacement of 60 degrees. This displacement is reduced by a reduction drive 73 having an output shaft 74 drivingly connected to conveyor tape pulley 3 rotatably mounted in bearing 75.

Each of the chip placement heads 17 is adjustably mounted for both transverse and longitudinal movement by mounting devices indicated generally at 82 in FIG. 3 so that each head 17 may be properly aligned with the respective substrate land location upon which the chip is to be placed. The transverse and longitudinal positions of each head 17 are adjusted by manual controls 83, 84. Mounting devices 82 may be of conventional construction and will not be further described.

CHIP PLACEMENT HEAD

Referring now to FIGS. 19 and 20, chip placement head 17 includes eight stations, four of which are idle and four of which perform specific functions in regard to feeding, orienting and placing the transistor chips in their proper position upon a substrate. The major moving part of chip placement head 17 is spider 30h which is provided with eight radial arms, each of which supports a vacuum needle 18. Each vacuum needle 18 is adapted to pick up a transistor chip, transport it between stations, and place it in its proper position upon a prefluxed substrate. The spider is actuated by an index mechanism to be described hereinbelow. Prior to each arm of the spider reaching a station, the entire mechanism is in an elevated position to allow the needle to clear obstructions between stations. Upon arriving at the stations, the spider is lowered by the indexing mechanism and lower the vacuum needles into the respective stations. At the termination of the stations' operations, the indexing mechanism raises the spider and rotates the spider arm to succeeding stations.

Before proceeding to a more detailed description of chip placement head 17, the following summary of operation performed at each of the stations will aid in understanding the operation of the system. The ultimate purpose of chip placement head 17 is to provide a transistor chip at placement station 34h (FIG. 20) with its copper ball contacts oriented in such a manner as to exactly mate with the dimple pattern on the substrate land configuration, and deposit the chip in place upon the substrate at the correct time. To accomplish this function, vibratory feed bowl 19 performs the function of providing chips to a chip pick-up station 32b in a queued-up ball-contact down configuration. While the ultimate desire is to place each semi-conductor chip on a substrate, this cannot be done unless the chip's ball-contacts are arranged to precisely mate with the substrate dimpled land pattern. Vibratory feedbowl 19 is incapable of assuring this required preset orientation. Accordingly, a vacuum needle 18 picks up a chip at pick-up station 32b and carries it to chip orientation sensor 20. Upon receiving a semiconductor chip, chip orientation sensor 20 performs two functions. First, a pair of guide jaws within the sensor 20 precisely locate the chip with respect to the tip of vacuum needle 18. In addition, when vacuum needle 18 inserts a chip in the ball-contacts down orientation into chip orientation sensor 20, an oddly placed ball-contact acts to deflect a lever arm thereby providing an indication of the chips orientation. A signal is produced indicating the sensed orientation and is transmitted to chip T-bar orientor 21. The T-bar orientor responds to the signal by pre-rotating to a position where its T-bar head will mate with the ball contact pattern. The aforementioned guide jaws are opened and the chip is readied for the next index step. When vacuum needle 18 and its associated chip are next indexed to T-bar orientor station 21, the vacuum needle places the chip upon a rotatable T-bar which as aforestated has been pre-rotated to fit within the interior of the chip's contact pattern. The T-bar orientor 21 then rotates the chip on the end of vacuum needle 18 to the correct orientation for placement. In addition to correcting the angular orientation of the chip, the mating of the T-bar with the contact pattern of the chip provides a final precise orientation of the chip and assures that its contacts will exactly mate with the substrate dimple pattern. Vacuum needle 18 and its associated chip is then indexed through an idle station to chip placement station 34h where it is placed upon a prefluxed substrate borne by a conveyor tape (not shown).

In addition to the above-described stations, chip placement head 17 is provided with blow-off mechanism 27h and a recycle switch VD1. Blow-off mechanism 27h is positioned intermediate chip orientation sensor 20 and chip T-bar orientor 21. Blow-off mechanism 27h is shown in section in FIG. 21 and comprises an airblast head 31h and an operatively disposed channel 33h which leads to a receptacle. Blow-off station 27h is so positioned that during the indexing of a vacuum needle from chip orientation sensor 20 to chip T-bar orientor 21, the needle tip and its associated semiconductor chip pass directly between airblast head 31h and channel 33h. If for any reason chip orientation sensor 20 provides an output which is indicative of a malformed chip a chip held on end, a chip with insufficient ball-contacts, etc., it energizes a logic circuit which causes a blast of air to be applied to head 31h. This airblast is sufficient to dislodge a chip from the tip of a vacuum needle and cause it to enter channel 33h to the receptacle.

Recycle switch VD1 (FIG. 19) is basically a microswitch with a downwardly extending switch actuating lever 35h. Its operation in combination with other portions of chip placement head 17 will be described in greater detail hereinafter.

The main drive for chip placement head 17 comes from shaft 26 which feeds directly into head indexing mechanism 25h. This mechanism is described in greater detail hereinafter, but for the time being it will suffice to say that the mechanism provides an indexing drive motion via shaft 40h to spider 30h. It also provides a required vertical displacement of shaft 40h and spider 30h during the time when vacuum needles 18 are being indexed between stations (to prevent damage to the needle tips). As shown in FIG. 23, shaft 40h has a threaded portion which threads into interior threads in bushing 42h. Clamp 44h prevents rotary movement between shaft 40h and bushing 42h once the desired orientation between them has been established. Clamp 44h is tightened by virtue of a bolt which extends through hole 45h. Bushing 42h is shrunk to fit into spider collar 46h to prevent any relative movement therebetween. A centering plate and shaft 48h are rigidly affixed to spider collar 46h via a plurality of set screws. Vacuum distributor 50h fits down over the centering shaft 48h and provides the means for distributing both vacuum and positive air pressure to the respective arms of spider 30h. Directly over and mating with distributor 50h is vacuum manifold 52h which provides the function of supplying and switching vacuum and positive air pressure between various ones of the outputs of distributor 50h. Distributor 50h is rigidly affixed to and rotates with spider collar 46h by virtue of pins 54h which extend through centering plate 48h, bushing 42h and into collar 46h. A manifold top plate 56h fits directly over manifold 52h and is affixed thereto by set screws. Retaining plates 58h fit down over shaft 48h and rigidly force manifold 52h to bear against distributor 50h and provide an airtight seal therebetween. A bushing 60h is rigidly attached to the side of manifold top plate 56h by set screw 62h. The relative position of vacuum manifold 52h with respect to vacuum distributor 50h can be varied by causing a force to be applied to bushing 60h thereby causing a rotation of manifold top plate 56h and manifold 52h about centering plate shaft 48h. The specific operation of this apparatus will be described in detail hereinafter.

Since each arm of spider 30h is structurally identical, only one need be explained. An isometric view of one arm is shown in FIG. 22 and the same arm in section is shown in FIG. 23. Spider arm 30h has an enlarged and slotted end portion 60k with a vertical hole drilled therethrough which is adapted to accommodate a vacuum needle holding fixture 62h. Fixture 62h comprises a round portion of bar stock 64h which has been slotted to accommodate vacuum needle 18. A cap 66h is attached to bar stock portion 64h. The center line of bar stock portion 64h falls to the right of the end of enlarged portion 60h of spider arm 30h. If it is thus desired to adjust the exact location of vacuum needle 32h, cap 66h may be grasped and rotated with a resultant lateral movement of vacuum needle 18 occurring due to the offset between the center line of bar member 64h and the enlarged end 60h. When set screw 68h is tightened, it draws the slotted portions of enlarged member 60h together, thereby gripping vacuum probe holding fixture 62h and preventing any further lateral movement thereof. Vacuum needle 18 is slidably mounted in necked cylinder 70h which is in turn held to vacuum probe holding fixture 62h by spring clip 72h.

The structure of a vacuum needle 18 is shown in FIG. 28. Outer housing 90h is a hollow tube with one closed-off end. At the upper extremity of housing 90h, a downward limiting stop 92h and slotted nut 94h are attached. Interior to housing 90h is a fixed bushing 96h which has slidably mounted therein hollow probe pin 98h. Attached to one end of probe pin 98h is an extended diameter collar 100h. A compression spring 102h bears down upon extended collar 100h and acts to maintain probe pin 98h in a downwardly extended position. Extending through housing 90h are a pair of tubes 104h and 106h. It should be noted that bushing 96h is attached to the inner surface of housing 90h only below the entry point of tubes 104h and 106h. Above their attachment point, there is a clearance space between housing 90h and the outer circumference of bushing 96h. Thus, if a vacuum is applied to tube 104h, not only will air be drawn up through probe pin 98h and down through the clearance area between bushing 96h and probe body 90h, but also, air will be drawn into tube 106h, around bushing 96h and into tube 104h. Thus, if a vacuum is applied to tube 104h and there is a semiconductor chip held at the end of probe pin 98h, all of the air drawn through vacuum needle 18 must come via tube 106h. If on the other hand, there is no chip held by probe pin 98h, a significant portion of the air drawn into tube 104h will be drawn through probe pin 98h thereby considerably reducing the vacuum applied via tube 106h. As will become hereafter apparent, this fact is utilized to control the recycle actuating mechanism.

An adjustable stop 110h surrounds housing 90h and provides a lower limiting stop for the travel of vacuum needle 18. FIG. 28A better shows the details of stop 110h. By causing set screw 112h to be loosened, stop 110h may be moved either up or down on housing 90h. As can be seen by examining FIG. 43, vibratory feed bowl 19 has a stop 40b associated therewith. When vacuum probe 32h is lowered into feed bowl 19, stop 110h is adjusted to impact with stop 40h to prevent the tip of probe pin 98h from touching the surface of a semiconductor chip and thereby being damaged.

Returning now to FIG. 22, hose 120h connects tube 104h to a vacuum outlet nozzle 230h from vacuum distributor 50h. A filtering agent 124h is shown in a cutaway portion of hole 120h and prevents debris from being drawn up into the vcauum mechanism. An additional hose 126h connects tube 106h to the recycle lever actuation mechanism via vacuum port 128h. A constrictor 127h is inserted into hose 127h for a purpose to be hereafter discussed.

The purpose of the recycle lever actuation mechanism is twofold. It is basically a pneumatic logic element which reacts to the absence of a semiconductor chip at the tip of a vacuum needle by (1) raising the vacuum needle and (2) raising the switch actuating lever so that it may engage the recycle switch. The recycle lever actuation mechanism is supported by a vertically disposed housing 130h which is rigidly affixed to spider arm 30h. Pivotally mounted on the upper extended portion of vertical housing 130h is recycle actuation lever 132h. As can be more clearly seen in FIG. 23, a screw 134h is threaded through recycle actuation lever 132h and is held in place by nut 136h. A hollow hex-head screw 138h is threaded into the extended portion of a vertical housing 130h and forms the guide for a slidably mounted push pin 140h. Push pin 140h resets at its lower extremity upon impeller 142h. The lower portion of impeller 142h is threaded and extends through washer 144h, and diaphragm 146h to a diaphragm hold plate 148h. A guide pin 150h is attached to and points downwardly from diaphragm hold plate 148h. A bushing 152h is threaded onto the threaded portion of impeller 142h and holds washer 144h, diaphragm 146h and diaphragm hold plate 148h in a sandwich-like configuration. The outer circumference of diaphragm 146h is clamped between members 154h and 156h. Member 156h has an orifice 157h which houses compression spring 160h. A communicating orifice 162h connects to vacuum port 128h and hose 126h.

A leaf spring 170h is restrained at one end by a nut and shaft arrangement 172h. Compression spring 174h allows leaf spring 170h to pivot in the plane of the paper while maintaining it in its indicated position. A clearance hole 176h in leaf spring 170h mates with impeller 142h and locking pin 178h holds leaf spring 170h against bushing 152h. At its far extremity (see FIG. 22), leaf spring 170h is arranged to lock with slotted nut 94h via its separated arms 190h and 192h. Arm 194h bears upon the upper portion of slotted nut 94h.

In brief, the actuation of recycle lever 132h causes it to be tilted upwardly so that its end engages the downwardly extending arm 35h of recycle switch VD1 (FIG. 19). This indicates to the machine that no semiconductor ship is held by the tip of the associated vacuum needle and that when the placement operation occurs with this respective vacuum needle, that the conveyor tape must be held in place until the next vacuum needle is indexed into the chip placement station 34h. If this does not occur, the substrate which arrives at the chip placement station at the same time with the particular needle without a chip arrives, the substrate will obviously have no chip placed thereon and will be defective. At the same time lever 132h is raised, leaf spring 170h also raises vacuum needle 18 and prevents it from being immersed in the prefluxed surface of the substrate at chip placement station 34h. This action thereby prevents the needle from being clogged and carrying the flux to other portions of the chip placement head. It is vitally important in the operation of this machinery that no flux enter any portions thereof.

In the detailed description of the operation of recycle lever actuation mechanism which follows, FIGS. 22 and 23 will be primarily referred to. When spider arm 30h arrives at chip pickup station 32b it is lowered into place over the station through the action of the spider's movement. Stop 110h engages stop 40b in vibratory bowl 19 and causes leaf spring 170h to be flexed upwardly thereby preventing any vacuum needle bounce. At this time, no vacuum is applied via tube 120h to vacuum needle 18. In the recycle lever actuating mechanism, compression spring 160h pushes diaphragm 146h upwardly until washer 144h engages the bottom of member 154h. Impeller 142h is thus also moved upwardly and push pin 140h bearing against threaded screw 134h causes recycle lever 132h to be tilted upwardly (as shown in phantom in FIG. 22).

When vacuum needle 18 is placed over chip pickup station 36h, a vacuum is applied via hose 120h to the needle. The air which is thus caused to be drawn up through probe pin 98h (FIG. 28) picks up a semiconductor chip and causes the tip of probe pin 98h to be sealed. The vacuum applied via hose 120h must thereby be satisfied by the air flow through hose 126h. The increased vacuum in hose 126h is reflected into orifice 157h in the recycle lever actuation mechanism via port 128h and orifice 162h. The increased vacuum opposes the action of compression spring 160h and thereby brings diaphragm 146h down to the unstressed position shown in FIG. 23. Note that diaphragm 146h completely seals the vacuum system from the atmosphere and so long as a significant vacuum is applied via hose 126h diaphragm 146h will remain in its indicated position. When diaphragm 146h is drawn downwardly by the applied vacuum, the impeller 142h and push pin 140h are also drawn down with the result being that recycle actuation lever 132h is lowered to the horizontal position.

Immediately after a chip is picked up by vacuum needle 18 the amount of vacuum applied to tube 120h is somewhat lowered by vacuum manifold 52h (in a manner to be described hereinafter), but so long as a chip remains on the tip of probe pin 98h, the vacuum reflected through hose 126h is sufficient to overcome spring 160h and maintain diaphragm 146h in its unstressed position.

Should it occur that no semiconductor chip is picked up at chip pickup station 136h or, that during the indexing operation of the chip placement head, the chip is dislodged from the tip of probe pin 98h (e.g. by chip blowoff mechanism 27h), the following action occurs. The aforementioned reduced vacuum which was applied immediately after vacuum probe 32h left chip pickup station 36h is of sufficient quantity to maintain diaphram 146h in its unstressed position only so long as the tip of probe pin 98h is sealed. If for any reason a semiconductor chip is dislodged therefrom, the resulting reduction in vacuum through hose 126h allows compression spring 160h to expand and raise diaphram 146h to a point where washer 144h bears against the bottom of member 154h. This action, through the aforedescribed mechanism, causes leaf spring 170h to raise thereby raising vacuum needle 18 and also raises recycle lever 132h to its titled position. Thus, when this particular vacuum needle leaves the chip T-bar orientor 21, the tilted portion of recycle lever 132h engages arm 35h of recycle switch VD1 (FIG. 19). The actuation of recycle switch VD1 inhibits the indexing of the conveyor tape for one cycle and allows a substrate on the tape to await the arrival of the following vacuum needle. The action of leaf spring 170h in raising vacuum probe 32h prevents the tip of probe pin 98h from being dipped into the flux on the surface of the positioned substrate, thereby preventing it from being clogged.

With reference now to FIGS. 24 to 26, vacuum manifold 52h and distributor 50h will be described. In FIG. 24, vacuum manifold 52h is shown in place over vacuum distributor 50h. The center shaft of centering plate 48h extends up through and aligns vacuum distributor 50h and vacuum manifold 52h with each other. To better visualize the structure of vacuum distributor 50h, refer to FIG. 25 where it alone is shown. A plurality of threaded fittings 200h are provided therein and adapted to accept vacuum nozzles (to be hereinafter described). Each threaded fitting is provided with two holes 202h and 204h both of which communicate with the upper surface of vacuum distributor 50h. Turning now to FIG. 26, a vacuum manifold 52h has been flipped over to show its underside which normally mates with the upper side of vacuum distributor 50h. Vacuum manifold 52h is provided with two inlet fittings, fitting 206h being utilized to provide vacuum and fitting 208h being utilized to provide pressurized air. Vacuum fitting 206h is provided with a hole 210h which communicates with a semicircular indented channel 212h. At one extremity, indented channel 212h is provided with a perpendicular leg 213h. Air inlet 208h is also provided with a hole 214h which communicates with the surface of vacuum manifold 52h. An atmospheric inlet 216h is also formed into the surface of vacuum manifold 52h.

Referring now back to FIG. 24, the relative positions of the air and vacuum inlets 206h and 208h respectively are shown as is also the location of channels 212h with respect to holes 204h. Note that hole 202h only has vacuum applied to it when it is coincidently positioned with perpendicular vacuum channel 213h. Note also that hole 214h in an inlet 208h is coincident with hole 202h in vacuum fitting 215h when both the air inlet and fitting are aligned.

Referring to FIG. 24A, a sectional view of a representative vacuum nozzle 230h in place in a vacuum fitting in vacuum distributor 50h is shown. When nozzle 230h is inserted into the vacuum fitting and tightened down, it compresses O rings 232h and 234h to provide airtight seals. Hole 236h provides communication between the interior hollow section of nozzle 230h and hole 202h in vacuum distributor 50h. An additional smaller diameter hole 238h is drilled in aligning pin 240h and opens the interior of nozzle 230h to hole 204h in vacuum distributor 50h. With vacuum manifold 52h in place as shown, perpendicular channel 213h communicates with both holes 202h and 204h. Thus, if a vacuum is applied via vacuum inlet 208h, air may be drawn through both holes 236h and 238h and 202h and 204h respectively, to create a substantial vacuum at the outlet of vacuum nozzle 230h. If now, vacuum manifold 52h is rotated with respect to vacuum distributor 50h allowing only hole 204h to communicate with vacuum channel 212h, a "metered" vacuum is applied via hole 238h to vacuum nozzle 230h. This is the same reduced vacuum referred to hereinbefore which is applied to a vacuum needle immediately after it leaves pickup station 32b.

Figure 27A:
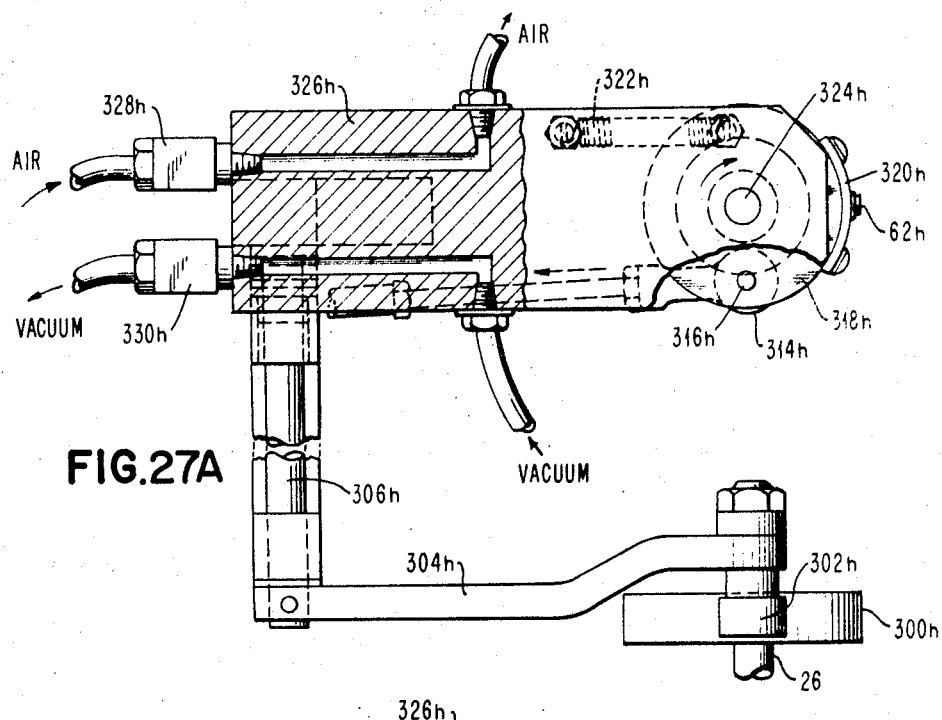
FIG. 27A is a plan view of the mechanism of FIG. 27.
Figure 27:
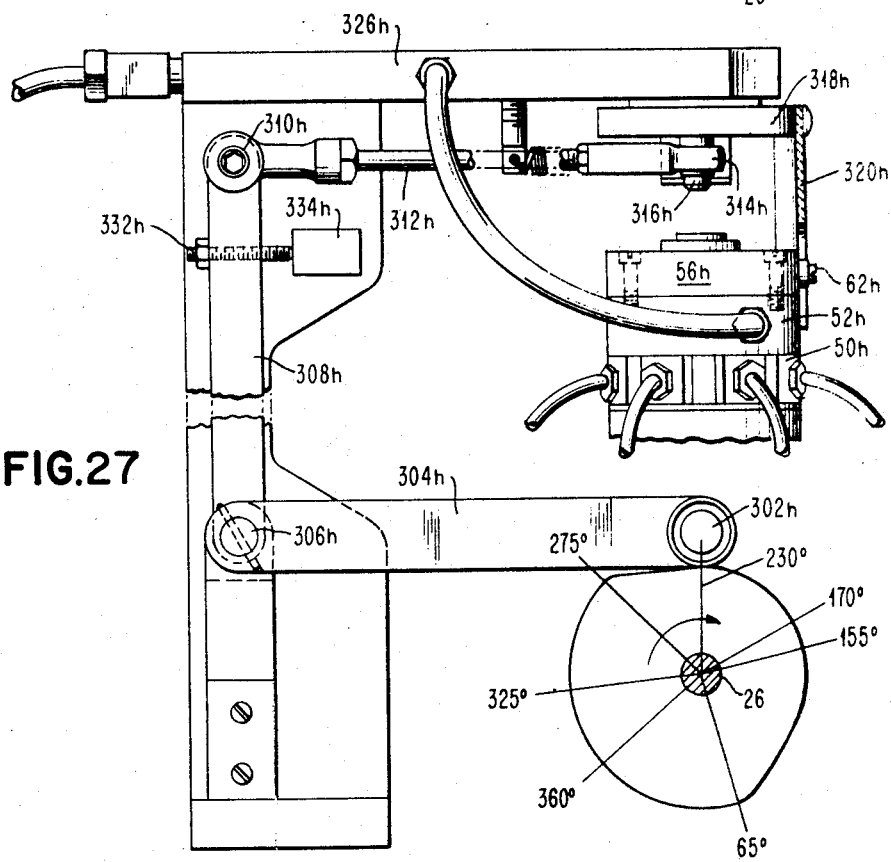
FIG. 27 is a side elevation of the cam and drive mechanism which causes relative movement between the vacuum distributor and vacuum manifold.

Referring now to FIGS. 27 and 27A, the means for providing controlled relative movement between vacuum manifold 52h and vacuum distributor 50h will be described. Cam 300h is mounted on shaft 26 and makes a single revolution for each index of chip placement head 17. Cam 300h is provided with a high dwell which extends between 275 degrees-65 degrees and a low dwell which extends from 155 degrees-230 degrees. From 230 degrees to 275 degrees is a relative "steep" rise to the high dwell, whereas from 65 degrees-155 degrees is a relatively gradual slope to the low dwell. Follower 302h is coupled to arm 304h which is in turn rigidly affixed to shaft 306h. Also rigidly affixed to shaft 306h is vertical arm 308h which terminates in ball joint 310h (not shown in FIG. 27A). A threaded screw 332h is mounted on 308h and engages fixed stop 334h to provide a forward limit to the movement of arms 308h. Emanating from ball joint 310h in a generally horizontal direction is manifold actuating arm 312h. The other extremity of arm 312h terminates in a bearing 314h which is rotatably mounted via pin 316h to disc 318h. Extending downwardly from, and rigidly affixed to disc 318h, is camming bar 320h which engages the bearing surface of nut 62h. Also attached to disc 318h is a preloading spring 322h. Disc 318h is mounted to rotate about shaft 324h which is anchored in a portion of frame 326h. Also forming a portion of frame 326h (FIG. 27A) are pressurized air inlets 328h and vacuum inlet 330h.

As cam 300h rotates, follower 302h rises up on the high dwell and causes arms 304h to rotate in a counter clockwise direction. This rotation imparts a like rotation to arm 308h which draws manifold actuating arms 312h to the left. This in turn causes a clockwise rotation of disc 318h which is transmitted to manifold top plate 56h via camming bar 320h and nut 62h. This action causes a relative clockwise rotation to occur between manifold 52h and distributor 50h and results in a movement of the relative positions of the vacuum channel and communicating holes respectively contained therein.

Figure 29A:
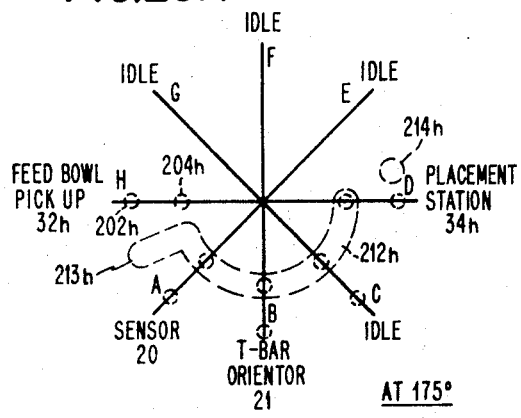
FIGS. 29A–29D are line drawings showing the relative positions of the vacuum manifold and the vacuum distributor at discrete times during the operation of the chip placement head.
Figure 29B:
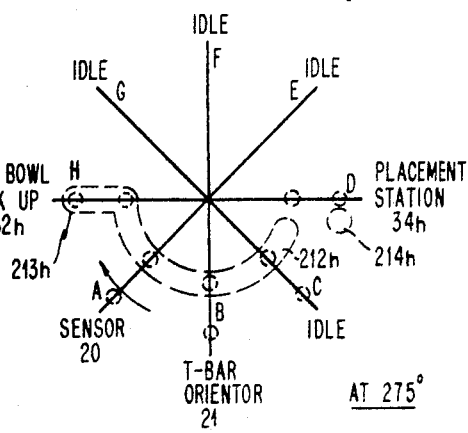

Referring now to FIGS. 29 and 29A and B, the complete operation of chip placement head 17 will be described. Before proceeding, however, it should be noted that in FIGS. 29A and B, each of the eight arms (a–h) of spider 30h is represented by a straight line and each of the particular stations is located as shown. Each straight line also denotes the location of the vacuum distributor nozzle associated with a respective spider arm. Superimposed on the line drawing is a representation of vacuum channel 212h and pressurized air hole 214h as they are both contained in vacuum manifold 52h. For purposes of explanation, only spider arm H will be hereinafter discussed. In FIG. 29, to which reference is now made, the horizontal axis is plotted in degrees of rotation of index shaft 26. The bars running horizontally in the figure are indicative of the actions at each station as well as the actions of the various portions of chip placement head 17.

Assuming now that index shaft 26 is at 170 degrees, index mechanism 25h has just lowered the spider down to its low dwell and spider arm H is positioned directly over chip pickup station 32b. The stop on vacuum needle 18 is in engagement with the stop in vibratory feed bowl 19 and all is in readiness for a chip pickup operation to occur. Shaft 26 continues to rotate and at 230 degrees, cam 300h (FIG. 27) begins to cause follower 302h to rise towards the high dwell. This, in the course of events, causes a clockwise rotation to occur in disc 318h with a like rotation occurring in vacuum manifold 52h. Thus, manifold 52h begins a clockwise rotation of 22½ degrees with respect to vacuum distributor 52h, causing vacuum channel 212h to also rotate clockwise. At approximately 245 degrees, vacuum channel 212h loses communication with vacuum hole 204h associated with spider arm D. Substantially simultaneously, positive pressurized air hole 214h is positioned over hole 202h and causes a flow of pressurized air therethrough. Since at this time, spider arm D is directly over the prefluxed substrate at placement station 34h, the puff of pressurized air is transmitted to vacuum needle 18 via hose 120h (FIG. 22) and positively pushes the chip down onto the fluxed surface of the substrate thereby assuring a positive connection therebetween. At this point restrictor 127h in hose 126h comes into play and delays the amount of the puff of pressurized air to the recycle lever actuation mechanism. This allows the chip to be set before the pressurized air causes the actuation of the recycle lever mechanism via diaphram 146h. At 275 degrees (FIG. 29B) perpendicular vacuum channel 213h is in full communication with holes 202h and 204h of vacuum nozzle 230h associated with spider arm H. This applies a full vacuum to the associated vacuum needle 18 and causes a chip to be drawn up to the end of probe pin 98h. The application of the *full* vacuum to the vacuum needle acts to draw diaphram 146h to its nonstressed position whether there is a chip present at chip pickup station 32b or not.

Figure 29C:
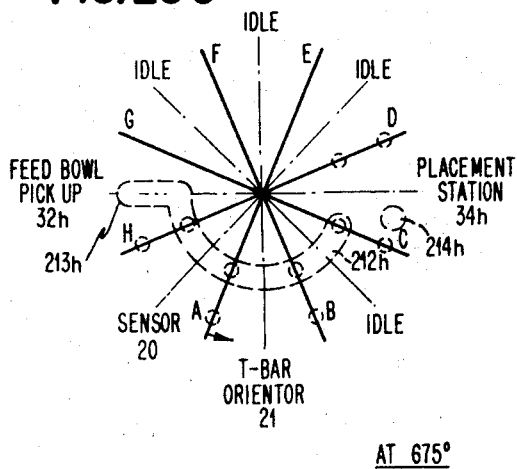
Figure 39:
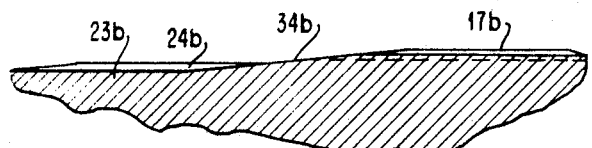
FIG. 39 is a detailed view in broken section taken on line 39—39 of FIG. 41.

When shaft 26 and cam 300h reach approximately 325 degrees, index mechanism 25h raises the spider and begins to rotate it and vacuum distributor 50h in a counter-clockwise direction. Vacuum manifold 52h does not change position, however, since cam follower 302h is still riding on the high dwell of cam 300h. As can be seen from FIG. 29C, spider arm H has only hole 204h communicating with vacuum channel 213h. This relative rotation results in metered vacuum being applied via hold 204h to the vacuum needle on spider arm H. It is at this time that the operation of the recycle lever actuation mechanism occurs if no chip was picked up at chip pickup station 32b. As will be recalled, the metered vacuum which passes through hole 204h is sufficient to maintain diaphram 146h in its nonstressed position only if a chip seals the bottom of probe pin 98h. If no chip has been picked up, recycle actuation lever 132h is tilted to interact with recycle switch lever 35h. At 65 degrees each arm of spider 30h is halfway between stations (FIG. 29C). At this point, follower 302h enters the gradual fall on cam 300h to the low dwell. Thus, vacuum manifold 52h begins to rotate in a counter-clockwise direction back to its original position. The combined rotations of vacuum manifold 52h and spider 30h continue until at 155 degrees (FIG. 29D) follower 302h reaches the low dwell of cam 300h, at which point the rotation of vacuum manifold 52h ceases. As can be seen from FIG. 39, spider 30h is at this point in the middle of its downward travel in preparation for the next cycle of operation.

Figure 29D:
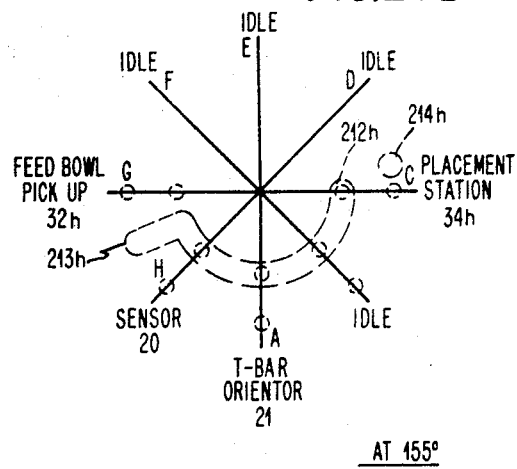
Figure 33:
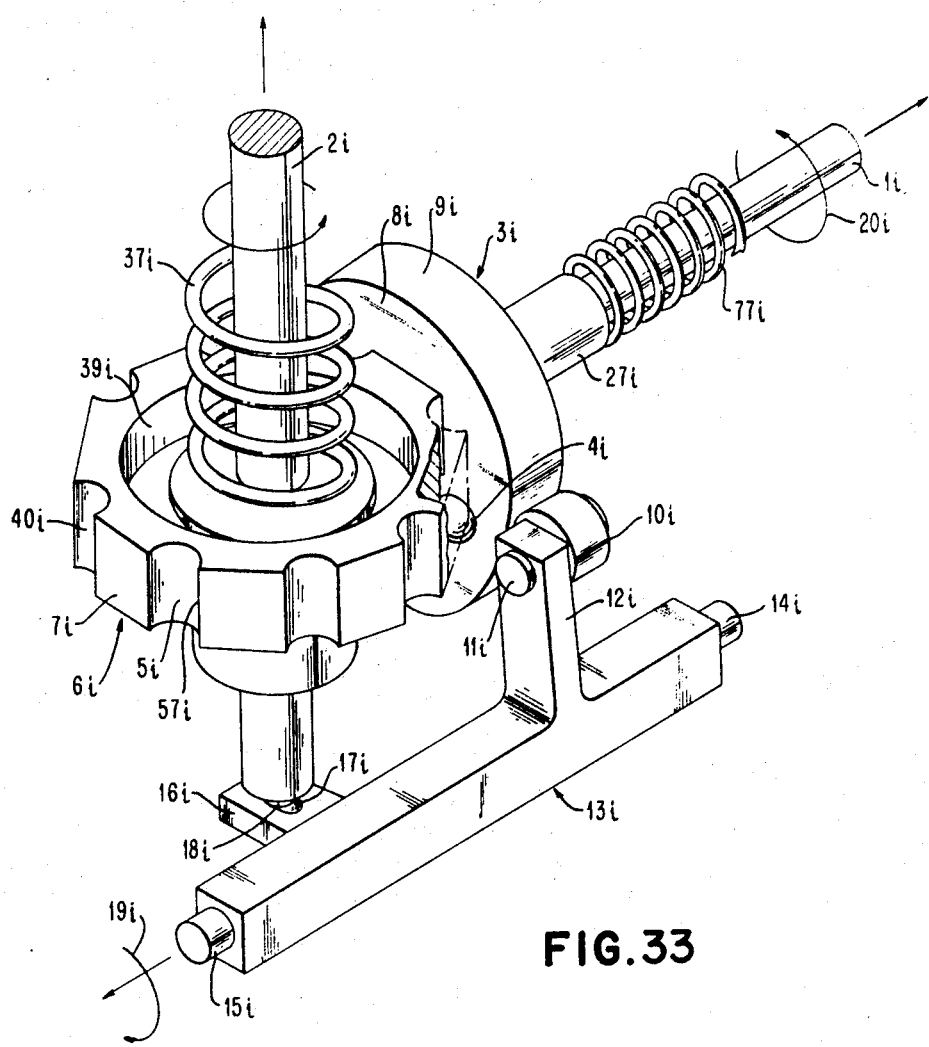
FIG. 33 is a schematic prospective view of the essential parts of the indexing mechanism with the housing and other details omitted for clarity in illustration.
Figure 34:
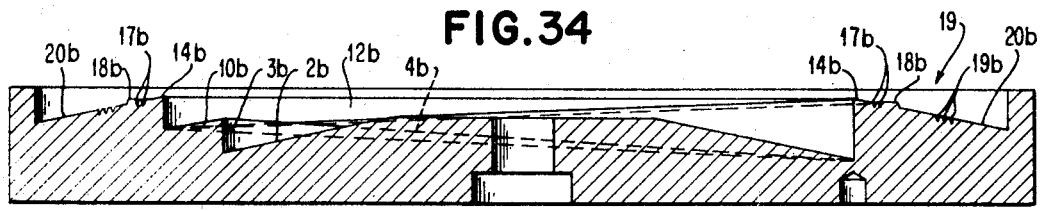
FIG. 34 is a cross-sectional view of the vibratory bowl feeder taken on line 34—34 of FIG. 41.
Figure 35:
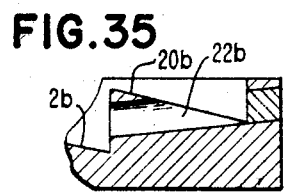
FIG. 35 is a detailed view in broken section taken on line 35—35 of FIG. 41.
Figure 36:
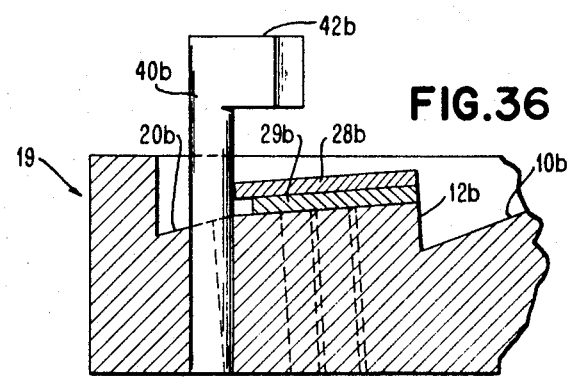
FIG. 36 is a detailed view in enlarged scale in broken section taken on line 36—36 of FIG. 41.

In FIG. 29D, the positioning of the various spider arms A–H at the end of the cycle is indicated. The next cycle commences immediately after the operations at each of the respective stations.

PLACEMENT HEAD INDEXING MECHANISM

The indexing mechanism which provides the above-described rotary and vertical movements of chip placement head spider 30h is shown in FIGS. 30 to 33 and will now be described. The indexing mechanism comprises an input shaft 1i and an output or spider shaft 2i to which said spider 30h is fixedly secured. A cam 3i is fixedly mounted to one end of input shaft 1i and is provided on its end face with an actuating pin 4i for drivingly engaging the semicylindrical grooves 5i formed in the periphery of an index plate 6i fixedly secured on the output spider shaft 2i.

Between each pair of adjacent grooves 5i the periphery of index plate 6i is formed with a flat surface 7i which is engaged by the planar end face 8i of cam 3i after each indexing movement to maintain spider 30h in the exact desired position. Input shaft 1i and cam 3i are axially movable in directions toward and away from index plate 6i to permit the latter to be rotatably indexed. Sprint 77i urges input shaft 1i and cam 3i radially inwardly toward the axis of spider shaft 2i to maintain cam end face 8i in engagement with index plate 6i.

As input shaft 1i and cam 3i rotate, a semi-spherical actuating pin 4i enters the lower end of one of the grooves 5i and moves first upwardly and then downwardly therein to angularly displace index plate 6i and spider shaft 2i therewith through an angle of 45 degrees by the time pin 4i leaves the lower end of said groove 5i.

The vertical edge 57i at the intersection of the cylindrical surface of each groove 5i and the adjacent planar surface 7i is at a greater radial distance from the axis of shaft 2i than any other part of said surface 7i. Therefore as index plate 6i starts to rotate the trailing edge 57i of the engaged surface 7i pushes against cam face 8i to urge cam 3i and input shaft 1i in a direction radially outward from the axis of output shaft 2i so as to further compress spring 77i. The leading edge 57i of the next adjacent flat surface 7i again pushes against cam face 8i to urge cam 3i and input shaft 1i outwardly against the action of spring 77i. When said next adjacent flat surface 7i becomes parallel to cam face 8i spring 77i urges input shaft 1i and cam 3i toward index plate 6i to cause said cam face 8i to engage said next flat surface 7i on the periphery of index plate 6i. Index plate 6i and spider shaft 2i are thus maintained stationary in the proper angular position until actuating pin 4i engages the next adjacent groove 5i to repeat the rotary indexing motion.

The vertical motion of spider output shaft 2i is provided in the following manner. The periphery of cam 3i is provided with a cam surface 9i engaged by a cam follower 10i rotatably mounted on a follower shaft 11i projecting horizontally from the upper end of a vertical arm 12i having its lower end integral with a spider shaft vertical actuator indicated generally at 13i. The latter is provided at its opposite ends with coaxially-aligned bearing pins 14i, 15i for rotatable movement about the axis of the latter. Spider shaft vertical actuator 13i is further provided with a radially outwardly extending arm 16i having at its outer end a spherical recess 17i for seating a spherical ball 18i which engages the lower end of spider shaft 2i.

As best seen in FIG. 31, cam surface 9i is provided with a rise portion 91i and a dwell portion 92i. As cam follower 10i approaches rise portion 91i spider shaft vertical actuator 13i is angularly displaced about the axis of bearing pins 14i, 15i in the direction indicated by the arrow 19i thereby causing arm 16i to swing upwardly to raise spider shaft 2i and thereby provide the upward vertical movement of spider 30h. As input shaft 1i continues to rotate in the direction of the arrow 20i, cam follower 10i eventually approaches dwell portion 92i to permit spider shaft vertical actuator 13i to rotate about the axis of bearing pins 14i, 15i in the direction opposite to that of arrow 19i, thereby permitting arm 16i to swing downwardly so as to lower spider shaft 2i and thereby provide the required downward movement for spider 30h.

The indexing mechanism is enclosed within a housing indicated generally at 21i and provided with mounting lugs 22i secured by screws 23i to said base plate 32h of chip placement head 17. One lateral wall 24i of housing 21i is integrally formed with a horizontally extending cylindrical bearing enclosure 25i having an internal cylindrical bore 26i therethrough. Mounted within the latter are a pair of axially spaced tubular bearing sleeves 27i, 28i within which input shaft 1i is rotatably mounted. The outer end of bearing enclosure 25i has an end plate 29i fixedly mounted therein and provided with an opening through which input shaft 1i extends outwardly. The outer end of bearing sleeve 28i abuts against the inner end face of plate 29i to limit the outward axial movement of sleeve 28i. The inner end of sleeve 28i bears against the outer end of said spring 7i which has its inner end abutting against the outer end of the other sleeve 27i. The inner end of the latter engages cam 3i. It will thus be seen that spring 7i is under compression to urge sleeve 27i inwardly against cam 3i thereby urging both input shaft 1i and cam 3i inwardly to maintain end face 8i of cam 3i in engagement with the periphery of index plate 6i.

Housing 21i further comprises a top plate 30i secured by screws 31i and integrally formed with an upwardly projecting cylindrical bearing housing 32i having therein a conventional bearing means including sleeves 33i, 34i and packing 35i for mounting spider shaft 2i for both rotary and vertical reciprocal movement.

Housing 32i is formed with an integral cylindrical portion 36i extending downwardly from top plate 30i. A compression spring 37i has its upper end surrounding said portion 36i and in abutment against the lower surface 38i of top plate 30i. The lower end of spring 37i extends within a cylindrical recess 39i formed in index plate 6i and engages an abutment element 40i to urge index plate 6i together with spider shaft 2i downwardly and thereby maintain the lower end of spider shaft in engagement with ball 18i on the seat 17i formed in arm 16i.

Spider shaft 2i is fixedly secured to index plate 6i by a pin 41i extending transversely through a hub portion 42i of index plate 6i. Index plate 6i is formed with a plurality of openings 43i to permit lubricating oil to flow therethrough.

Input shaft 1i is drivingly rotated by one-revolution clutch 31 (FIG. 4) through said shaft 26 which is coupled to shaft 1i by a first flexible bellows coupling 44i (FIG. 32), a spline coupling 45i and a second bellows coupling 46i. As shown in FIG. 32A, spline coupling 45i is conventionally constructed and comprises an inner male element having splines 48i to permit non-rotatable sliding motion within an outer female element 49i.

VIBRATORY BOWL FEEDER

The vibratory bowl feeder has the function of providing individual semiconductor chips C in the proper upright position to the pickup probe or vacuum needle 18. The semiconductor chips C are relatively small, being in the order of 28 by 28 mils and having a thickness of 8 mils. With ball terminals B attached, the total thickness of the semiconductor chip is approximately 13 mils. In order to fulfill the aforementioned function, the vibratory bowl feeder 19 must be capable of dependably and consistently moving the very small semiconductor chips contained in a reservoir in haphazard order to the pick-up station 32b with the ball terminals B down, and with the chip C suitably oriented for transfer to the chip orientation sensor.

A preferred specific embodiment of the vibratory bowl feeder, which forms a part of the overall combination apparatus, is shown in FIGS. 34 through 43. The bowl 19 is supported in a horizontal position and is actuated by a vibratory motor mechanism that moves the bowl simultaneously upwardly and angularly to effect the desired movement of the semiconductor chips contained in the bowl. More specifically, the bowl is moved upwardly a distance of approximately 2 mils while it is simultaneously rotated in a counter-clockwise direction a distance of approximately 4 mils, measured at the perimeter of the bowl. The vibrations that the bowl 18 is subjected to can be of any suitable frequency. However, we have found that movement on the order of 120 vibrations per second works very well. The mechanism for vibrating the bowl is well known in the arts and will not be described.

Referring now to FIG. 41, there is shown a central reservoir area 2b in which semiconductor chips C are periodically loaded. The chips are merely deposited in the reservoir area without any effort to arrange them in a particular order. The reservoir area 2b is a circular central depression in the bowl having an outwardly inclined angular sloping surface bounded by a peripheral wall 3b, shown more clearly in FIG. 34. Spaced radially upwardly from the reservoir 2b is an upwardly inclined outwardly sloping circular ramp 4b having a lower end 5b providing a continuous smoothly sloping surface from reservoir 2b. Still another upwardly inclined outwardly sloping circular ramp 6b is provided and serves as continuation of ramp 4b. As most clearly shown in FIG. 41, ramp 6b is spaced radially outwardly from ramp 4b. Between the upper end 7b of ramp 4b and the lower end 8b of ramp 6b there is an inclined surface area 10b in which the surfaces of extensions of ramps 4b and 6b smoothly join. In ramp 6b there is provided a cut-out 11b, the end of which is spaced from the outside of ramp 6b. The outside of ramp 6b is bonded by a circular vertically extending wall 12b as most clearly shown in FIG. 41. Spaced radially outwardly from ramp 6b is a ledge 14b having an outwardly inclined angular surface, as most clearly shown in FIG. 34. The upper end 15b of ramp 6b is approximately even with the top of ledge 14b. An area 16b is provided where the surfaces of the top 15b of ramp 6b and ledge 14b are continuous. Two small grooves 17b are provided in the top surface of angular ledge 14b, as most clearly shown in FIGS. 34 and 37. Spaced radially outwardly from grooves 17b is a ledge 18b. Spaced downwardly from ledge 18b are three grooves 19b, which are provided in annular outwardly tapered surface 20b.

Figure 37:
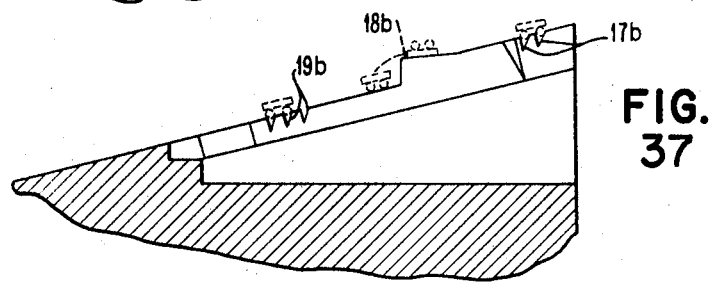
FIG. 37 is a detailed view in enlarged scale in broken section taken on line 37—37 of FIG. 41.
Figure 38:
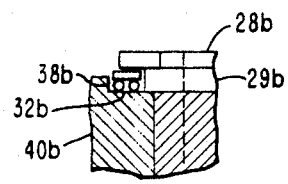
FIG. 38 is a detailed view in enlarged scale in broken section taken on line 38—38 of FIG. 42.
Figure 40:
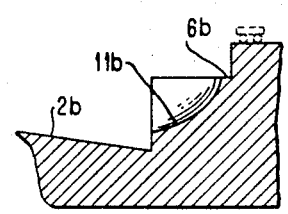
FIG. 40 is a detailed view in broken section in enlarged scale taken on line 40—40 of FIG. 41.

In operation semiconductor chips C are deposited in the reservoir area 2b. When the bowl is vibrated in the manner described previously, the chips work their way to the outside of the reservoir area 2b and subsequently, progress counterclockwise up ramp 4b generally staying to the outside of the ramp. The outwardly inclined surface of ramp 4b has a tendency to move the chips to the outside and to align same in a single file or column. The chips, as they proceed up ramp 4b, enter the surface area 10b and move radially outwardly to thereby continue up ramp 6b. The cut-out 11b causes all except the outside row to fall back into the reservoir 2b to begin over. The outside row of chips continues up ramp 6b and arrives at surface area 16b. Upon arrival to surface area 16b the vertical surface 12b no longer prevents the chips from moving radially outwardly. The chips with the copper ball terminals B down are caught in grooves 17b and proceed counterclockwise in single file around the top of the ledge 14b. In FIG. 37 there is illustrated a semiconductor chip C with the ball terminals riding in the grooves 17b. When a semiconductor chip arrives on the top of ramp 6b in an upside down position, that is with the ball terminals extending upwardly, the chip will slide across grooves 17b. As indicated in FIG. 37, the chip in an upside down position will be flipped over as it falls over the edge of ledge 18b and will subsequently be captured in grooves 19b. The chips is engagement with grooves 19b will then progress around the bowl 19 to the nesting station 32b which will be described hereinafter. Only two grooves 17b are provided in the upper ledge 14b in order to prevent the formation of more than a single row of semiconductor chips. Three grooves 19b are provided in the area below the ledge 18b in order to increase the probability of capturing the chips that have been flipped over. Any chips that do not become engaged in grooves 17b or 19b slide to the outside edge of angular surface 20b and subsequently fall into downwardly inclined aperture 22b where they are diverted back to the reservoir area 2b to begin anew the cycle.

On vibratory bowl 19 is provided a relatively large outwardly sloping flat area 23b positioned adjacent the ends of grooves 17b and 19b. An intermediate downwardly inclined ramp 34b connects the ends of grooves 17b and the surface 23b as most clearly shown in FIGS. 37 and 41. The outside edge of surface 23b is bonded by a relatively small upwardly extending surface 24b. Semiconductor chips that work their way around in grooves 17b and 19b are diverted downwardly and outwardly by surface 23b and are aligned, usually in single file against surface 24b preparatory to being received in the pick-up or nest area 32b. A feeding track 25b serves as an extension of sloping surface 23b and receives the semiconductor chips that slide off grooves 17b and 19b. An inwardly downwardly inclined surface 26b spaced from the inside edge of the feeding track 25b causes all but a single outside row of chips to slide down to area 10b and re-enter ramp 6b. The outside surface of the feeding track 25b is also bonded by a small vertically extending wall 31b to prevent the chips from sliding outwardly to surface 20b. On the termination point of feeding track 25b is provided a chip nest 32b. The bottom of the nest 32b is formed by a carbide insert 27b in order to prevent undue wear, etc. that may otherwise disrupt the operation of the bowl 19 over a prolonged period of use. A vertically extending wall 38b is provided in carbide insert 27b to serve as a continuation of the outside wall 31b of feeding track 25b. A nest case is provided which is formed of two thin metal plates 28b and 29b. Plate 29b is positioned beneath 28b and provides the necessary clearance to position plate 28b above the surface of the bowl. Plate 28b is provided with two protrusions 30b and 36b. A semiconductor chip upon arrival to nest 32b must pass under projections 30b and 36b. In operation while the chip in the nesting station 32b is being picked up by the vacuum needle 18, the next chip in line is positioned under ledge 38b which guards same from being moved out of position, etc. The cut-out between 30b and 38b is provided to facilitate cleaning to the feeding track. As most clearly shown in FIG. 6B, an L-shaped probe stop 40b is seated in the bowl adjacent the nest 32b. The upper surface 42b serves as an abutment for the vacuum needle 18 as it moves into position to pick up the semiconductor chip C positioned in the nest 32b.

CHIP ORIENTATION SENSOR

Figure 49:
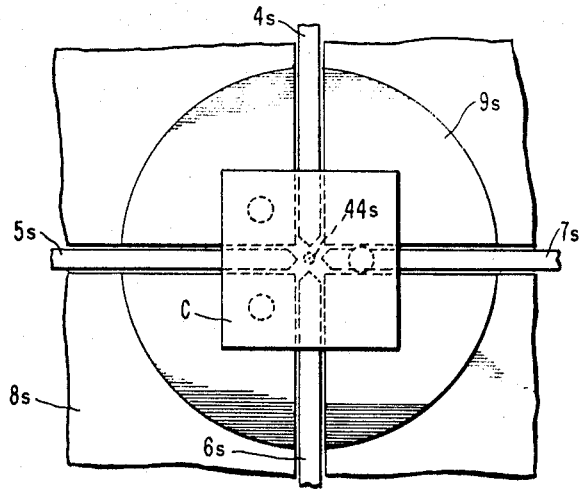
FIG. 49 is a detailed view in greatly enlarged scale showing the sensing station of the chip orientation sensor of our invention.

After the semiconductor chip is picked up from the vibratory bowl feeder 19 it is transferred to the chip orientation sensor 20 to determine the relative location of the terminal ball contacts B preparatory to its placement on the substrate. Basically, the function of the chip orientation sensor 20 is to determine the position of the ball terminals and produce an electrical signal that will enable the chip orientator 21 to reposition the chip if it is positioned improperly. The ball contacts on the semiconductor chip are arranged in a triangular pattern, as illustrated in FIG. 49. The chip C must be oriented on the probe 18 to the proper position so that it can be placed in the proper relation on the substrate when the probe arrives over the tape belt conveyor 3.

Figure 48:
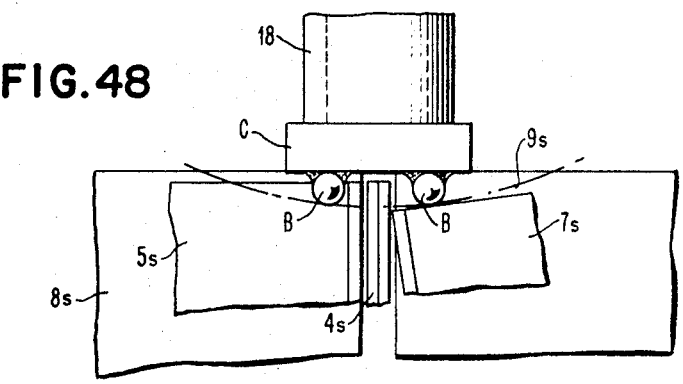
FIG. 48 is a detailed view in broken section in greatly enlarged scale of a side elevational view of the sensing station.
Figure 47:
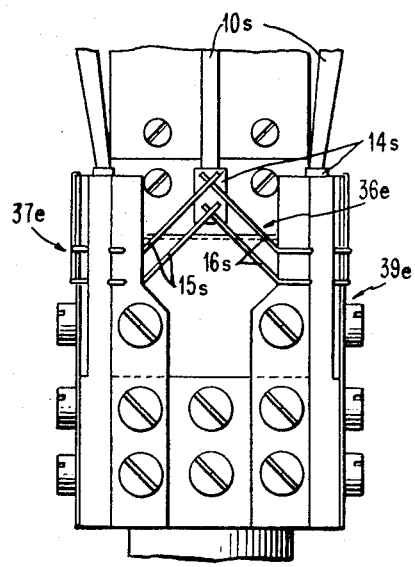
FIG. 47 is a detailed view in broken section taken on line 47—47 of FIG. 45.

In FIGS. 44 to 49 there is illustrated a preferred specific embodiment of the semiconductor chip orientation sensor 20 for use on the combination apparatus of the invention. The chip orientation sensor 20 has a base 2s which serves as a mounting element for the numerous components of the sensor. A head 3s is affixed to the top of base 2s, as most clearly shown in FIGS. 45 and 46. The actual sensing elements of the orientation sensor 20 are four separate blade elements 4s, 5s, 6s and 7s, shown in greatly enlarged scale in FIG. 49. When a semiconductor chip C is moved downwardly over the blades and properly positioned relative to same one of the ball contacts B will depress one, and only one, of the blades. In FIG. 48 there is illustrated a ball contact B depressing blade 7s. It can be seen that since the semiconductor chip is square there are four possible angular positions in which it can be positioned on the probe 18, and only one of which is the proper position.

The four blades 4s, 5s, 6s and 7s are positioned in a blade guide 8s in which there are provided four separate slots that receive the blades. As most celarly indicated in FIG. 48, a concave depression 9s is machined in the top surface of blade guide 8s. The concave depression 9s allows sufficient clearance for the two remaining ball terminals B that do not contact and depress the knife blades.

Figure 45:
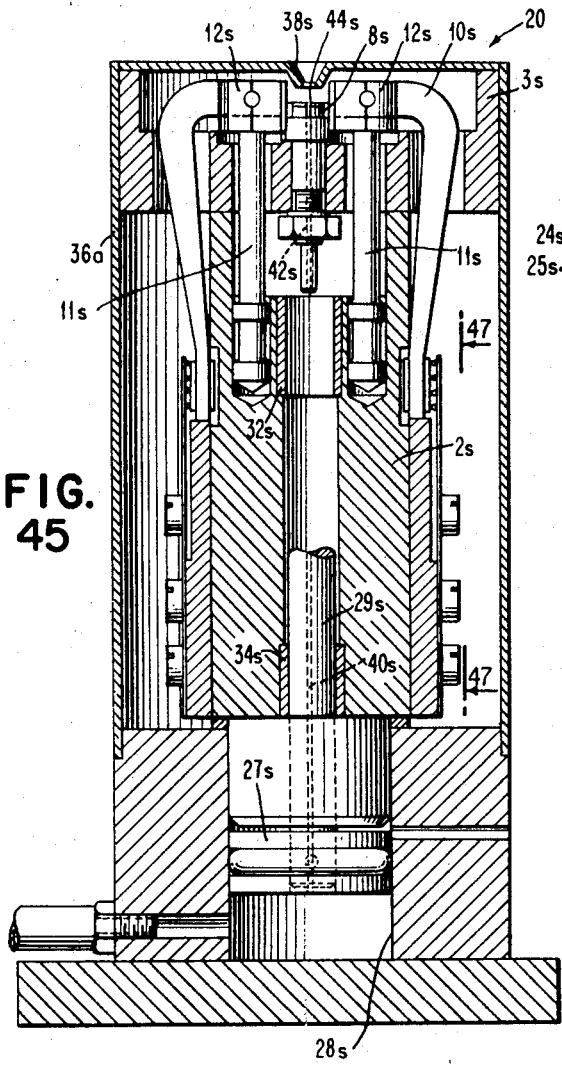
FIG. 45 is a vertical sectional view taken on line 45—45 of FIG. 44.

As more clearly shown in FIG. 45, each of the blades is supported on an L-shaped pivot arm 10s. Upright pivotal supports 11s, provided with bifurcated portions 12s to receive and pivotally supports arms 10s, are mounted in base 2s. It can be seen that when a blade is depressed the lower end of the L-shaped arm 10s is pivoted outwardly. The lower end of arms 10s are provided with insulating pads 14s which serve as a means to close contacts 15s and 16s of electrical switches 36e, 37e, 38e and 39e. Both contacts 15s and 16s are mounted on base 2s and insulated therefrom. Outward movement of the lower end of arm 10s forces the electrical contacts 16s outwardly into contact with contacts 15s to close the electrical switch. It can be seen assuming that the semiconductor chip is not defective, that each of the four possible positions will produce a different signal considering the four separate switches. An electrical signal is then produced with this switch arrangement which is used to actuate a chip T-bar orientor at the following station to properly turn the chip on the probe, if such is necessary, when it arrives at the station.

Figure 44:
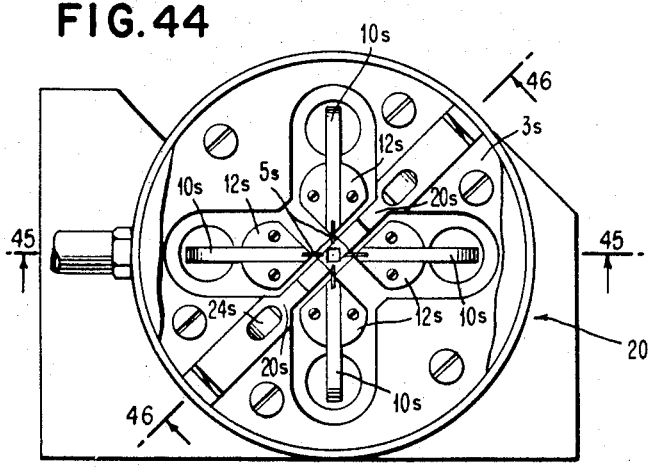
FIG. 44 is a top plan view of a specific embodiment of the chip orientation sensor apparatus of our invention.
Figure 46:
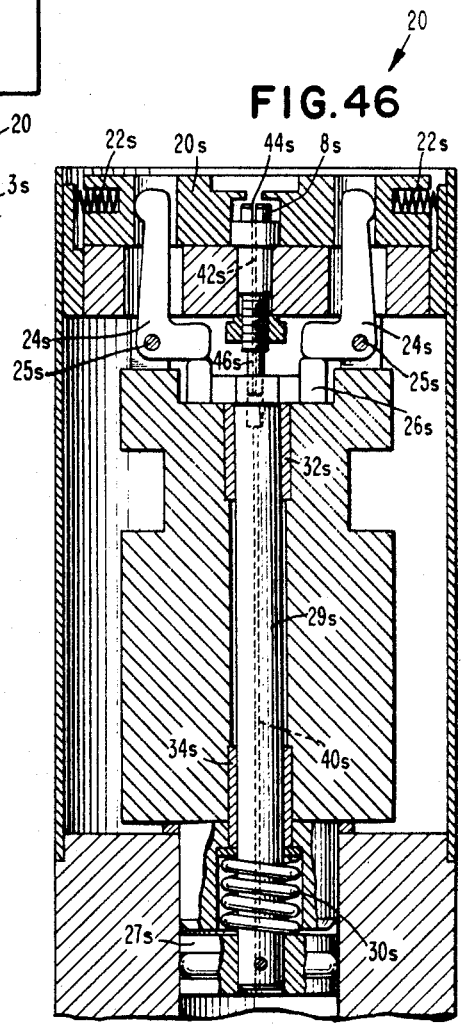
FIG. 46 is a vertical sectional view taken on line 46—46 of FIG. 44.

In order to more accurately position the semiconductor chip C relative to the blades 4s, 5s, 6s and 7s, a pair of opposing guide jaws 20s are provided which are positioned above the blades. In FIGS. 44 and 46, there is depicted the structure of the guide jaws. The jaws 20s are each provided with two diagonal and transverse surfaces adapted to slidably engage the adjacent edges of the chip. Compression springs 22s are provided to bias the jaws 20s inwardly into operative engagement with a chip to be positioned over the blades. The jaws in effect form a guide channel that corrects any minor misalignment of the chip. In order to open the jaws 20s after the sensing operation is complete, there is provided an air operated actuating mechanism. Two L-shaped arms 24s are pivotally mounted on the head by pins 25s with the upper leg portions in abutting engagement with the jaws 20s and with the lower end portions directed radially inwardly. An abutment element 26s engages both the inwardly directed legs of arms 24s. A piston 27s is slidably mounted in a cylinder 28s and connected to piston rod 29s. Upward movement of piston 27s forces the abutment element 26s upwardly into actuating engagement with the arms 24s, thus spreading the jaws to allow easy removal of a semiconductor chip from the sensing station. The jaws 20s are opened sufficiently wide to allow a chip that is slightly irregular in shape to leave the station unhindered by the jaws. Closure of the jaws accurately and positively aligns the chip over the blades in position for the sensing operation. Spring 30s biases the piston 27s downwardly to allow springs 22s to close the jaws. A piston rod 29s is slidably supported by sleeve bearings 32s and 34s. Piston 29s is also provided with a longitudinally extending air passage 40s which communicates with air passage 42s, which terminates in opening 44s in the center of blade guide 8s. In operation, when air under pressure is admitted to cylinder 28s, air passes through passages 40s and 42s to escape through opening 44s to blow the chip from the sensing station if it should become dislodged from the probe or any part thereof. The air blast is delayed for an instant that it takes for the top portion of piston rod 29s to couple with the extending tube 46s. A cylindrically shaped housing 36s having a central aperture 38s encloses the entire chip orientation sensor mechanism.

In operation, a semiconductor chip C with the ball terminals extending downwardly is lowered by the pick-up probe through aperture 38s and between the jaws 20s which are normally in closed guiding position. The chip is then gently urged downwardly with one ball contact of the chip depressing one of the blades which makes possible the production of an electrical signal. Unless only a signal blade is forced down the chip is rejected from the probe after it is removed from the sensor. If, however, the chip is held in an upside down position on the probe, all the blades will be actuated. This will also produce a signal instructing the machine to blow the chip off the probe. Further, if the terminal ball contact intended to contact the knife blade is missing or off location, no blades will be contacted. In this instance the chip will also be rejected. After the sensing operation is completed, the guide jaws are opened by the piston and cylinder, and the probe with chip still attached raised and moved to the chip T-bar orientor 21. An instant after the jaws 20s are opened a stream of air will issue from opening 44s to blow out the chip if it should become dislodged from the probe, or any part thereof that may have broken off. This leaves the sensing station clear to receive the next chip.

CHIP T-BAR ORIENTOR

After the semiconductor chip C has been picked up on the vacuum needle 18, the position of the ball contacts B is determined by the chip orientation sensor 20. Since there are four possible positions that the ball contacts B can assume, since the chip is square in shape, the probability is that three out of four times the chips will need to be oriented to the proper position on the probe prior to its placement on the substrate. This function is performed by the chip T-bar orientor 21. A preferred specific embodiment of the chip orientor unit is detected in FIGS. 50 through 54.

In general, the chip C while held on the probe or vacuum needle 18 is rotated to the desired position by the chip orientor 21. The chip orientor 21 has a head 2t provided with a T-shaped configuration 3t, which when properly oriented with the chip will form a mechanical engagement with the triangularly arranged ball terminals on the lower side of the chip. The mechanical engagement between a typical semiconductor chip C and the T-shaped configuration 3t on head 2t is clearly illustrated in FIGS. 50, 51 and 52 of the drawings. As shown, the two sectors 18t on opposite sides of the upright bar of the T-shaped configuration are each defined by a pair of downwardly inclined intersecting planar surfaces, while the sector 19t is defined by a single downwardly inclined planar surface. This configuration has the function of accurately centering the ball terminals B of chip C. Thus, the chip is aligned with reference to the ball contacts, rather than the side edges of the chip. The position of the balls is critical in the positioning of the chip on the substrate.

Figure 53:
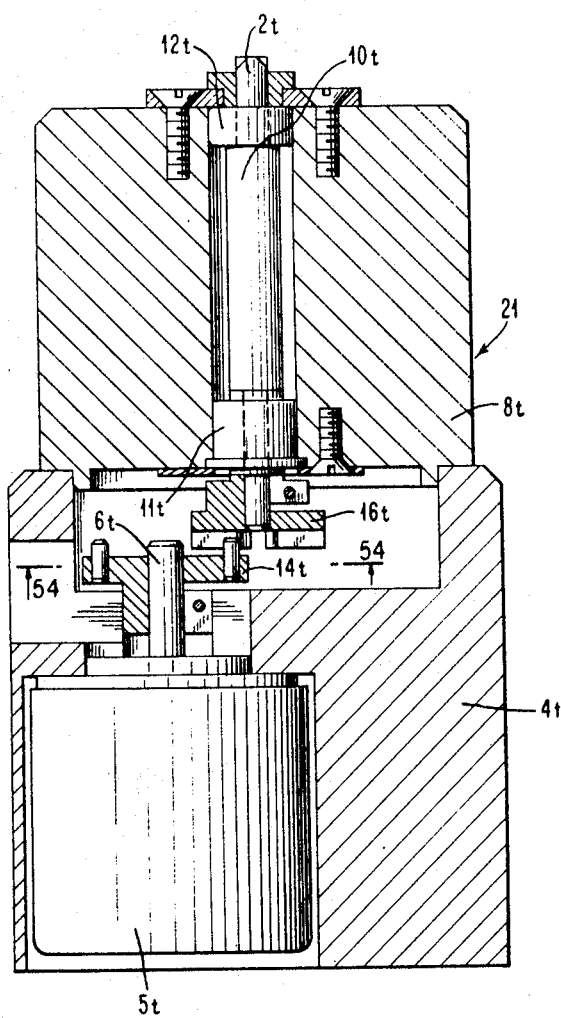
FIG. 53 is a front elevational view in cross-section of a preferred specific embodiment of the chip T-bar orientor apparatus of our invention.
Figure 54:
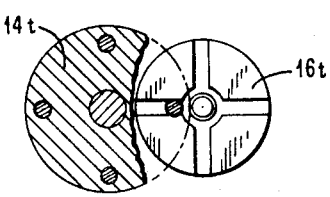
FIG. 54 is a detailed view in broken section illustrating the Geneva drive arrangement.
Figure 50:
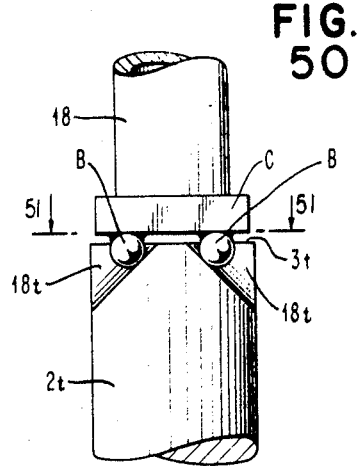
FIG. 50 is a side elevational view in enlarged scale showing the engaging relationship between the semiconductor chip and the head of the orientor apparatus of this invention.
Figure 51:
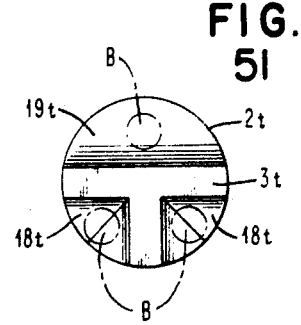
FIG. 51 is a top plan view taken on line 51—51 of FIG. 50.
Figure 52:
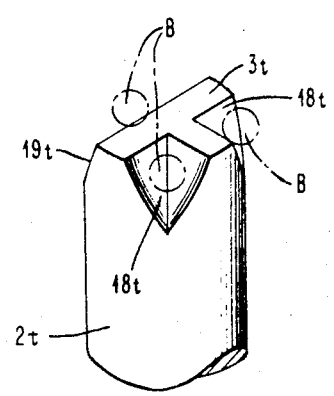
FIG. 52 is a perspective view in enlarged scale illustrating the T-bar configuration of the head of a preferred specific embodiment of the orienting apparatus of our invention.

The chip T-bar orientor 21 has a base 4t in which is mounted a four-position stepping motor 5t. The motor 5t is mounted with the shaft 6t in an upright vertical position as shown in FIG. 53 of the drawings. A head support 8t is mounted on the top of base 4t above motor 5t. Shaft 10t is rotatably mounted in head support 8t by two bearings 11t and 12t. The head 2t with the T-shaped configuration facing upwardly is rigidly fixed to shaft 10t and protrudes above the top of head support 8t. The shaft 6t of motor 5t is connected in driving relation to shaft 10t by a Geneva drive mechanism consisting of a Geneva driver 14t and a Geneva wheel 16t, as illustrated in FIG. 53. A detailed view of the Geneva drive mechanism is shown in FIG. 54.

In operation an electrical signal produced by the chip orientation sensor 20, described previously, is utilized to drive motor 5t to thereby position the head 2t in the proper relative position to engage the ball terminals B of the chip C when it is transferred to the chip orientor 21. The Geneva drive mechanism provides a very precise positioning of the head 2t. Even in the event that the motor 5t stops several degrees from the exact desired angular location, this discrepancy will not cause a material change in the positioning of the head 2t. When the head 2t is rotated to the proper position, the probe 18 with a semiconductor chip affixed will be lowered by the turret head 17 into engagement with the head 2t. The motor 5t is then actuated by a suitable circuit arrangement to rotate the head 2t and also the chip relative to the pickup probe to the desired position which will then permit it to be properly placed on the substrate. The chip C is thus properly oriented on the probe 18 of turret placement head 17 relative to substrates being indexed on tape conveyor 1. The critical positioning is properly orienting the ball terminals so that they will contact the lands of the printed circuitry. The orientor of our invention very precisely positions the ball terminals B with the sloping surfaces of the sectors 18t and 19t of head 2t. Even though the ball terminals B may be slightly dislocated on the chip relative to the edges thereof, an accurate positioning of the chip is obtained both angularly and in the x–y plane.

CONTROL CIRCUITRY

The electrical control circuitry which performs the above-described logic functions is shown schematically in FIGS. 55 to 76 and will now be described. Referring first to FIG. 55 in conjunction with FIG. 4, the reference numeral 1e indicates generally a photodetector to sense the arrival of a substrate from the tray unloader. Photodetector 1e comprises a light bulb 2e and a photosensitive cell 3e. The latter extends between the B+ line and a sensitivity control potentiometer 4e having a resistance which is made variable by a movable wiper 5e. Control 4e adjusts the sensitivity of the photosensitive cell 3e to compensate for variations in the ambient lighting conditions. In series between control 4e and the ground bus G is a relay K1 which will be energized when photodetector 1e detects the movement of a substrate.

The reference numerals 6e and 7e indicate two of a plurality of pulse timing switches which are actuated by cams to make and break the switch contacts at predetermined instants in the operating cycle so as to time the length of the pulse transmitted by each switch. The actuating cams are drivinly rotated by the series of belts 79, 80, 81 shown in FIG. 4 so that each switch actuating cam rotates 360° during each cycle of machine operation. The "ON" time of each of these pulse timing switches is designated by the letter "M" followed by the instant in degrees at which the switch will close or make so as to initiate the pulse, and also by the letter "B" to indicate the instant in degrees at which the switch will open or break to terminate the pulse. The pulse is generated by virtue of the fact that when the respective timing switch makes or closes, the right-hand terminal of the switch rises to the potential level of the B+ bus. Since such pulse timing switches are conventional and well known in the art, their mechanical construction will not be further described.

Since pulse timing switches 6e and 7e are in series, they perform a logical "AND" function in that the right-hand terminal of switch 7e will be at the potential of B+ only when both switches 6e and 7e are closed. During this "ON" period, and if relay contacts K1–1 have been closed by energization of relay K1, relay K2 will be energized. The latter controls one-revolution clutch 29 (FIG. 4) which actuates tape loader 5 in the following manner. It will be noted that each set of relay contacts is designated by the reference number of its respective relay followed by a numeral to distinguish the several contact sets corresponding to the same relay.

Energization of relay K2 closes relay contacts K2–2 to permit pulse timing switch 9e to energize solenoid 10e which actuates tape loader one-revolution clutch 29. Tape loader 5 thereby operates to load a substrate S onto conveyor tape 1. Relay K2 is held by the pulse from timing switch 8e through the closed contacts K2–1.

Dimpler 6 and flux dipenser 9 are so constructed that they may function during each and every cycle without being damaged even though there is no substrate to be operated upon. Therefore control relay K3 which controls one-revolution clutch 30 actuating dimpler 6 and flux dispenser 9 is energized each and every cycle by pulse timing switches 6e and 7e irrespective of whether a substrate is present to energize relay K1. Relay K3 is maintained energized by pulse timing switch 8e through its own set of contacts K3–1, Dimpler 6 and flux dispenser 9 are actuated by one-revolution clutch 25 (FIG. 4) actuated by solenoid 11e which is energized by pulse timing switch 9e through the closed contacts K3–2 of energized relay K3. The actual dispensing of the flux F is effected by energization of solenoid 13e by pulse timing switch 12e.

Pulse timing switch 14e energizes flux flattening control relay K4 through the closed contacts K3–3 of relay K3. Relay K4 is maintained energized by pulse timing switch 15e through the closed contacts K4–1. Flux flattening head 15 (FIG. 4) is actuated by solenoid 17e when the latter is energized by pulse timing switch 16e through the closed contacts K4–2 of relay K4. Flux flattening head 15 thereby emits a jet of air against the flux charge F previously dispensed onto substrate S so as to reduce the height of the flux to prevent it from contacting and clogging the lower ends of the needles 18 of chip positioning heads 17.

Located after tape loader 5 and before dimpler 6 is a skewed-substrate detector switch 18e having a feeler arm which contacts any substrate S not lying flat upon conveyor tape 1. This skewed condition closes switch 18e to energize relay K5. Located three tape index positions after loader 5 is a missing substrate switch 19e which is normally closed but which is opened when its feeler arm engages a substrate on conveyor tape 1. Hence the absence of a substrate on conveyor tape 1 energizes relay K6. Pulse timing switch 20e then actuates a successive missing substrate counter 21e through the closed contacts K3–4, once for each cycle that missing substrate relay K6 is energized to close its contacts K6–1.

Associated with counter 21e is a program selector 23e which enables the machine to be set up so that when a predetermined number of successive tape positions are devoid of substrates, the whole machine will be stopped for repair. Program selector 23e comprises a series of normally-closed switches 223e having one end joined to a common terminal in series with relay contacts K5–1. A switch selector arm 323e connects pulse timing switch 22e with the left-hand terminal with a selected one of the switches 223e.

Counter 21e is constructed in the conventional manner so that when the count of successive missing substrates reaches a certain number a respective one of the switches 223e will open. By adjusting arm 323e so as to select a particular one of the switches 223e, the set-up operator may select the number of successive missing substrates registered on counter 21e which will cause the selected switch 223e to open. In this event pulse timing switch 22e will not energize relay K101 through normally closed relay contacts K5–1 and normally closed "not in manual" switch 124e. As will be described below, energization of relay K101 indicates that loader 5, dimpler 6 and fluxers 9, 15 are functioning properly so as to permit the machine to continue operation. Non-energization of relay K101 caused by the registration by counter 21e of the programmed number of successive missing substrates will stop the machine for repair or adjustment.

Figure 56:
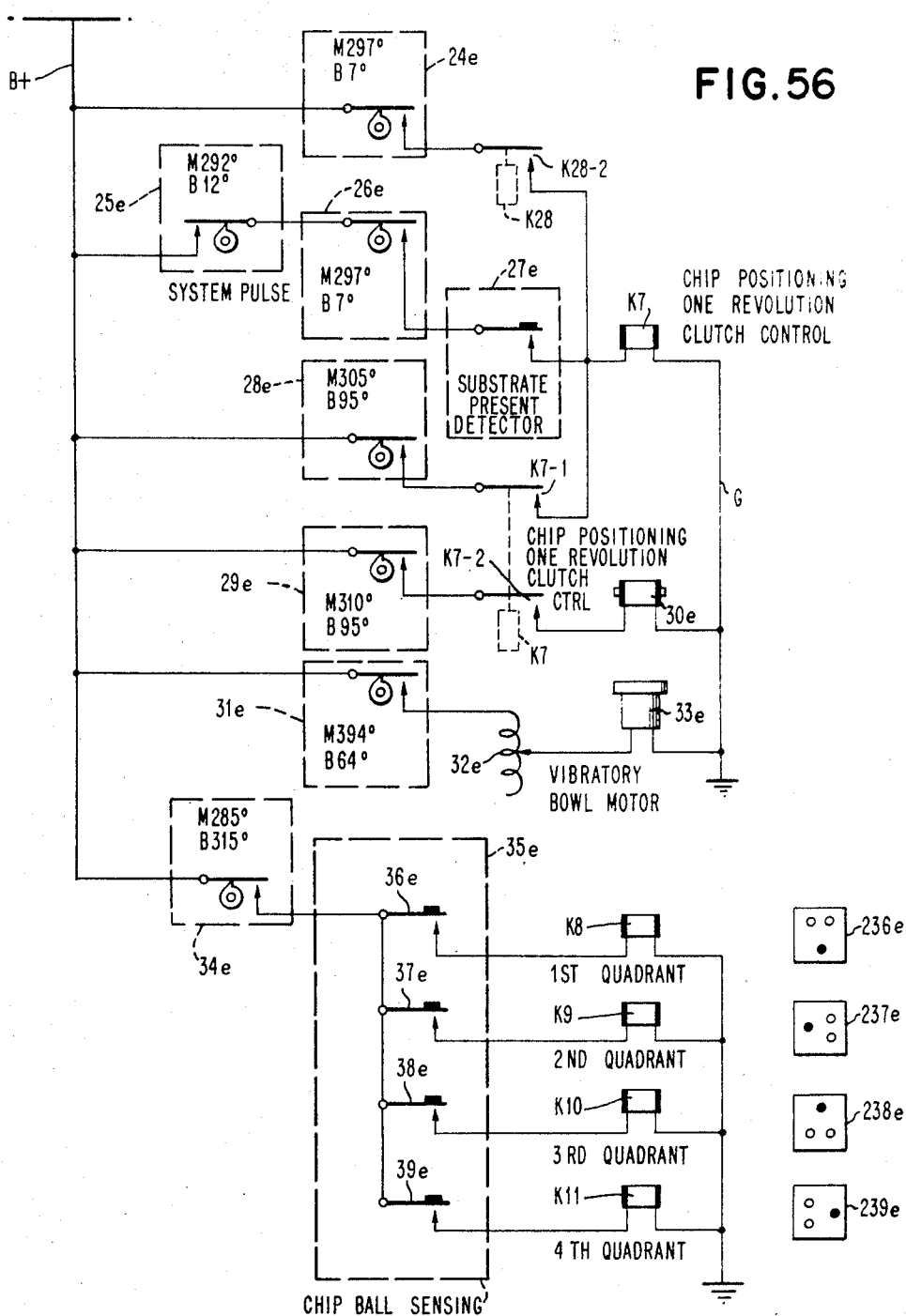
Figure 70:
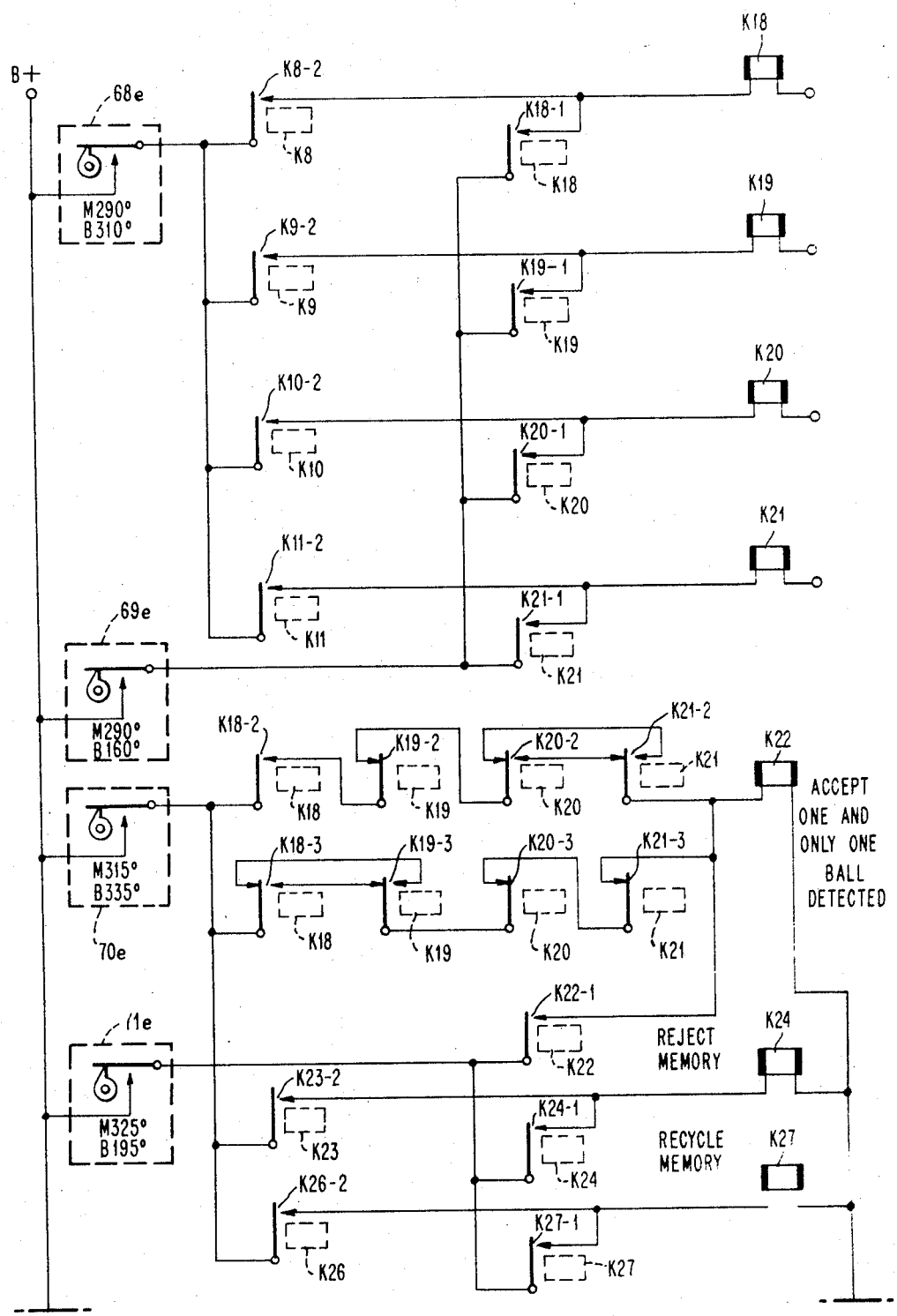

Referring now to FIG. 56, there is shown the initial portion of one of the plural identical circuits each controlling a respective one of chip placement heads 17. Since all of these circuits are identical, only one will be shown and described. Pulse timing switches 25e and 26e are in series so that the output of switch 26 will be the logical "AND" function of both switches. In series with the output of switch 26e is a substrate presence detector switch 27e. Each switch 27e of said plural identical circuits is physically located one tape index position before its respective chip positioning head 17. If a substrate S is present so as to close detector switch 27e, the concurrent transmission of pulses by system pulse timing switch 25e and pulse timing switch 26e will energize chip positioning control relay K7 so as to close contacts K7–1 to maintain relay K7 energized through pulse timing switch 28e and also to close contacts K7–2 to permit pulse timing switch 29e to energize the chip positioning one-revolution clutch control solenoid 30e. The latter in turn actuates one-revolution clutch 31 (FIG. 4) to actuate chip positioning head 17 through one cycle of operation.

Vibratory feeder bowl 19 must not vibrate during the time interval when vacuum needle 18 is picking up a chip C from the pick-up point of the bowl. The solenoid motor 33e which vibrates bowl 19 is energized during the proper portion of the cycle by pulse timing switch 31e through the feed control 32e.

The printed circuit pattern on substrate S is designed so that the collector pad P, that is, that portion of the conductive land L which receives the collector ball B of chip C, may be oriented in a direction toward either of the four lateral edges of substrate S. Therefore, before chip C is positioned by vacuum needle 18 onto the pads P of substrate S, chip C must first be angularly oriented so that its balls B correspond to the orientation of the pads P at that particular location on substrate S to which chip C is to be assembled. Chip C is first oriented by vibratory feeder bowl 19 to any random one of four possible angular orientations which are designated as the first, second, third and fourth quadrants, depending upon the direction in which the collector ball is located. Each of these quadrants is indicated schematically at 236e, 237e, 238e and 239e wherein the collector ball is designated by the solid circular area ond the base and emitter balls are shown as non-solid circles.

Since the initial orientation of chip C on the end of vacuum needle 18 is randomly in any one of these four possible angular orientations, it is first necessary to sense each chip to detect which of these four possibilities has materialized. The T-bar 2t of the chip orientor 21 is then rotated to the same orientation as chip C and the T-bar 2t then engages balls B of chip C. The T-bar 2t together with chip C is then rotated to the selected "home" position thereby finally orienting chip C to the desired orientation so as to properly align balls B with the respective land pads P upon which balls B will rest when chip C is positioned upon substrate S.

In order to determine the initial orientation of chip C when it is first picked up from the pick-up location of vibratory bowl feeder 19 by vacuum needle 18, there is provided a chip ball sensing device indicated generally by the reference numeral 35e and comprising a plurality of switches 36e, 37e, 38e, 39e, each adapted to be closed when its respective feeler arm is actuated by contact with a collector ball B of the chip C being sensed. Each of these switch feeler arms will be engaged by a collector ball B when the latter is in a respective one of the four quadrants. That is, the feeler arm of switch 36e will be engaged by a collector ball in the first quadrant, that of switch 37e by a collector ball in the second quadrant, that of 38e by a collector ball in the third quadrant, and that of switch 39e by a collector ball in the fourth quadrant.

The switches 36e, 37e, 38e, 39e have one terminal connected to a common junction in turn connected to a pulse timing switch 34e and the other terminal connected to a respective one of the relays K8, K9, K10, K11 thereby energizing one of the latter when its corresponding switch is closed by virtue of the collector ball making contact with that switch feeler arm in that particular quadrant.

In order that the printed circuit pattern may be designed so that the collector pad P is oriented in any selected one of the four directions the control circuitry is arranged so that any one of the four quadrants may be selected as the "home" position in which the collector ball B will lie after chip C has been finally oriented and is ready for positioning upon the pads P of substrate S. In order to select which of the four quadrants will be "home" position for each chip placement head 17, the circuit components are switched by conventional means to provide any selected one of the four network configurations shown in FIGS. 57 to 60 inclusive. FIG. 57 shows the first quadrant as the "home" position, FIG. 58 the second quadrant, FIG. 59 the third quadrant, and in FIG. 60 the fourth quadrant is the "home" position.

For the purposes of illustration, let it be assumed that the circuit is programmed so that the first quadrant is selected as the "home" position and that when chip C is initially picked up on the end of vacuum needle 18 from vibratory bowl feeder 19 it is oriented so that its collector ball B is in the second quadrant as shown schematically at 237e. Therefore, when the chip orientation is sensed, the feeler arm of switch 37e will be engaged by the collector ball B to close switch 37e and thereby permit a pulse from pulse timing switch 34e to be transmitted to relay K9 thereby energizing the latter.

Referring now to FIG. 57 which is the circuit configuration for the first quadrant as the "home" position, the energization of relay K9 will close its contacts K9–1 to transmit a pulse from pulse timing switch 40e through diode CR1 to energize relay K13 thereby indicating that chip C is initially 90° in a clockwise direction from the 'home" position. Relay K13 will be held closed through its own contacts K13–1 by pulse timing switch 45 shown in FIG. 61.

Referring now to FIG. 65 there is shown the control circuitry to first rotate the T-bar chip orientor to pick-up orientation in alignment with the initial orientation of the chip on vacuum needle 18, and then to rotate the T-bar and chip C therewith to the final selected "home" position.

For this purpose there are provided a plurality of pulse timing switches 46e, 47e, 48e, 49e having one end connceted to a common junction in turn connected to the B+ line through the normally-closed relay contacts K16–2. The opposite end of each of these pulse timing switches is connected to a respective one of the normally-closed relay contacts K17–1, K17–2, K17–3, K17–4 connected in turn to the respective terminals A, C, E, G. The latter terminals are connected respectively to the group of terminals B, D, F, H in a manner depending upon which quadrant is selected as the "home" position. FIG. 65 indicates at 50e the mode of connection when the first quadrant is selected as the "home" position. The interconnections between these terminals for the second, third and fourth quadrants as the "home" position is indicated respectively at 57e, 58e and 59e in FIGS. 62 to 64. Each of the terminals B, D, F and H is connected to a respective pair of normally-open relay contacts K12–2, K13–2, K14–2, and K15–2.

The reference numeral 51e indicates generally a conventional stepping motor comprising four fixed field windings 52e, 53e, 54e and 55e located around an armature 56e at spaced angular intervals of 90 degrees. The rotating armature 56e is in the form of a permanent magnet having a north pole at one end and a south pole opposite thereto. When one of the windings 52e, 53e, 54e, 55e is energized it generates lines of magnetic flux oriented in the particular respective direction of the axis of the energized winding to cause the north pole of armature 56e to align itself with said winding. By energizing windings 52e, 53e, 54e, 55e in sequence in a counterclockwise direction, armature 56e will be rotated counterclockwise in angular increments of 90 degrees each time the next succeeding winding is energized.

Returning to the illustrative example in which the first quadrant was selected as the "home" position and the initial orientation of chip C on vacuum needle 18 was such that the collector ball B was oriented in the second quadrant as symbolized at 237e to close switch 37e and thereby energize relays K9 and K13, energization of the latter relay closes its contacts K13–2 in FIG. 95 to permit pulse timing switch 47e to energize stepping motor field winding 54e. This causes armature 56e of stepping motor 51e to rotate 90 degrees. Since the T-bar of chip orientor 21 is mechanically driven by stepping motor armature 56e, said T-bar is thereby rotated 90 degrees to the second quadrant orientation in alignment with the ball orientation of chip C.

Since only relay K13 was energized whereas relays K12, K14 and K15 were not energized in this particular example, relay contacts K12–2, K14–2 and K15–2 remain open and hence pulse timing switches 46e, 48e and 49e do not energize the other field windings 52e, 53e and 55e of stepping motor 51e.

At 180 degrees later in the cycle a pulse is transmitted through pulse timing switch 60e in FIG. 69 and relay contacts K17–5 which were previously closed by energization of relay K17 by pulse timing switch 217e in FIG. 61. This also opens relay contacts K17–1, K17–2, K17–3 and K17–4 in FIG. 65 to disconnect pulse timing switches 46e, 47e, 48e and 49e from stepping motor windings 52e, 53e, 54e and 55e.

The reference numerals 60e, 61e, 62e and 63e in FIG. 69 indicate a plurality of pulse timing switches having their input ends joined together and connected in series with relay contacts K16–2. Each of these switches is connected to one of the group of terminals a, c, e, g through a respective one of the normally-open contacts K17–5, K17–6, K17–7, K17–8. Terminals a, c, e, g are connected to another group of terminals b, d, f, h in the manner shown at 64e in FIG. 69 when the circuitry is programmed for the first quadrant as the "home" position. When programmed so that one of the other quadrants is the "home" position, these terminal groups are connected in the manner shown at 65e, 66e and 67e in FIG. 66 to 68.

Now that the T-bar of chip orientor 21 has been oriented so as to be in alignment with the ball configuration of the chip C, the T-bar is rotated by stepping motor 51e to angularly displace chip C to the desired "home" position with its collector ball B in the first quadrant as shown at 236e in FIG. 56.

Since relay K13 is energized, contacts K13–2a are open so that pulse timing switch 60e does not energize field winding 54e of stepping motor 51e. At 22 degrees after the initiation of the pulse transmitted through switch 60e pulse timing switch 61e sends a pulse through relay contacts K17–6 which was previously closed by energization of relay K17 by pulse timing switch 217e. Since relay K14 is not energized, contacts K14–2 remain closed and the pulse transmitted by switch 61e energizes winding 53e of stepping motor 51e.

At 22 degrees later in the cycle, pulse timing switch 62e transmits a pulse through relay contacts K17–7 and K15–2a to stepping motor winding 55e. Motor armature 56e and the chip orientor T-bar are thereby angularly displaced through another 90 degree increment. At 22 degrees later in the cycle, pulse timing switch 63e transmits a pulse through relay contacts K17–8 and normally closed contacts K12–2 to energize winding 52e of stepping motor 51e, and thereby rotating motor armature 56e and the T-bar through another 90 degree increment. This final angular displacement brings armature 56e together with the T-bar and chip C to the final "home" position with the collector ball B of chip C in the first quadrant as shown at 236e in FIG. 56.

To illustrate briefly the mode of operation when chip C is oriented on vacuum needle 18 so that its collector ball B is initially in the first quadrant "home" position, the feeler arm of switch 36e will then be contacted by collector ball B to close switch 36e and thereby energize relay K8 through pulse timing switch 34e. This closes relay contacts K8–1 in FIG. 57 to permit pulse timing switch 40e to energize relay K16 thereby indicating that chip C is already in the programmed "home" position. Energization of relay K16 opens normally-closed relay contacts K16–2 so as to prevent any pulses from being transmitted through any of the pulse timing switches 46e, 47e, 48e, 49e and 60e, 61e, 62e, 63e. As a result stepping motor 51e and the T-bar of chip orientor 21 remain stationary and are neither rotated to align the T-bar with the chip nor rotated to orient the chip, since the latter is already in the final programmed "home" position.

As a further example, let it be assumed that the initial orientation of chip C on vacuum needle 18 is such that collector ball B is in the fourth quadrant as shown at 239e, in FIG. 56. Collector ball B will then contact the feeler arm of switch 39e to close the latter and thereby energize relay K11 thus closing relay contacts K11–1 to permit pulse timing switch 40e to transmit a pulse through diodes CR4, CR5 and CR6 thereby energizing relays K13, K14 and K15. This indicates that the sensed chip is 270 degrees clockwise from the programmed "home" position. The energization of these relays closes the normally-open relay contacts K13–1, K14–1 and K15–1 which hold these relays energized for the duration of the pulse transmitted through timing switch 45e, and also closes the normally-open relay contacts K13–2, K14–2 and K15–2 to permit pulse timing switches 47e, 48e and 49e to energize stepping motor windings 54e, 53e and 55e in sequence, thereby rotating the chip orientor T-bar 270 degrees to align it with chip C.

Stepping motor 51e and chip orientor T-bar are then angularly displaced to the first quadrant "home" position in the following manner. pulse timing switches 60e to 63e inclusive close at the angular phase instants designated in FIG. 69. Since relays K13, K14 and K15 are energized, the normally-closed relay contacts K13–2e, K14–2e and K15–2e are open, thereby preventing pulse timing switches 60e, 61e and 62e from energizing stepping motor windings 53e, 54e and 55e. Since relay K12 is not energized, its normally-closed contacts K12–2e remain closed to permit pulse timing switch 63 to transmit a pulse to energize stepping motor winding 52e thereby rotating motor armature 56e and the chip orientor T-bar 90 degrees to orient the chip at the "home" position with the collector ball in the first quadrant as shown at 236e in FIG. 56.

In a similar manner the control circuitry can be initially set up and programmed so that either the second, third or fourth quadrants becomes the "home" position to which chip C will be finally oriented, so that when chip C is placed upon the conductive lands L of printed-circuit substrate S the balls B of the chip C will be in proper alignment with the land pattern at that particular chip location of the printed circuit. In the event that one of these other quadrants is selected as the "home" position, conventional switching is provided so that the components of circuit 41e in FIG. 57 are reconnected in the manner shown at 42e in FIG. 58 for the second quadrant, at 43e in FIG. 59 for the third quadrant, and at 44e in FIG. 90 for the fourth quadrant. Also, the terminal connecting network 50e of FIG. 65 is changed to the network 57e of FIG. 62 for the second quadrant, the network 58e of FIG. 63 for the third quadrant, and the network 59e of FIG. 64 for the fourth quadrant. Similarly, the terminal connecting network 64e of FIG. 69 is changed to the network 65e of FIG. 66 for the second quadrant, the network 66e of FIG. 67 for the third quadrant, and the network 67e of FIG. 68 for the fourth quadrant.

If chip C is initially picked up by vacuum needle 18 with its collector ball B oriented in the third quadrant as as 238e in FIG. 56, then switch 38e will be closed to energize relay K10 closing its contacts K10-1 in FIG. 57 to energize relay K13 through diode CR2 and relay K14 through diode CR3. The chip orientor T-bar is thereby rotated to the third quadrant, then engages chip C, and then re-orients the latter to the programmed "home" position, all in a manner which will be obvious from the above description in connection with the previous illustrative examples.

If at the time of chip ball sensing the chip C is properly held on the end of vacuum needle 18 so that its collector ball B is oriented in one of the four proper angular positions, and if chip C has the correct number of balls B at the proper locations thereon, then only one ball B will be contacted by the feeler arm of one of the switches 36e to 39e inclusive. However, if chip C is defective or is misaligned on vacuum needle 18 in a skewed position or is angularly displaced from one of the four quadrant orientations, then either none or more than one of switches 36e to 39e may be actuated during the chip ball sensing operation. In order to determine if only one ball is detected by one of the switches 36e to 39e there are provided in FIG. 70 a pulse timing switch 68e and a series of relays K18, K19, K20, K21 to be energized thereby through normally-open contact relays K8-2, K9-2, K10-2, K11-2 respectively. Relays K18 to K21 inclusive are maintained energized through their own respective contacts K18-1, K19-1, K20-1, K21-1 and pulse timing switch 69e.

For purposes of illustration, let it be assumed that during the chip ball sensing operation the relay K9 is energized thereby closing normally-open relay contacts K9-2 to energize relay K19 during the "make" condition of pulse timing switch 68e. Relay K19 is maintained energized through its own contacts K19-1 by pulse timing switch 69e. The other relay contacts K8-2, K10-2, K11-2 and K18-1, K20-1, K21-1 remain open.

Relay K22 is thereby energized to indicate an "accept" condition to the effect that one and only one ball was detected during the chip orientation sensing operation, and is maintained energized through its own contacts K22-1 by pulse timing switch 71e. Relay K22 is energized for this "accept" condition by a pulse timing switch 70e through an EXCLUSIVE-OR circuit comprising normally-closed pairs of relay contacts K18-2 and K19-2 in series with two double-throw relay contact pairs K20-2 and K21-2 between pulse timing switch 70e and relay K22. Extending between switch 70e and relay K22 is another series network comprising double-throw relay contact pairs K18-3 and K19-3 and normally-closed relay contact pairs K20-3 and K21-3.

It will be seen that the pulse transmitted by timing switch 70e will pass through the EXCLUSIVE-OR circuit to energize relay K22 if any one, but not more than one, of these pairs of relay contacts is actuated. More specifically, if none of the relays K18 to K21 is energized so that none of the relay contact pairs of the EXCLU-SIVE-OR circuit is actuated, both of the series paths between pulse timing switch 70e and relay K22 will remain open so as to prevent the energization of the latter. Similarly, if more than one of the relays K18 to K21 inclusive is energized as a result of more than one chip ball B being sensed by device 35e to close more than one of the switches 36e to 39e, then more than one pair of contacts of the EXCLUSIVE-OR circuit will be actuated. This again maintains both series paths open between pulse timing switch 70e and relay K22 so as to prevent energization of the latter.

Figure 71:
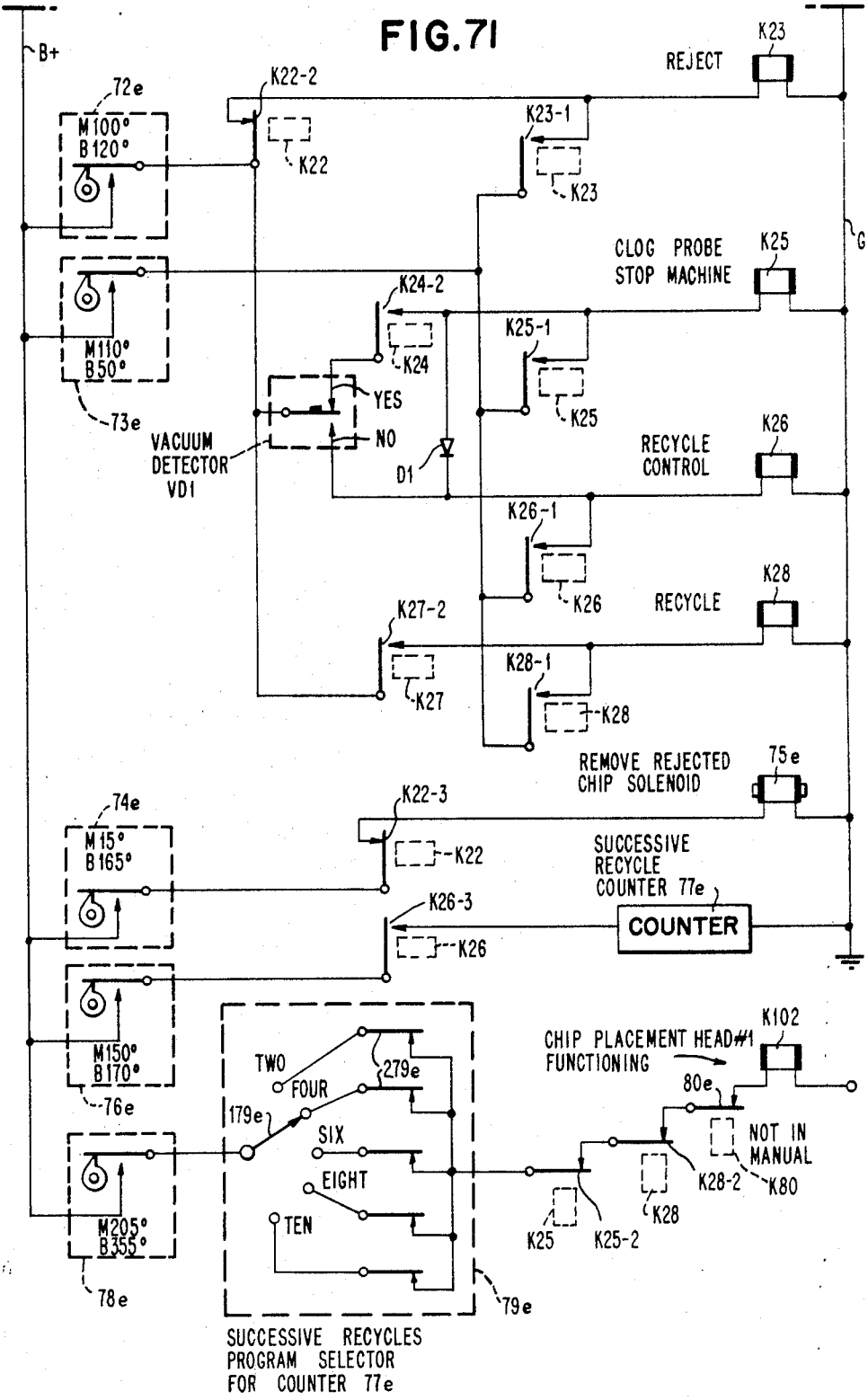

The non-energization of relay K22 is the "reject" condition which causes K22-3 in FIG. 71 to remain closed to permit pulse timing switch 74e to transmit a pulse energizing solenoid 75e. Furthermore, relay contacts K22-2 remain closed to permit pulse timing switch 72e to energize relay K23 to indicate a "reject" condition and which is held through its own contacts K23-1. This closes relay contacts K23-2 permitting pulse 70e to energize reject memory relay K24 held through its own contacts K24-1 by pulse timing switch 71e.

If the lower end of vacuum needle 18 is closed off either by the presence of a chip C thereon, or as a result of being clogged by flux or a dirt particle, then the pressure within needle 18 will be lower than atmospheric so as to actuate vacuum detector VD1 in FIG. 71. If the solenoid 75e has been actuated to blow off from needle 18 any chip which may be present thereon, then the actuation of vacuum detector VD1 must indicate the vacuum is caused by a clogged needle. The energization of reject memory relay K24 closes contacts K24-2 to permit pulse timing switch 72e to transmit a pulse through the actuated vacuum detector VD1 to energize clog needle relay K25 held closed through its own contacts K25-1, thereby stopping the machine to permit removal of the flux or other contaminant from those vacuum needles 18 requiring this service.

In the event that the end of vacuum needle 18 is neither clogged nor closed off by the presence of a chip C thereon, the interior of the needle is then in communication with the atmosphere and vacuum detector VD1 will be actuated to indicate that there is no vacuum present within the needle. This permits pulse timing switch 72e to energize recycle control relay K26 which is maintained closed through its own contacts K26-1 by pulse timing switch 73e. The energization of relay K26 closes relay contacts K26-2 to permit pulse timing switch 70e to energize recycle memory relay K27 which is held closed through its own contacts K27-1 by pulse timing switch 71e. Pulse timing switch 72e then transmits a pulse through closed relay contacts K27-2 to energize recycle relay K28.

Referring again to FIG. 71 energization of relay K28 is maintained through its own contacts K28-1 and closes contacts K28-2 (FIG. 56) to permit pulse timing switch 24e to transmit a pulse which energizes chip positioning one-revolution clutch control relay K7, thereby closing contacts K7-2 permitting pulse timing switch 29e to energize chip positioning one-revolution clutch solenoid 30e, thereby causing the respective chip placement head 17 to proceed through another cycle of operation.

In the event that the next successive vacuum needle 18 of the chip placement head 17 produces the same "no vacuum" condition to initiate another recycle of the head 17, these successive recycles are counted as the head 17 continues its repeated attempts to pick up a chip C on the end of a vacuum needle 18 with the chip aligned so that only one ball B is detected by the chip ball sensing device 35e. However, after a predetermined number of recycles, the machine is shut down in the following manner. Each energization of recycle control relay K26 in FIG. 71 closes relay contacts K26-3 to permit pulse timing switch 76e to transmit a pulse to a successive recycle counter 77e. The latter is provided with a program selector indicated generally at 79e and comprising a selector arm 179e which may connect the output end of a pulse timing switch 78e to the left-hand terminal of a selected one of the normally-closed switches 279e.

Each of the latter remains closed until the counter 77e registers a certain number of recycle operations for the particular chip placement head 17. For example, the uppermost of the switches 279e opens when counter 77e registers two recycles, the next lowermost switch 279e opens when counter 77e registers four recycles, etc. Selector arm 179e is illustrated as having been adjusted to contact the second of the switches 279e, which switch will open when counter 77e registers four successive recycles. In this event, chip positioner functioning relay K102 (associated with the first chip placement head 17) will not be energized, thereby stopping the machine in a manner to be described below.

In the event that vacuum needle 18 is not clogged, relay K25 is not energized so that normally-closed contacts K25–2 in FIG. 71 remain closed. If, furthermore, chip ball sensing device 35e indicates an "accept" condition to energize relay K22 and thereby open contacts K22–2 to prevent energization of reject relay K23 which in turn maintains relay contacts K23–2 in FIG. 70 open to prevent energization of reject memory relay K24. This maintains contacts K24–2 in FIG. 71 open to prevent energization of recycle control relay K26 through diode D1 and thereby maintains contacts K26–2 in FIG. 70 open to prevent energization of recycle memory relay K27. This in turn maintains contacts K27–2 in FIG. 71 open to prevent energization of recycle relay K28 and thereby maintains normally-closed contacts K28–2 closed. Assuming further that the "not-in-manual" switch 80e remains closed, it will thus be seen that pulse timing switch 78e will transmit a pulse through program selector 79e to energize chip placement head No. 1 functioning relay K102. This sends to the system control to be described hereinbelow a signal indicating that the first chip placement head 17 is functioning properly.

As noted above, each of the several chip placement heads 17 is controlled by a separate circuit arrangement as shown in FIGS. 56 to 71 inclusive, so that the electrical control system comprises as many of these circuit arrangements as there are chip placement heads 17. For purposes of illustration, it is assumed that the subject machine has twelve chip placement heads 17. Relay K102 designates proper functioning of the first chip placement head designated "No. 1" and the corresponding relays of the other identical circuit arrangements associated with the other eleven chip placement heads 17 will be designated hereinbelow by the reference designations K103 to K113 inclusive.

After each substrate S has been operated upon by all of the chip placement heads 17, it is then carried by conveyor tape 1 to the chip presence sensing station 22 where the substrate is subjected to a test to determine if all of the chips C are positioned thereon. The control circuitry for this chip presence sensing operation is disclosed in FIGS. 72 and 73 and will now be described.

Figure 72:
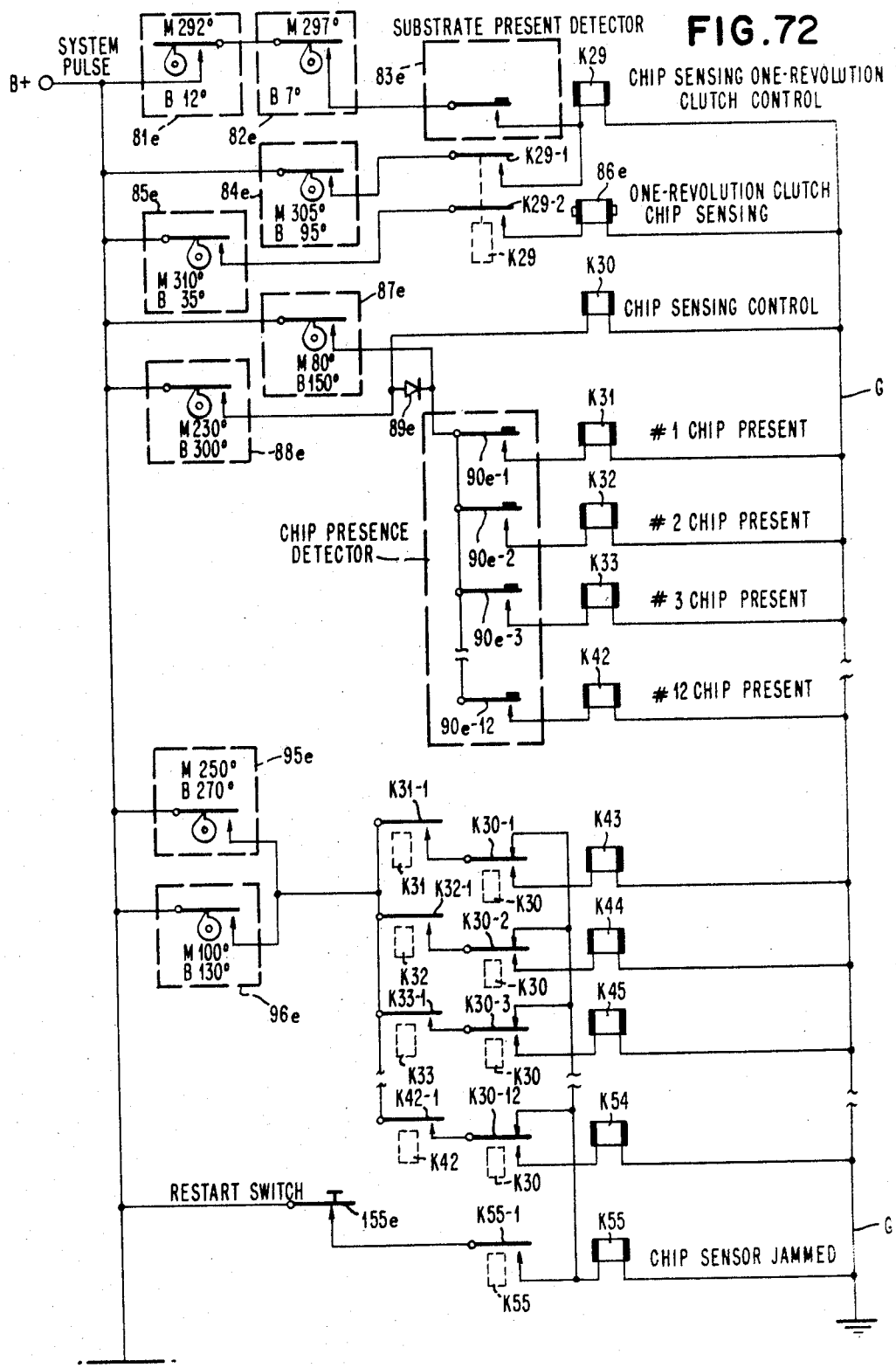

Referring first to FIG. 72, pulse timing switches 81e and 82e are connected in series with a substrate presence sensor switch 83e located one tape index position before chip presence sensing station 22. Sensor switch 83e is provided with a feeler arm which closes the switch in response to engagement with a substrate S present on conveyor tape 1 at that position. This permits pulse timing switches 81e and 82e to energize a chip sensing one-revolution clutch control relay K29 which is maintained closed through its own contacts K29–1 by pulse timing switch 84e. Relay contacts K29–2 are thereby closed to permit pulse timing switch 85e to energize chip sensing one-revolution clutch solenoid 86e thereby actuating one-revolution clutch 32 (FIG. 4) which in turn actuates chip sensing head 22.

The reference numeral 90e indicates generally a chip presence sensor comprising series of twelve switches 90e–1 to 90e–12 inclusive, each of which may correspond to a particular chip location of substrate S and which will be closed when its respective feeler arm contacts and senses the presence of a chip C at that location. The left-hand terminals of said switches 90e–1 to 90e–12 are joined and connected in series with pulse timing switch 87e and their right-hand terminals are connected to a respective one of the twelve chip present relays K31 to K42 inclusive.

Before the actual chip presence sensing operation, chip presence sensor 90e is first tested to determine if any of the twelve switches 90e–1 to 90e–12 is accidentally jammed in a closed position. For example, suppose that switch 90e–2 is improperly closed before the chip presence sensing operation. In this event, relay K32 is energized to close contacts K32–1 thereby permitting pulse timing switch 96e to transmit a pulse to energize chip sensor jammed relay K55 held closed by its own contacts K55–1 through a normally-closed restart switch 155e. This will stop the machine in a manner to be described below.

Whether the circuitry is sensing for a jam in one of the switches 90e–1 to 90e–12 or for the presence of chips C on substrate S is determined by chip sensing control relay K30. When the latter is not energized, then the series of twelve double-throw relay contacts K30–1 to K30–12 inclusive will be in the condition shown in the drawing so that when one or more of the twelve normally-open relay contacts K31–1 to K42–1 inclusive is closed due to jamming of one of the switches, 90e–1 to 90e–12 only the chip sensor jammed relay K55 will be energized but none of the chip present relays K43 to K54 inclusive will be energized.

Relays K43 to K54 are energized only when chip presence sensor 90e senses that the corresponding chips C are present on substrate S. This occurs during the chip sensing operation determined by pulse timing switch 88e which energizes chip sensing control relay K30 to actuate all of the double-throw contacts K30–1 to K30–12 inclusive, thereby placing the twelve chip present relays K43 to K54 inclusive in series with the respective relay contacts K31–1 to K42–1 inclusive. The latter close in accordance with energization of the respective relays K31 to K42 inclusive by closure of the respective switches 90e–1 to 90e–12 in response to the presence of a chip at the respective location on substrate S.

Pulse timing switch 95e thereby transmits a pulse through the closed sets of contacts of the group K31–1 to K42–1 inclusive so as to energize those of the chip present relays K43 to K54 inclusive which correspond to locations on substrate S having chips C present thereon. Relays K43 to K54 inclusive are maintained energized for a longer period of time than the actual duration of the physical sensing operation through their own respective relay contacts K43–1 to K54–1 inclusive by pulse timing switch 97e.

Having sensed the pattern of chips C present on substrate S, it is then necessary to determine whether this pattern is an acceptable one; that is, whether the chips actually present constitute all those that are supposed to be present, or whether one or more chips are missing. For this purpose there is provided a chip sensing program selector shown in FIG. 73 and indicated generally by the reference numeral 99e. This selector comprises a series of twelve switches 99e–1 to 99e–12 inclusive, each adapted when closed to short-circuit a respective one of the twelve normally-open relay contacts K43–2 to K54–2 inclusive, arranged in series between pulse timing switch 98e and accept substrate relay K56. Energization of the latter indicates that the substrate S has thereon the required number of chips C at the sensed locations.

Since the printed-circuit pattern on a substrate S may be designed so as to have any number of transistor or diode chips up to a total of twelve in number, chip sensing program selector 99e is set by manually closing those of the twelve switches 99e–1 to 99e–12 which correspond to sensing locations where no chips are to be positioned for the particular printed-circuit pattern, whereas those switches corresponding to locations where chips are to be positioned are left in the open condition shown in the drawing. For example, assuming that it is desired to sense only the presence of chips in the first two position corresponding to the switches 90e–1 and 90e–2; that is, to determine the presence of chips designated "No. 1" and "No. 2," then program selector 99e is set by closing all of the ten switches 99e–3 to 99e–12 while switches 99e–1 and 99e–2 are left in the open condition. Therefore the presence of chip No. 1 and chip No. 2 results in the closure of switches 90e–1 and 90e–2 to energize relays K31 and K32 thereby closing relay contacts K31–1 and K32–1 to permit pusle timing switch 95e to energize relays K43 and K44 through the actuated double-throw relay contacts K30–1 and K30–2 respectively. This causes closure of relay contacts K43–2 and K44–2 in FIG. 103 thereby permitting a pulse from timing switch 98e to flow through these closed contacts and also through the ten closed switches 99e–3 to 99e–12 inclusive, thereby energizing accept substrate relay K56. If chip No. 1 and/or chip No. 2 is not present during the sensing operation, then switch 99e–1 and/or 99e–2 remains open so that relay K31 and/or K32 is not energized thereby preventing the energization of relay K43 and/or relay K44. This prevents the closure of contacts K43–2 and/or contacts K44–2 thereby opening the series path between pulse timing switch 98e and accept substrate relay K56. Therefore relay K56 is not energized in the event that one or both of the two sensed chips is missing.

Once it is determined that a particular substrate is accepted or rejected by energization or non-energization of accept substrate relay K56, the next consideration is whether rework output head 23 is programmed so as to pick up from the tape either all rejected substrates, or all accepted substrates, or all substrates or no substrates. Those substrates picked up by rework head 23 are placed in tray carriers whereas those substrates not so picked up continue on conveyor tape 1 toward the discharge end of the latter. Generally, rework head 23 is programmed to remove all rejected substrates from tape 1 and to permit the accepted substrates to continue on tape 1 toward the next apparatus which is usually an oven (not shown) which permanently joins chip balls B to the substrate land pads P on which they have been placed by the subject chip positioning machine.

Figure 74:
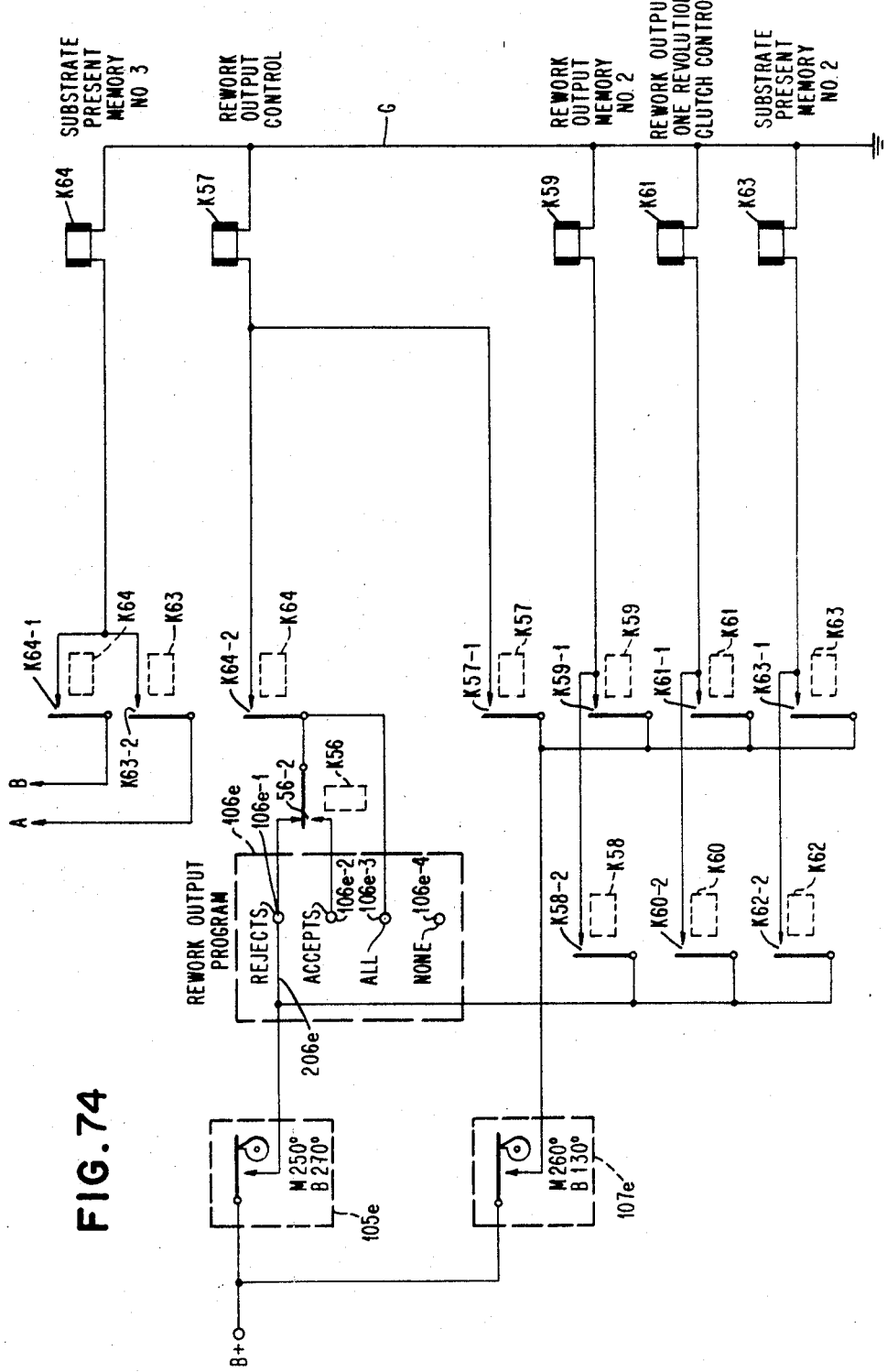

Referring now to FIG. 74 a rework output program selector is indicated generally by the reference numeral 106e and comprises a wiper arm 206e manually movable so as to contact either terminal 106e–1 to program rework output head 23 to remove rejected substrates S from the tape 1, or terminal 106e–2 to remove accepted substrates, or terminal 106e–3 to remove all substrates, or terminal 106e–4 to remove no substrates. Rework head 23 is generally utilized to remove the rejected substrates from conveyor tape 1 and therefore program selector 106e is shown in the drawings with the wiper arm 206e in contact with the "Rejects" terminal 106e–1.

If substrate S is accepted, accept substrate relay K56 will be energized and held by its own contacts K56–1 and pulse timing switch 104e to actuate relay contacts K56–2 thereby opening the circuit between terminal 106e–1 and rework output control relay K57 so that the latter will not be energized by pulse timing switch 105e. However, if substrate S is rejected, then relay K56 will not be energized so that relay contacts K56–2 remain in the condition shown in the drawing to complete a path from pulse timing switch 105e to rework output control K57, thereby energizing the latter.

Rework head 23 is to be actuated only when a substrate S is actually present on tape 1 at the rework station. As noted above, the presence of substrate S is detected by sensor switch 83e at a location one tape index position before chip presence sensing station 22. The information as to whether a substrate is present on tape 1 must therefore be retained in a memory for a duration of four index positions until the sensed substrate, or the portion of the tape where the substrate is missing, eventually reaches rework head 23. This memory function which retains the information as to the presence of a substrate is provided by the circuitry now to be described.

FIG. 76 shows the pulse timing sequence for the several relays constituting the substrate presence memory circuitry. The reference designation of each pulse timing switch (which transmits the pulse to energize each relay for the phase durations indicated by the respective horizontal lines) is placed to the left of each of these lines. Thus, for example, substrate present relay K29 is energized through pulse timing switch 82e from 297 degrees to 7 degrees and by pulse timing switch 84e from 305 degrees to 95 degrees, whereas substrate present memory relay K62 is energized through pulse timing switch 98e from 40 degrees to 60 degrees and through pulse timing switch 104e from 50 degrees to 280 degrees.

Figure 73:
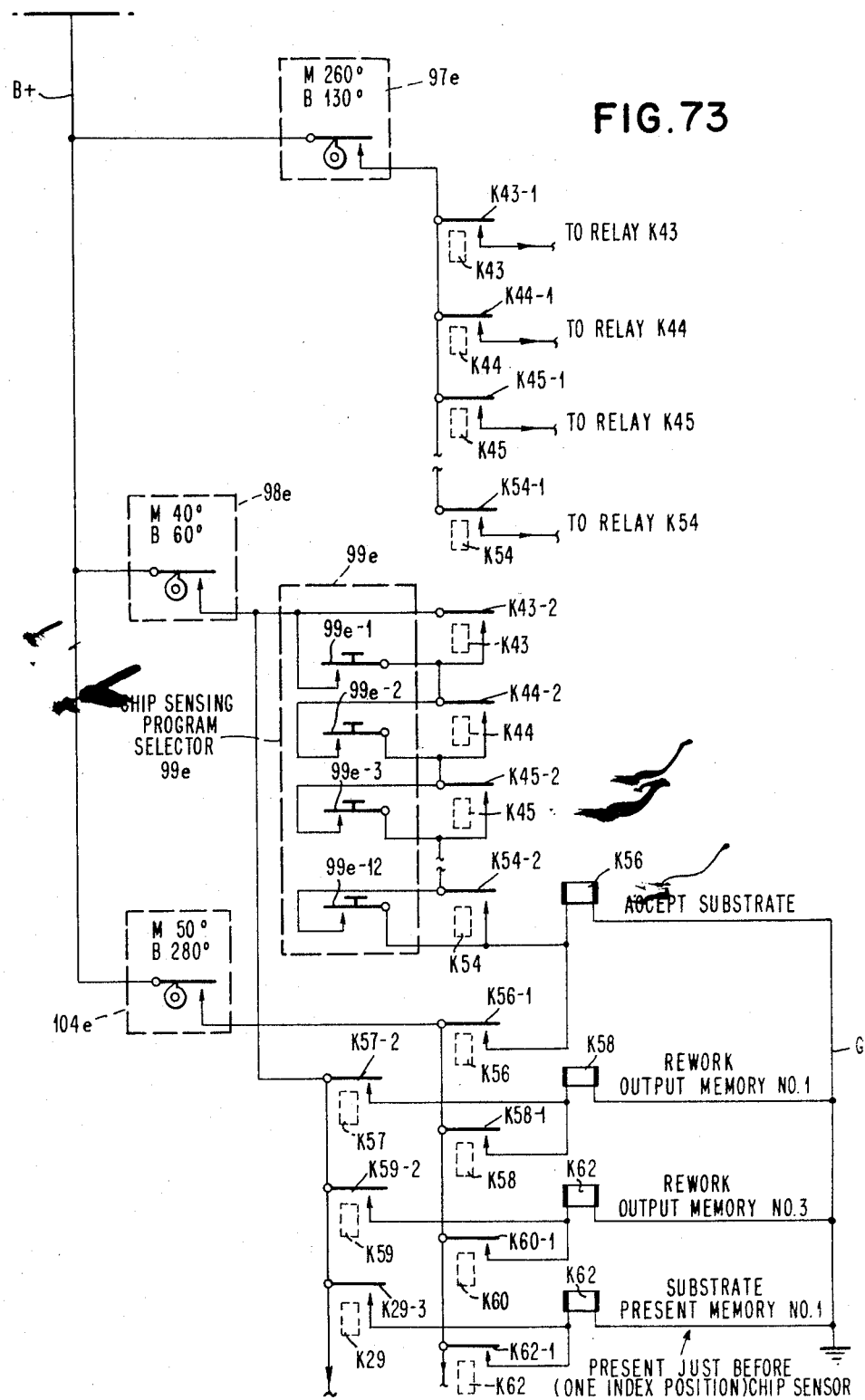

If a substrate S is present so as to close substrate presence sensor switch 83e, relay K29 is energized through system pulse timing switch 81e and pulse timing switch 82e from 290 degrees to 95 degrees as shown in FIG. 72 and also in FIG. 76. Referring now to FIG. 73 energization of relay K29 close relay contacts K29–3 thereby permitting pulse timing switch 98e to energize a first substrate present memory relay K62 from 40 degrees to 60 degrees.

Referring back to FIG. 73 relay K62 is held energized through its own contacts K62–1 from 50 degrees to 280 degrees thereby closing its contacts K62–2 in FIG. 74 to energize a second substrate present memory relay K63 through pulse timing switch 105e from 250 degrees to 270 degrees. Relay K63 is held energized from 260 degrees to 130 degrees through its own contacts K63–1 and pulse timing switch 107e. This closes relay contact K63–2 to energize a third substrate present memory relay K64 from 40 degrees to 60 degrees through pulse timing switch 98e.

At the same time that relay K63 is being controlled by relay K62, relays K30 to K54 inclusive are being controlled by chip presence sensor 90e. Relays K43 to K54 inclusive are energized at 250 degrees to 270 degrees and are held through their own respective contacts K54–1 from 260 degrees to 130 degrees. Accept relay K56 is energized by pulse timing switch 98e from 40 degrees to 60 degrees and is held energized by its own contacts K56–1 and pulse timing switch 104e from 50 degrees to 280 degrees.

Assuming that rework output program selector 106e is set so that wiper arm 206e is in contact with "Rejects" terminal 106e–1 and that the particular substrate in question is a "reject" so that accept relay K56 is not energized and double-throw contacts K56–2 remain in the condition shown in the drawing, then rework output control relay K57 will be energized from 250 degrees to 270 degrees by pulse timing switch 105e. Relay K57 is held energized by its own contacts K57–1 from 260 degrees to 130 degrees through pulse timing switch 107e. Relay K57 when energized indicates that the particular substrate S that was sensed for the presence of chips thereon is to be removed by rework head 23 when the substrate arrives at rework station 23.

This information is transferred to a first rework output memory relay K58 which is energized from 40 degrees to 60 degrees through closed relay contacts K57–2 and pulse timing switch 98e. Relay K58 is held energized from 50 degrees to 280 degrees through its own relay contacts K58–1 and pulse timing switch 104e. This information is then transferred to a second rework output memory relay K59 which is energized from 250 degrees to 270 degrees through relay contacts K58–2 and pulse timing switch 105e. Relay K59 is held energized from 260 degrees to 130 degrees through its own contacts K59–1 and pulse timing switch 107e.

This information is then transferred to a third rework output memory relay K60 which is energized from 40 degrees to 60 degrees through relay contacts K59-2 and pulse timing switch 98e in FIG. 73. Relay K60 is held energized through its own contacts K60-1 and pulse timing switch 104e. The information is then transferred to rework output control relay K61 which is energized from 250 degrees to 270 degrees through relay contacts K60-2 and pulse timing switch 105e. Relay K61 is held energized through its contacts K61-1 and relay 107e from 260 degrees to 130 degrees, thereby closing contacts K61-2 in FIG. 75.

The latter figure shows the circuit which controls the actuation of rework head 23. In series with pulse timing switches 108e and 109e are said contacts K61-2, a normally-open switch S1-1 which is closed in response to the presence of a rework carrier or container to receive the removed substrates, a normally-closed switch S2-1 which remains closed unless the carriers are entirely filled, a normally-closed switch S3-1 which remains closed unless a substrate becomes jammed, and a rework one-revolution clutch control relay K65.

It will thus be seen that if the conditions actuating switches S1-2, S2-1, and S3-1 are normal, and if relay K61 is energized to close contacts K61-2, then relay K65 will be energized and maintained closed through its own contacts K65-1 by pulse timing switch 110e. This closes normally-open relay contacts K65-2 to transmit a pulse from pulse timing switch 111e to rework output one-revolution clutch solenoid 112e thereby actuating one-revolution clutch 33 which in turn actuates rework head 23.

In series with pulse timing switch 113e and normally-closed relay contacts K55-2 are switches S1-2, S2-2 and S3-2 which are actuated in response to the same conditions as the respective switches S1-1, S2-1 and S3-1 described above. The reference numeral 114e indicates a normally-closed switch which remains closed unless the machine is set for manual operation. In series therewith is a relay K114 which when energized indicates that the chip presence sensor 22 and rework heads 23 are functioning properly.

The circuitry described above comprises the controls for the individual operating stations, and the overall system control will now be described. Referring to FIG. 75 a system pulse timing switch 115e is in series with the normally-open contacts K101-1 of relay K101, which when energized indicates that loader 5, dimpler 6 and fluxers 9, 15 are functioning properly. Connected thereto are the twelve normally-open relay contacts K102-1 to K113-1 inclusive of a chip head program selector indicated generally at 116e. Each of the latter relay contacts closes when its corresponding relay is energized to indicate that a respective one of the twelve chip placement heads 17 is functioning properly.

In parallel with each of these relay contacts K102-1 to K113-1 inclusive is a respective one of the series of twelve switches 117-1 to 117-12 inclusive which are left open when their respective chip placement heads 17 are in operation but which are manually closed when their respective heads 17 are to remain inoperative. In series with a program selector 116e are normally-open relay contacts K114-1 which close when relay K114 is energized to indicate that chip presence sensor 22 and rework head 23 are functioning properly.

Connected to K114-1 is a system control one-revolution clutch solenoid 120e which when energized causes the entire machine to proceed through the next cycle of operation. In view of the series connection of the several relay contacts between system pulse timing switch 115e and system control one-revolution clutch solenoid 120e the circuit performs a logical "AND" function in that solenoid 120e is not energized, and therefore the machine does not undergo the next cycle of operation, unless all of the relays K101 to K114 inclusive are either energized or shorted by switches 117-1 to 117-12 so as to indicate that loader 5, dimpler 6, flux dispenser 9 and flux flattener 15, those chip placement heads 17 that are programmed to be in operation, chip presence sensor 22 and rework head 23 have all functioned properly. In this event, solenoid 120e is energized to initiate the next cycle of operation of the machine. That is, one-revolution clutch 50 (FIG. 4) is actuated thereby to open all of the substrate clamps, index the conveyor tape to advance each substrate one index position, and close the clamps. Each operating station then performs its next cycle of operation.

What is claimed is:

1. In a multi-headed semiconductor chip handling apparatus, each said chip including a body of semiconductor material to which a plurality of protruding contacts are connected, each head of said handling apparatus adapted to transport a chip from a pickup point to a placement station and deposit it upon the conductive land pattern of a pre-positioned substrate, precise alignment being required between said chip contacts and said conductive land pattern, the combination comprising:
   vacuum pickup means associated with each head of said apparatus;
   means for indexing each said vacuum pickup means through a plurality of stations;
   a first station for providing said semiconductor chips to said pickup point in a squared-off, contacts-down configuration;
   a second station adapted to receive a contacts-down semiconductor chip carried by a vacuum pickup means, said station including means to engage the exterior dimensions of said chip to further accurately align the outer dimensions of said chip with respect to said vacuum pickup means, said second station further including means for determining the orientation of the contacts associated with said chip and producing a signal indicative thereof;
   a third station adapted to receive said chips, said third station including rotatable means adapted to interact with said semiconductor chip contacts and rotate said chip to a position where its contents are precisely oriented with respect to said vacuum pickup means;
   a placement station wherein said vacuum pickup means is precisely located with respect to a conductive land bearing substrate, said pickup means, upon arrival at said placement station, being actuated to place said oriented semiconductor chip upon the conductive lands of said substrates.

2. The invention defined in claim 1 further including:
   means responsive to said orientation signal for pre-rotating said rotatable means to receive and accurately locate said chip contacts.

3. In a multi-headed semiconductor chip handling apparatus, each said chip including a body of semiconductor material to which a plurality of protruding contacts are connected, each head of said handling apparatus adapted to transport a chip from a pickup point to a placement station and deposit it upon the conductive land pattern of a pre-positioned substrate, precise alignment being required between said chip contacts and said conductive land pattern the combination comprising:
   vacuum pickup means associated with each head of said apparatus;
   means for indexing each said vacuum pickup means through a plurality of stations;
   a first station for providing said semiconductor chips to said pickup point in a squared-off, contacts-down configuration;
   a second station adapted to receive a contacts-down semiconductor chip carried by a vaccum pickup means, said station including jaw means to engage the exterior dimensions of said chip to further accurately align the outer dimensions of said chip with respect to said vacuum pickup means, said second station further including means for determining the orientation of the contacts associated with said chip and producing a signal indicative thereof;

a third station adapted to receive said chips, said third station including rotatable means adapted to fit within the pattern created by said semiconductor chip contacts and interact with said contacts to rotate said chip to a position where its contacts are precisely oriented wth respect to said vacuum pickup means;

a placement station wherein said vacuum pickup means is precisely located with respect to a conductive land bearing substrate, said pickup means, upon arrival at said placement station, being actuated to place said oriented semiconductor chip upon the conductive lands of said substrate.

4. The invention defined in claim 3 further including:
means responsive to said orientation signal for prerotating said rotatable means to receive and accurately locate said chip contacts.

5. In a multi-headed semiconductor chip handling apparatus, each said chip including a body of semiconductor material to which a plurality of protruding ball contacts are connected, each head of said handling apparatus adapted to transport a chip from a pickup point to a placement station, and deposit it upon the conductive land pattern of a prepositioned substrate, precise alignment being required between said ball contacts and said conductive land pattern, the combination comprising:

a vacuum needle associated with each head of said apparatus;

means for indexing each said vacuum needle through a plurality of stations;

a first station for providing said semiconductor chips to said pickup point in a squared-off, ball contacts-down, configuration;

an orient sensor station adapted to receive a ball contacts-down semiconductor chip carried by a vacuum needle, said station including a set of movable jaws which engage the sides of said chip when it is inserted into said station, to further accurately align said chip with said vacuum needle, said orient sensor station further including blade means for determining the orientation of the contacts associated with said chip and producing a signal indicative thereof;

an orientor station adapted to receive said chips, said orientor station including a rotatable shaped male head adapted to precisely mate with the interior female pattern created by said ball contacts and to interact with said contacts to rotate said chip to a position where its ball contacts are precisely oriented with respect to said vacuum pickup means;

a placement station wherein said vacuum pickup means is precisely located with respect to a conductive land bearing substrate, said pickup means, upon arrival at said placement station, being actuated to place said oriented semiconductor chip ball contacts upon the conductive lands of said substrate.

6. The invention as defined in claim 5 wherein said orientation signal is produced by a deflection of one of said blade means by a coincidentally aligned ball contact, the deflection of more than one blade means or no blade means causing a reject signal to be produced.

7. The invention as defined in claim 6 further including a blow-off mechanism positioned subsequent to said orient sensor station for removing a semiconductor chip from a vacuum needle, said mechanism being actuated by said reject signal.

8. The invention defined in claim 7 wherein said blow-off mechanism comprises an air blast horn and a receptacle, the receipt of a reject signal causing a blast of air to emanate from said horn to dislodge a chip held by a vacuum needle into said receptacle.

9. The invention as defined in claim 5 wherein said orientor station includes an actuating motor which rotates said head with an absence of sharp movements, thereby preventing damage to said ball contacts.

10. In a multi-headed electrical semiconductor chip handling apparatus each chip including a body of semiconductor material having a first face and an opposite second face provided with a plurality of protruding electrical contacts depending therefrom, each head of said handling apparatus adapted to transport a chip from a pick-up point to a placement station and deposit it in predetermined alignment upon the conductive land pattern of a substrate, the combination comprising:

pick-up means associated with each head of said apparatus for picking up said chip with the said first face adjacent thereto;

means for indexing each said pick-up means through a plurality of stations comprising, a first station for providing said chip to said pick-up means;

a second station adapted to contact with said chip while carried on said pick-up means for determining the orientation of the said contacts associated with said chip and producing a signal indicative thereof;

a third station adapted to receive said chip while carried on said pick-up means with said third station including a rotatable means adapted to interact with the said contacts of said chip and to rotate said chip in response to said signal to a position where the said contacts are disposed in a desired orientation with respect to and while on said pick-up means; and a placement station where said pick-up means is aligned in orientation with said substrate, with said pick-up means on arrival at said placement station adapted for actuation thereof to place said chip on said substrate with the said terminals of said chip in register with corresponding conductive lands of said substrate.

11. The apparatus of claim 10 wherein said first station includes means to deliver said chips thereat in a pre-orientated order.

12. The apparatus of claim 11 wherein said second station includes means to engage the outer dimensions of said chips for a pre-alignment thereof with respect to and while on said pick-up means.

13. The apparatus of claim 12 wherein said first station includes means to deliver said chip in a pre-orientated order.

14. The apparatus of claim 13 wherein said first station is adapted to deliver said chips in a contacts down configuration.

15. In a multi-headed electrical component handling apparatus with each component having a first face and a second face provided with a plurality of protruding contacts depending therefrom, each head of said handling apparatus adapted to transport an electrical component from a pick-up point to a placement station and deposit it on corresponding contacts of a second electrical component, the combination comprising:

pick-up means associated with each head of said apparatus for picking up the first said components with the said first face adjacent thereto;

means for indexing each of said pickup means through a plurality of stations comprising a first station for providing the first said components to said pick-up means;

a second station adapted to contact with a first said component while carried on said pick-up means, said second station including means for determining the orientation of the first said contacts associated with the first said component and producing a signal indicative thereof;

a third station adapted to receive the first said component while carried on said pick-up means with said third station including a rotatable means adapted to interact with the first said contacts of the first said component and to rotate said component in response to said signal to a position where the first said contacts are disposed in a desired orientation with respect to and while on said pick-up means;

a placement station where said pick-up means is pre-aligned for orientation with said second component,

37 with said pick-up means on arrival at said placement station adapted for actuation thereat to place the first said component on the said second component with registration of the corresponding contacts thereof.

16. The apparatus of claim 15 wherein said second station includes means to engage the outer dimensions of the first said components for a preliminary orientation thereof with respect to and while on said pick-up means.

References Cited

UNITED STATES PATENTS

| | | | |
|---|---|---|---|
| 2,494,474 | 1/1950 | Fermanian et al. | 219—85 |

38

| | | | |
|---|---|---|---|
| 3,056,317 | 10/1962 | Huber et al. | 728—6 |
| 3,083,291 | 3/1963 | Soffa et al. | 219—158 |
| 3,165,818 | 1/1965 | Soffa et al. | 29—203 X |
| 3,337,941 | 8/1967 | Drop. | |
| 3,344,900 | 10/1967 | Drop. | |
| 3,367,476 | 2/1968 | Aronstein et al. | 198—33 |

THOMAS H. EAGER, Primary Examiner

U.S. Cl. X.R.

29—208; 198—33; 219—158; 228—6